US 6,339,414 B1

(12) United States Patent
Todokoro et al.

(10) Patent No.: US 6,339,414 B1
(45) Date of Patent: *Jan. 15, 2002

(54) ELECTRON GENERATING DEVICE, IMAGE DISPLAY APPARATUS, DRIVING CIRCUIT THEREFOR, AND DRIVING METHOD

(75) Inventors: Yasuyuki Todokoro, Yokohama; Hidetoshi Suzuki, Fujisawa, both of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/689,658

(22) Filed: Aug. 13, 1996

(30) Foreign Application Priority Data

Aug. 23, 1995 (JP) .............................. 7-214555
Aug. 8, 1996 (JP) .............................. 8-209667

(51) Int. Cl.⁷ .................................. G09G 3/22
(52) U.S. Cl. .................................... 345/74.1
(58) Field of Search .......................... 345/74, 55, 84, 345/87, 100; 313/309, 310

(56) References Cited

U.S. PATENT DOCUMENTS

| 3,936,815 A | 2/1976 | Kogure et al. ......... 340/324 M |
| 4,581,655 A | 4/1986 | Ide et al. ............... 358/242 |
| 5,066,883 A | 11/1991 | Yoshioka et al. ........... 313/309 |
| 5,157,309 A | 10/1992 | Parker et al. ............ 315/169.1 |
| 5,300,862 A | 4/1994 | Parker et al. ............ 315/169.1 |
| 5,313,140 A | 5/1994 | Smith et al. ............ 315/169.1 |
| 5,455,597 A | 10/1995 | Nakamura et al. ............ 345/75 |
| 5,659,329 A | 8/1997 | Yamanobe et al. ............ 345/74 |
| 5,818,403 A | 10/1998 | Nakamura et al. ............ 345/74 |

FOREIGN PATENT DOCUMENTS

| EP | 0604975 | 7/1994 |
| EP | 0605881 | 7/1994 |
| EP | 0606075 | 7/1994 |
| EP | 660367 A1 | 6/1995 |
| EP | 661726 A1 | 6/1995 |
| GB | 2 076 576 | 12/1981 |
| JP | 56-138792 | 10/1981 |

(List continued on next page.)

OTHER PUBLICATIONS

Dyke, W.P., et al. "Field Emission", Advances in Electronics and Electron Physics, vol. VIII, Academic Press Inc., Publishers New York, N.Y. 1956, pp. 90–185.

(List continued on next page.)

Primary Examiner—Matthew Luu
(74) Attorney, Agent, or Firm—Fitzpatrick, Cella, Harper & Scinto

(57) ABSTRACT

In order to cause a multi-electron source having electron emitters wired in the form of a matrix to emit electrons without any variations, there is provided an electron generating device including a multi-electron source (601) having a plurality of electron emitters (1002) wired in the form of a matrix through a plurality of data wiring layers (1004) and a plurality of scanning wiring layers (1003), and a driving circuit for driving the multi-electron source (601), the driving circuit including a first driving means (603) for applying a first voltage (Vs) to a scanning wiring layer to which an electron emitter which is to emit electrons is connected, and applying a second voltage (Vns) to a scanning wiring layer to which an electron emitter which is not to emit electrons is connected, and a second driving means (602) for applying a third voltage (Ve) to a data wiring layer to which an electron emitter which is to emit electrons is connected, and applying a fourth voltage (Vg) to a data wiring layer to which an electron emitter which is not to emit electrons is connected, wherein the second voltage (Vns) is substantially equal to the third voltage (Ve).

59 Claims, 39 Drawing Sheets

FOREIGN PATENT DOCUMENTS

| JP | 63-150387 | 6/1988 |
|---|---|---|
| JP | 64-31332 | 2/1989 |
| JP | 2-061697 | 3/1990 |
| JP | 2-257551 | 10/1990 |
| JP | 6-067621 | 3/1994 |
| JP | 6-289814 | 10/1994 |
| JP | 6-301355 | 10/1994 |
| JP | 59-181880 | 10/1994 |
| JP | 6-342636 | 12/1994 |

OTHER PUBLICATIONS

Mead, C.A., "Operation of Tunnel–Emission Devices", Journal of Applied Physics, vol. 32, Apr., 1961, pp. 646–652.

Elinson, M.L, et al., "The Emission Of Hot Electrons And The Field Emission Of Electrons From Tin Oxide", Radio Engineering and Electronic Physics, vol. 7, Jul. 1965, pp. 1290–1296.

Dittmer, G., "Electrical Conduction and Electron Emission of Discontinuous Thin Films", Thin Solid Films—Elsevier Sequoia S.A., Lausanne, Switzerland, Jul. 4, 1971, pp. 317–329.

Hartwell, M., et al., "Strong Electron Emission From Patterned Tin–Indium Oxide Thin Films", International Electron Devices Meeting 1975 Washington, D.C., pp. 519–521.

Spindt, C.A., et al., "Physical properties of thin–film emission cathodes with molybdenum cones", Journal of Applied Physics, vol. 47, No. 12, Dec. 1976, pp. 5248–5263.

Araka, Hisashi, et al., Electroforming and Electron Emission of Carbon Thin Films, Journal of the Vacuum Society of Japan, vol. 26, No. 1, Sep. 24, 1981, pp. 22–29.

FIG. 1
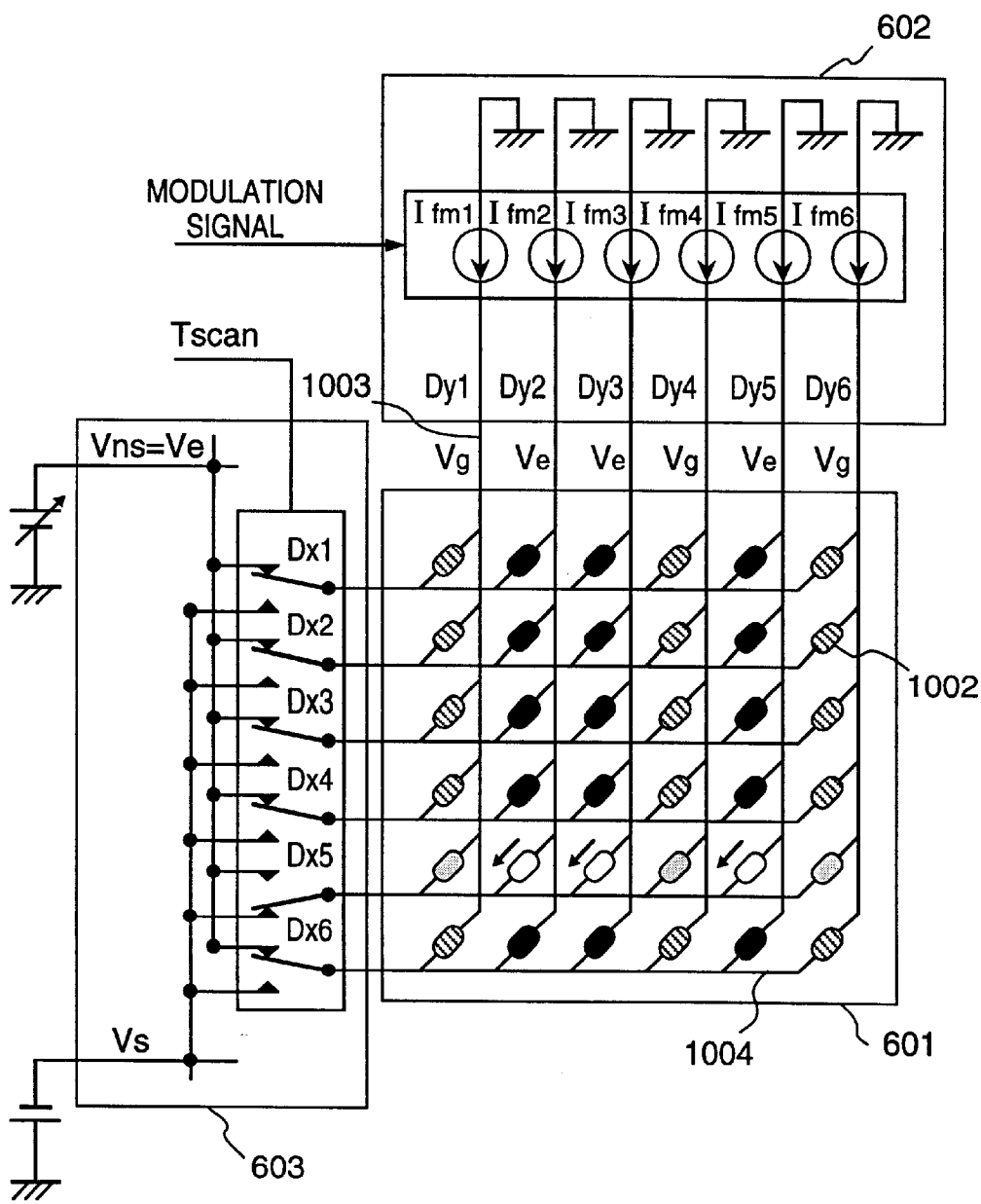
[VOLTAGES TO BE APPLIED TO EMITTERS]
 : Ve−Vs (EMITTER WHICH IS TO EMIT ELECTRONS)
 : Vg−Vs < Vth (EMITTER WHICH IS NOT TO EMIT ELECTRONS)
 : Vns−Vg < Vth (EMITTER WHICH IS NOT TO EMIT ELECTRONS)
 : Ve−Vns = 0 (SEMI-SELECTED EMITTER)

R : RED PHOSPHOR
G : GREEN PHOSPHOR
B : BLUE PHOSPHOR

R : RED PHOSPHOR
G : GREEN PHOSPHOR
B : BLUE PHOSPHOR

[VOLTAGES TO BE APPLIED TO EMITTERS]

⊘ : Ve–Vs (EMITTER WHICH IS TO EMIT ELECTRONS)

⊘ : Vg–Vs < Vth (EMITTER WHICH IS NOT TO EMIT ELECTRONS)

⊘ : Vns–Vg < Vth (EMITTER WHICH IS NOT TO EMIT ELECTRONS)

⊘ : Ve–Vns = 0 (SEMI-SELECTED EMITTER)

[VOLTAGES TO BE APPLIED TO EMITTERS]

- ⊘ : Ve−Vs (EMITTER WHICH IS TO EMIT ELECTRONS)
- ⊘ : Vg−Vs < Vth (EMITTER WHICH IS NOT TO EMIT ELECTRONS)
- ⊘ : Vns−Vg < Vth (EMITTER WHICH IS NOT TO EMIT ELECTRONS)
- ● : Ve−Vns = 0 (SEMI-SELECTED EMITTER)

[VOLTAGES TO BE APPLIED TO EMITTERS]

◊ : Ve−Vs (EMITTER WHICH IS TO EMIT ELECTRONS)

◊ : Vg−Vs < Vth (EMITTER WHICH IS NOT TO EMIT ELECTRONS)

◊ : Vns−Vg < Vth (EMITTER WHICH IS NOT TO EMIT ELECTRONS)

● : Ve−Vns = 0 (SEMI-SELECTED EMITTER)

ELECTRON GENERATING DEVICE, IMAGE DISPLAY APPARATUS, DRIVING CIRCUIT THEREFOR, AND DRIVING METHOD

BACKGROUND OF THE INVENTION

The present invention relates to an electron generating apparatus, an image display apparatus, a driving circuit, and a driving method and, more particularly, to an image display apparatus having a large number of surface-conduction type electron emitters.

Conventionally, two types of devices, namely thermionic and cold cathode devices, are known as electron emitters. Examples of cold cathode devices are field emission type electron emitters (to be referred to as field emitters hereinafter), metal/insulator/metal type electron emitters (to-be referred to as MIM-type electron emitters hereinafter), and surface-conduction type electron emitters.

Known examples of the field emitters are described in W. P. Dyke and W. W. Dolan, "Field Emission", Advance in Electron Physics, 8, 89 (1956) and C.A. Spindt, "Physical Properties of thin-film field emission cathodes with molybdenum cones", J. Appl. Phys., 47, 5248 (1976). FIG. 38 is a sectional view of a device according to C.A. Spindt et al. Referring to FIG. 38, reference numeral 3010 denotes a substrate, 3011, an emitter wiring layer made of a conductive material; 3012, an emitter cone; 3013, an insulating layer; and 3014, a gate electrode. In this device, a proper voltage is applied between the emitter cone 3012 and the gate electrode 3014 to emit electrons from the distal end portion of the emitter cone 3012.

A known example of the MIM-type electron emitters is described in C. A. Mead, "Operation of Tunnel-Emission Devices", J. Appl. Phys., 32, 646 (1961). FIG. 39 is a sectional view of an MIM-type electron emitter. Referring to FIG. 39, reference numeral 3020 denotes a substrate; 3021, a lower electrode made of a metal; 3022, a thin insulating layer having a thickness of about 100 Å; and 3023, an upper electrode made of a metal and having a thickness of about 80 to 300 Å. In the MIM type, a voltage is applied between the upper electrode 3023 and the lower electrode 3021 to emit electrons from the surface of the upper electrode 3023.

A known example of the surface-conduction type electron emitters is described in, e.g., M. I. Elinson, "Radio Eng. Electron Phys., 10, 1290 (1965) and other examples to be described later.

The surface-conduction type electron emitter utilizes the phenomenon that electron emission takes place in a small-area thin film, formed on a substrate, upon flowing a current parallel to the film surface. The surface-conduction type electron emitter includes electron emitters using an Au thin film (G. Dittmer, "Thin Solid Films", 9, 317 (1972)), an $In_2O_3/SnO_2$ thin film (M. Hartwell and C. G. Fonstad, "IEEE Trans. ED Conf.", 519 (1975)), a carbon thin film (Hisashi Araki et al., "Vacuum", vol. 26, No. 1, p. 22 (1983), and the like, in addition to an $SnO_2$ thin film according to Elinson mentioned above.

FIG. 37 is a plan view of the surface-conduction type electron emitter according to M. Hartwell et al. as a typical example of the structures of these surface-conduction type electron emitters. Referring to FIG. 37, reference numeral 3001 denotes a substrate; and 3004, a conductive thin film made of a metal oxide formed by spattering. This conductive thin film 3004 has an H-shaped pattern, as shown in FIG. 37. An electron-emitting portion 3005 is formed by performing an energization process (referred to as a energization forming process to be described later) with respect to the conductive thin film 3004. Referring to FIG. 37, an interval L is set to 0.5 to 1 mm, and a width W is set to 0.1 mm. For the sake of illustrative convenience, the electron-emitting portion 3005 is shown in a rectangular shape at the center of the conductive thin film 3004. However, this does not exactly show the actual position and shape of the electron-emitting portion.

In the above surface-conduction type electron emitters according to M. Hartwell et al., typically the electron-emitting portion 3005 is formed by performing an energization process called the energization forming process for the conductive thin film 3004 before electron emission. According to the energization forming process, energization is performed by applying a constant DC voltage which increases at a very low rate of, e.g., 1 V/min., across the two ends of the conductive film 3004, so as to partially destroy or deform the conductive film 3004, thereby forming the electron-emitting portion 3005 with an electrically high resistor. Note that the destroyed or deformed part of the conductive thin film 3004 has a fissure. Upon application of an appropriate voltage to the conductive thin film 3004 after the energization forming process, electron emission is performed near the fissure.

The above surface-conduction type electron emitters are advantageous because they have a simple structure and can be easily manufactured. For this reason, many devices can be formed on a wide area. As disclosed in Japanese Patent Laid-Open No. 64-31332 filed by the present applicant, a method of arranging and driving a lot of devices has been studied.

Regarding applications of surface-conduction type electron emitters to, e.g., image forming apparatuses such as an image display apparatus and an image recording apparatus, charged beam sources and the like have been studied.

As an application to image display apparatuses, in particular, as disclosed in the U.S. Pat. No. 5,066,883 and Japanese Patent Laid-Open No. 2-257551 filed by the present applicant, an image display apparatus using the combination of a surface-conduction type electron emitter and a phosphor which emits light upon irradiation of an electron beam has been studied. This type of image display apparatus is expected to have more excellent characteristic than other conventional image display apparatuses. For example, in comparison with recent popular liquid crystal display apparatuses, the above display apparatus is superior in that it does not require a backlight since it is of a self-emission type and that it has a wide view angle.

The present inventors have experimented on surface-conduction type electron emitters made of various materials, manufactured by various methods, and having various structures as well as the one described above. The present inventors have also studied multi-electron sources each constituted by an array of many surface-conduction type electron emitters, and image display apparatuses using the multi-electron sources.

The present inventors have experimentally manufactured a multi-electron source formed by an electrical wiring method like the one shown in FIG. 40. In this multi-electron source, a large number of surface-conduction type electron emitters are two-dimensionally arrayed and wired in the form of a matrix, as shown in FIG. 40.

Referring to FIG. 40, reference numeral 1002 denotes a surface-conduction type electron emitter which is schematically shown; 1003, a row wiring layer; and 1004, a column wiring layer. In reality, the row and column wiring layers 1003 and 1004 have finite electric resistors. However, FIG.

40 shows these resistors as wiring resistors 4004 and 4005. The above wiring method will be referred to as simple matrix wiring.

For the sake of illustrative convenience, FIG. 40 shows a 6×6 matrix. However, the size of a matrix is not limited to this. For example, in a multi-electron source for an image display apparatus, a sufficient number of emitters for a desired image display operation are arrayed and wired.

In the multi-electron source having the surface-conduction type electron emitters wired in the form of a simple matrix, in order to output desired electron beams, proper electrical signals are applied to the row and column wiring layers 1003 and 1004. For example, in order to drive the surface-conduction type electron emitters on an arbitrary row in the matrix, a selection voltage Vs is applied to the row wiring layer 1003 on a selected row, and at the same time, a non-selection voltage Vns is applied to each row wiring layer 1003 on the non-selected rows. A drive voltage Ve is applied to each column wiring layer 1004 in synchronism with the selection voltage Vs. According to this method, ignoring voltage drops across wiring resistors 4004 and 4005, a voltage Ve−Vs is applied to each surface-conduction type electron emitter on the selected row, whereas a voltage Ve−Vns is applied to each surface-conduction type electron emitter on the non-selected rows. If, therefore, the voltages Ve, Vs, and Vns are set to proper voltages, an electron beam having a desired intensity should be output from each surface-conduction type electron emitter on only a selected row. In addition, if different drive voltages Ve are applied to the respective column wiring layers, electron beams having different intensities should be output from the respective emitters on a selected row. Since the response speed of each surface-conduction type electron emitter is high, the length of time that an electron beam is kept output should be changed if the length of time that the drive voltage Ve is kept applied is changed.

Various applications of such a multi-electron source having surface-conduction type electron emitters wired in the form of a simple matrix have therefore been studied. For example, this electron source is expected to be used in an image display apparatus which applies voltage signals in accordance with image information.

In practice, however, when the multi-electron source to which a voltage source is connected is driven by the above voltage application method, voltage drops occur across wiring resistors, resulting in variations in voltages effectively applied to the respective surface-conduction type electron emitters.

The first cause for variations in voltages applied to the respective emitters is that the respective surface-conduction type electron emitters in the simple matrix wiring structure have different wiring lengths (i.e., different wiring resistors).

The second cause is that voltage drops across the wiring resistors 4004 in the respective row wiring layers vary. This is because a current is shunted from the row wiring layer on a selected row to the respective surface-conduction type electron emitters connected thereto so as to cause nonuniform currents to flow in the respective wiring resistors 4004.

The third cause is that the magnitude of a voltage drop across a wiring resistor changes depending on the driving pattern (the image pattern to be displayed in the case of an image display apparatus). This is because a current flowing in a wiring resistor changes depending on the driving pattern.

If the voltages applied to the respective surface-conduction type electron emitters vary due to the above causes, the intensity of an electron beam output from each surface-conduction type electron emitter deviates from a desired value, posing a problem in practical use. For example, when the electron source is applied to an image display apparatus, the luminance of the displayed image becomes nonuniform, or variations in luminance occur depending on the display image pattern.

In addition, variations in voltage tend to increase with an increase in the size of a simple matrix. This tendency is a factor that limits the number of pixels in an image display apparatus.

In the process of studying such techniques in consideration of the above problems, the present inventors have already experimented on a driving method different from the above voltage application method.

In this method, when a multi-electron source having surface-conduction type electron emitters wired in the form of a simple matrix is to be driven, a current source for supplying currents required to output desired electron beams is connected to the column wiring layers, instead of connecting a voltage source for applying the drive voltage Ve to each column wiring layer, so as to drive the multi-electron source. This method was devised in consideration of the strong correlation between the current (to be referred to as an emitter current If hereinafter) flowing in each surface-conduction type electron emitter and the electron beam (to be referred to as an emission current Ie hereinafter) emitted from each emitter. In the method, the magnitude of the emission current Ie is controlled by limiting the magnitude of the emitter current If.

That is, the magnitude of the emitter current If to be supplied to each surface-conduction type electron emitter is determined by referring to the (emitter current If) to (emission current Ie) characteristics of each surface-conduction type electron emitter, and the emitter current If is supplied from the current source connected to each column wiring layer. More specifically, a driving circuit may be constituted by a combination of electric circuits such as a memory storing the (emitter current If) to (emission current Ie) characteristics, an arithmetic unit for determining the emitter current If to be supplied, and a controlled current source. As the controlled current source, a circuit form for temporarily converting the magnitude of the emitter current If to be supplied into a voltage signal, and converting the signal into a current using a voltage/current conversion circuit may be used.

This method is less susceptible to voltage drops across wiring resistors than the above method of driving the multi-electron source using the voltage source connected to each column wiring layer. It was found therefore that this method could reduce variations in the intensity of an electron beam to be output.

However, the following problem is posed in the method of driving the electron source using the current source connected thereto.

This problem will be described with reference to FIGS. 41 and 42.

FIG. 41 is a view for explaining the conventional driving method. FIG. 41 shows a plurality of electron-beam emitters 301 wired in the form of a matrix, and a driving circuit. FIG. 41 shows a case wherein electrons are emitted by driving the electron emitters on the Mth row of the plurality of electron emitters. In the following description, an electron emitter to be driven will be referred to as a selected emitter, and an electron emitter not to be driven will be referred to as a semi-selected emitter.

As shown in FIG. 41, when the emitters on the Mth row are to be driven, a voltage source Vs (for outputting, e.g., a voltage of −7 V) is connected to the row wiring layer on the Mth row, and the remaining row wiring layers are set to the ground level (e.g., 0 V). As is apparent from the polarity of the voltage source Vs, the row wiring layer on the Mth row to be driven is held at a low potential (−7 V) lower than 0 V.

A controlled current source 302 is connected to each column wiring layer, and a drive current is supplied from the controlled current source 302.

FIG. 42 is a circuit diagram showing the detailed arrangement of the controlled current source, which is a voltage/current conversion circuit of a current mirror scheme. Referring to FIG. 42, reference numeral 311 denotes an operational amplifier; 312, a resistor having a resistance of R ohms; 314 and 315, pnp transistors; 313, an npn transistor; and 316, a terminal to connect the current source to each column wiring layer. The following relationship is established between an output current Iout and an input voltage Vin in this circuit:

$$Iout=Vin/R$$

That is, the magnitude of the output current Iout can be controlled by changing the magnitude of the input voltage Vin.

The value of an emitter current Ifo which is required to obtain a desired emission current Ie from an electron emitter is determined in advance on the basis of the emission current Ie/emitter current If characteristics of the electron emitter, and the output current Iout from the controlled current source is controlled to be equal to the determined value of the emitter current Ifo.

However, part of the output current Iout from the controlled current source is shunted to a semi-selected emitter. This is because when the controlled current source outputs the current Ifo, the effective voltage at the terminal 316 becomes higher than the ground level.

As shown in FIG. 41, part of the current Iout is shunted to each semi-selected emitter, and the effective drive current Is flowing in a selected emitter becomes considerably lower than the current Iout. As the number of electron emitters wired in the form of a matrix increases, the magnitude of a current is shunted to each semi-selected emitter increases. As a result, the problem becomes more conspicuous. Assume that the current Iout is 1.5 mA, and a current Ihs flowing in each non-selected emitter is 0.001 mA. In this case, in a matrix having 1,000 rows, the sum total of currents Ihs becomes about 1 mA. That is, only Is=0.5 mA can be supplied to each selected emitter (Iout=Is+ΣIhs).

For this reason, when this driving method is applied to, e.g., an image display apparatus, in order to ensure the accuracy of luminance of the displayed image, the magnitude of the output current Iout from the controlled current source must be corrected to the sum of the current flowing to each semi-selected emitter and the current Ifo. When a correction circuit for this operation is added-to the apparatus, the size and manufacturing cost of the apparatus increase.

In addition, since currents flow to semi-selected emitters which emit no electrons, the power is wasted.

Even if the current controlled sources connected to the column wiring layers in the above driving circuit are replaced with controlled voltage sources, great voltage drops occur across wiring portions when currents flow in the semi-selected emitters. As a result, a drive voltage applied to each selected emitter drops, and the luminance of the displayed image decreases. For this reason, a correction circuit must be added to each controlled voltage source, resulting in increases in the size and manufacturing cost of the apparatus. In addition, the power is wasted in each semi-selected emitter.

SUMMARY OF THE INVENTION

The present invention has been made in consideration of the above conventional problems, and has as its object to provide a driving method for a multi-electron source having many electron emitters wired in the form of a matrix, which can cause the multi-electron source to accurately output an electron beam having a desired intensity without requiring any complicated correction means, and can reduce the power consumption of each semi-selected emitter. In other words, it is an object of the present invention to provide an image display apparatus using a driving circuit with excellent output accuracy and small power consumption at a low cost.

In addition, the above electron source is applied to an image display apparatus within the spirit and scope of the present invention. It is another object of the preset invention to provide a low-power-consumption, inexpensive image display apparatus which can accurately maintain the luminance of a formed image without requiring any complicated correction means.

In order to achieve the above objects, the present inventors have made efforts to obtain the following. There is provided a driving circuit for driving a multi-electron source having a plurality of electron emitters wired in the form of a matrix through a plurality of data wiring layers and a plurality of scanning wiring layers, comprising first driving means for applying a first voltage (Vs) to a scanning wiring layer to which an electron emitter which is to emit electrons is connected, and applying a second voltage (Vns) to a scanning wiring layer to which an electron emitter which is not to emit electrons is connected, and second driving means for applying a third voltage (Ve) to a data wiring layer to which an electron emitter which is to emit electrons is connected, and applying a fourth voltage (Vg) to a data wiring layer to which an electron emitter which is not to emit electrons is connected, wherein the second voltage (Vns) is substantially equal to the third voltage (Ve). In this case, it is preferable that the second voltage (Vns) be substantially equal to the third voltage (Ve) within a range defined by upper and lower limits of variations in the third voltage (Ve) at the respective data wiring layers. The first and second voltages (Vs, Vns) applied to the scanning wiring layers are preferably based on a scanning signal for selecting each row. Preferably, this circuit further comprises means for generating a modulation signal based on a image signal. The third and fourth voltages (Ve, Vg) applied to the data wiring layers are preferably based on a modulation signal for driving the electron emitters connected to each column. The modulation may be pulse-width modulation or amplitude modulation. The electron emitter is preferably a surface-conduction type electron emitter having a nonlinear characteristic including a threshold voltage point Vth as a boundary point between electron emission and non-electron emission in a relationship between a voltage applied to a pair of emitter electrodes and a corresponding electron emission amount. Both a potential difference between the second voltage (Vns) and the fourth voltage (Vg) and a potential difference between the fourth voltage (Vg) and the first voltage (Vs) are smaller than a value of the threshold voltage point Vth. The first and second voltages (Vs, Vns) are preferably generated by using a push-pull structure. The second driving means further comprises storage means for storing values of emitter currents flowing in the electron emitters and correction values for correcting input/output efficiency variations of the electron emitters, and can generate the third and fourth voltages (Ve, Vg) on the basis of the correction values stored in the storage means and the modulation signal. The second driving means preferably comprises a controlled current source connected to the data wiring layer, and current-drives the multi-electron source. An image display apparatus of the present invention comprises light-emitting means for emitting light upon reception of electrons emitted from a multi-electron source having a plurality of electron emitters wired in the form of a matrix through a plurality of data wiring layers and a plurality of scanning wiring layers.

The present invention includes an electron generating device and a driving method for an image display apparatus. There is provided a method of driving an electron generating device comprising a multi-electron source having a plurality of electron emitters wired in the form of a matrix through a plurality of data wiring layers and a plurality of scanning wiring layers, and a driving circuit for driving the multi-electron source, comprising the steps of applying a first voltage (Vs) to a scanning wiring layer to which an electron emitter which is to emit electrons is connected, applying a second voltage (Vns) to a scanning wiring layer to which an electron emitter which is not to emit electrons is connected, applying a third voltage (Ve) to a data wiring layer to which an electron emitter which is to emit electrons is connected, and applying a fourth voltage (Vg) to a data wiring layer to which an electron emitter which is not to emit electrons is connected, wherein the second voltage (Vns) is substantially equal to the third voltage (Ve). In this case, it is preferable that the second voltage (Vns) be substantially equal to the third voltage (Ve) within a range defined by upper and lower limits of variations in the third voltage (Ve) at the respective data wiring layers. The first and second voltages (Vs, Vns) applied to the scanning wiring layers are preferably based on a scanning signal for selecting each row. Preferably, the method further comprises modulation means for generating a modulation signal based on a image signal. The third and fourth voltages (Ve, Vg) applied to the data wiring layers are preferably based on a modulation signal for driving the electron emitters connected to each column. The modulation may be pulse-width modulation or amplitude modulation. An image display apparatus driving method of the present invention is characterized by using the electron generating device driving method for an image display apparatus having light-emitting means for emitting light upon reception of electrons emitted from an electron generating device.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 1 is a circuit diagram showing a multi-electron source and a driving circuit according to the first embodiment of the present invention;

DETAILED DESCRIPTION OF THE PREFERRED EMBODIMENTS

Figure 2:
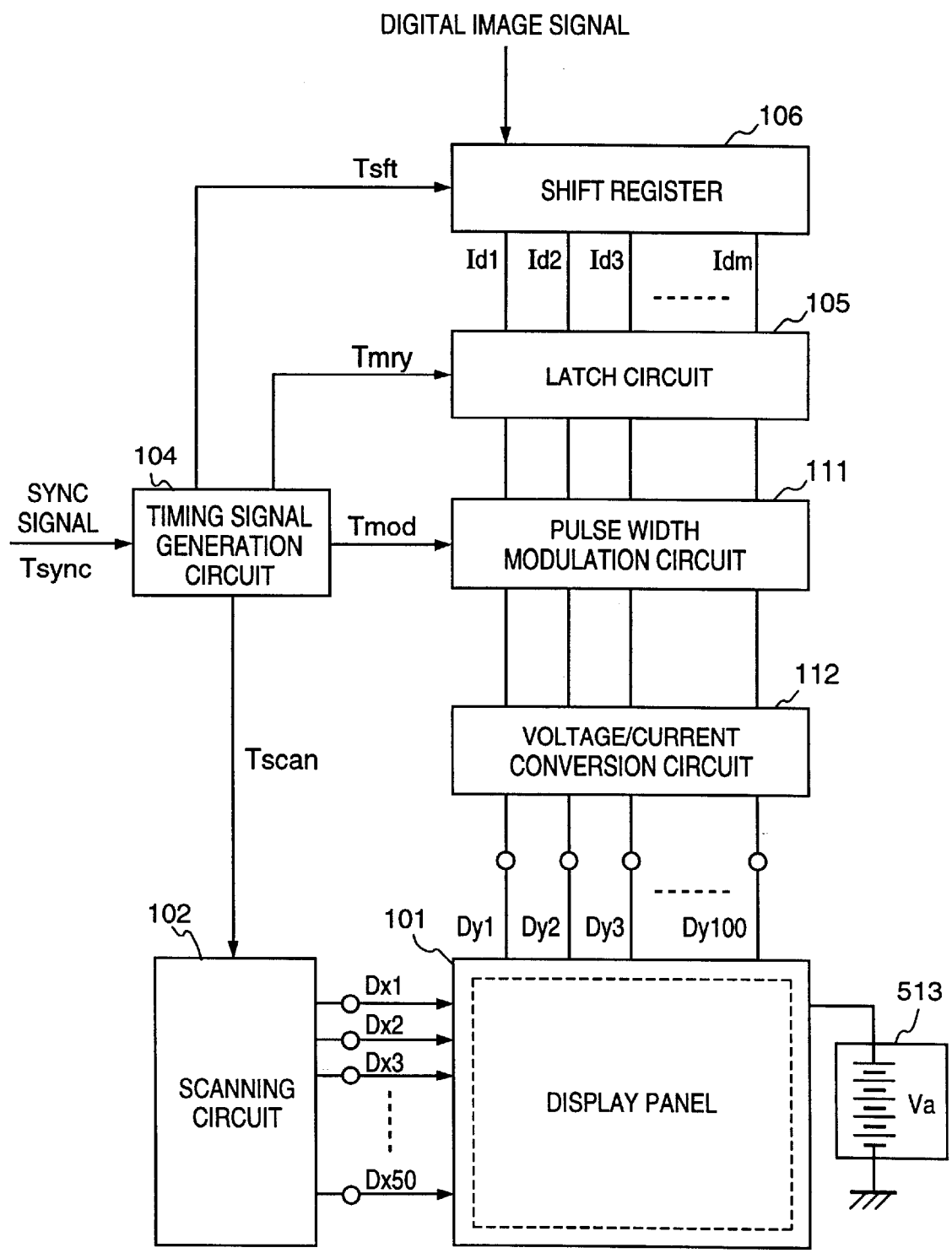
FIG. 2 is a block diagram showing a driving circuit for an image display apparatus according to the first embodiment.

The basic concept of the present invention is that when a multi-electron source having many electron emitters wired in the form of a matrix is to be driven, semi-selection currents flowing in the semi-selected emitters on each column to which a selected emitter is connected are greatly reduced to solve the conventional problems. More specifically, by reducing the current flowing in each semi-selected emitter to a substantially negligible value (preferably zero), a drive signal supplied from a driving circuit connected to each column wiring layer is applied to each selected emitter with almost no loss (preferably no loss).

For this purpose, a voltage Vns applied to a row wiring layer to which semi-selected emitters are connected is set to almost equal to a voltage Ve applied to a column wiring layer to which an emitter which is to emit electrons is connected. Although the voltage Vns is basically set to be equal to the voltage Ve, the expression "almost equal" is used because the definition of "equal" may be inadequate in some case.

If, for example, many electron emitters wired in the form of a matrix have uniform characteristics, and the electric resistance of the matrix wiring structure is very small, the same voltage Ve may be applied to any column wiring layers. In this case, the voltage Vns can be set to be equal to the voltage Ve.

If, however, the emitter voltage (Vg) to emission current (Ie) characteristics of the respective electron emitters exhibit large variations, or the electric resistance of the wiring structure is relatively large, the magnitude of the voltage Ve is preferably changed in units of column wiring layers to improve the accuracy of the electron emission amount. In this case, the voltage Ve changes for each column wiring layer, and hence a problem is posed in determining the voltage Vns. In such a case, the voltage Vns is set to be equal to the arithmetic or geometric mean of the voltages Ve applied to all the column wiring layers, or the voltage Ve at the column nearest to a driving circuit connected to the row wiring layers (i.e., the minimum value of Ve). In either case, to be precise, the voltage Ve is slightly different from the voltage Vns depending on the column of interest. The expression "almost equal" is used because the present invention includes such a form. In addition, when a controlled current source is connected to each column wiring layer to perform constant-current driving, the voltage Ve applied to each column wiring layer automatically changes. With such variations in Ve, the voltage Vns can be set by the above method or other methods. Instead of setting the voltage Vns to the mean of the voltages Ve applied to all the column wiring layer or the minimum value of Ve, the voltage value of Vns can be set by properly shifting the voltage Vns near the estimated value of Ve while monitoring the characteristics of the displayed image. In a current driving operation, since the voltage Ve applied to each column wiring layer changes with time depending on the row which is currently scanned, the above method of changing the voltage Vns near the estimated value of Ve to set the voltage Vns to a value by which good display characteristics can be obtained is also effective.

In the present invention, an image display operation is preferably performed by outputting a constant current or voltage to each column wiring layer with a time width corresponding to a desired luminance. That is, pulse-width modulation is preferable. However, amplitude modulation may be performed by outputting a current or voltage equivalent to the luminance. In amplitude modulation as well, the voltage Vns can be set to be equal to the mean of the voltages Ve to be modulated, or can be properly set between the maximum values of Vg and Ve.

If the Vg-Ie characteristics of the respective electron emitters exhibit great variations, or the electric resistance of the wiring structure is relatively large, the accuracy of the electron emission amount may be improved by changing the magnitude of the voltage Ve every time the row to be selected is changed. In this case, the voltage Vns can be changed in accordance with the voltage Ve applied to a selected row every time the row to be selected is switched.

In summary, one of the following four methods is preferably used to set the voltage Vns.

In the first method, the characteristics of an electric circuit are numerically analyzed to estimate the magnitude of Ve, and the voltage value of Vns is set in accordance with the estimated value.

The second method uses a means for monitoring the voltage Ve at each column wiring layer, and a variable voltage source capable of output control of the voltage Vns. In this method, while the voltage Ve is measured in an actual driving operation, feedback control is performed to make the output voltage Vns coincide with the measured value of Ve.

In the third method, the electron source is test-driven to measure the voltage Ve at each column wiring layer, and the voltage value of Vns is set on the basis of the measured value.

In the fourth method, the voltage value of Vns is properly shifted near the estimated value of Ve while the displayed image is monitored, and the voltage value of Vns is set to a value at which the displayed image exhibits high fidelity to an original image signal.

Figure 38:
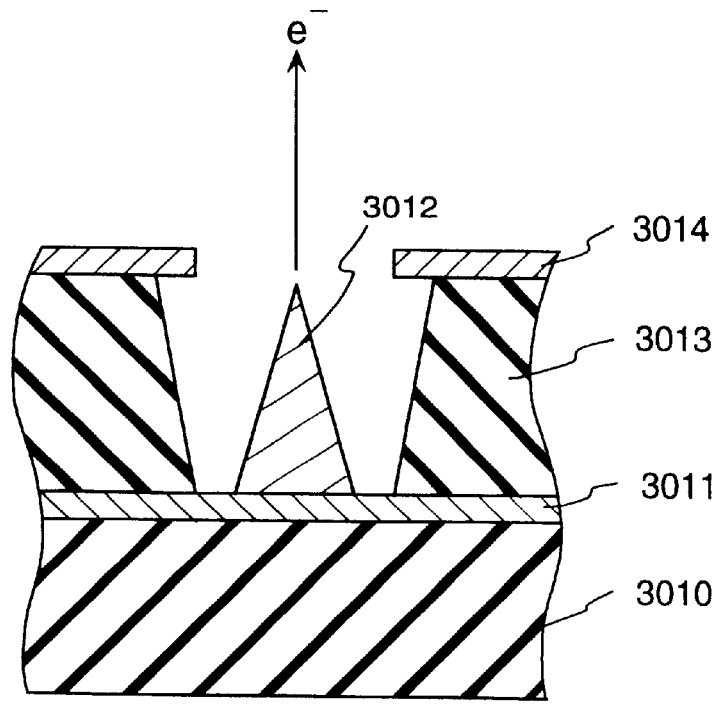
FIG. 38 is a sectional view showing a conventional field emitter.
Figure 39:
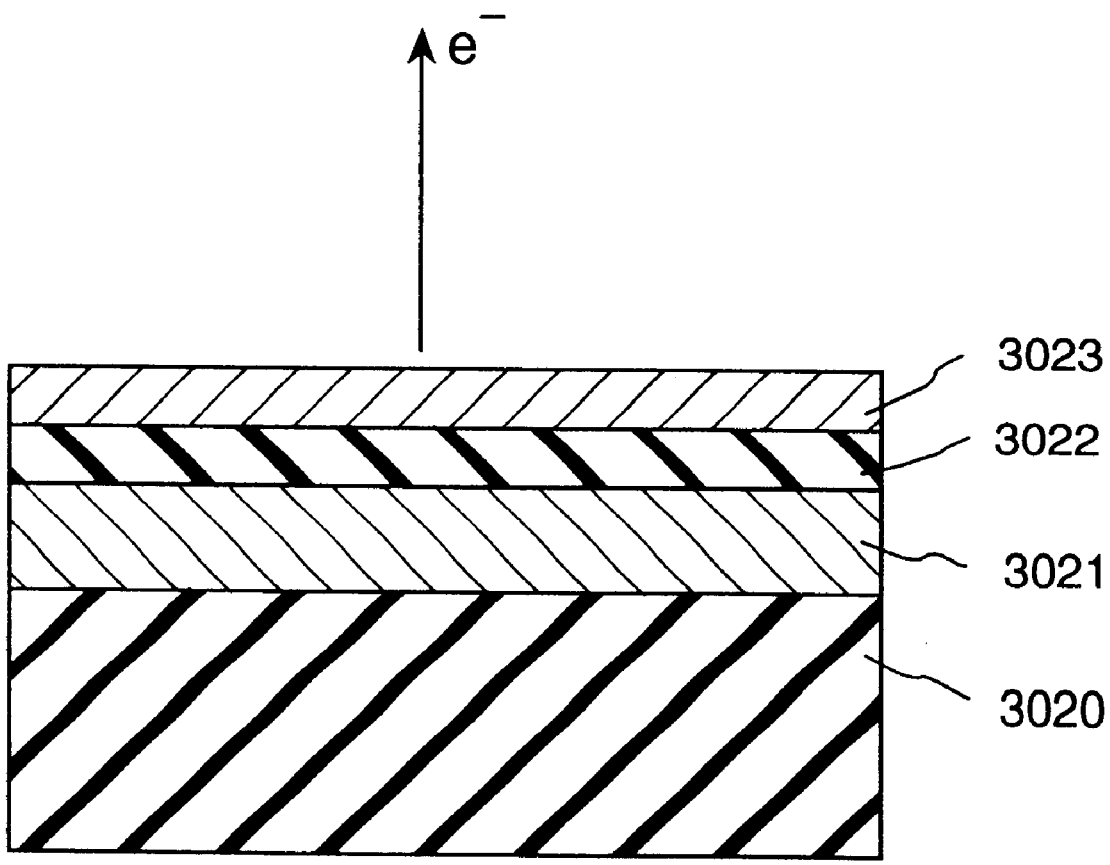
FIG. 39 is a sectional view showing a conventional MIM-type electron emitter.
Figure 40:
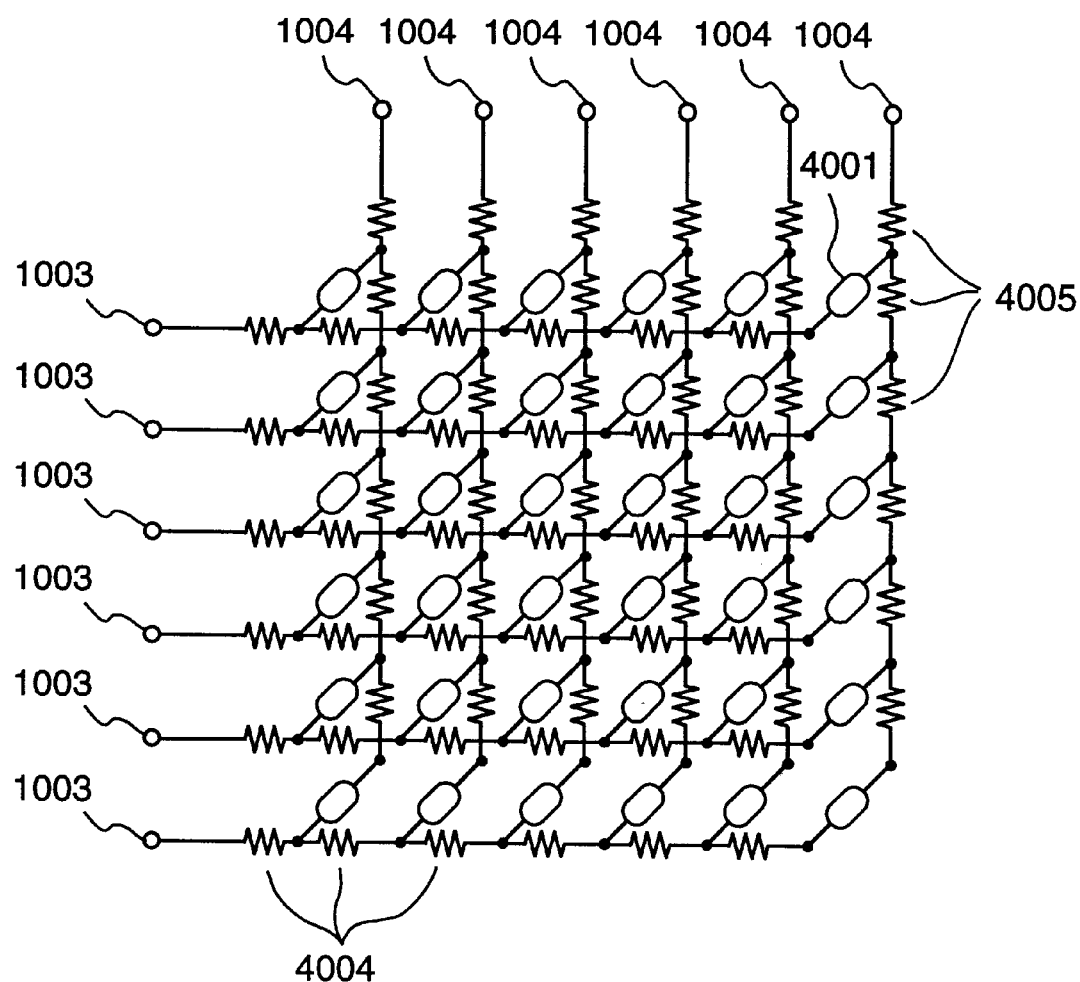
FIG. 40 is an equivalent circuit diagram of a multi-electron source having a simple matrix wiring structure.
Figure 41:
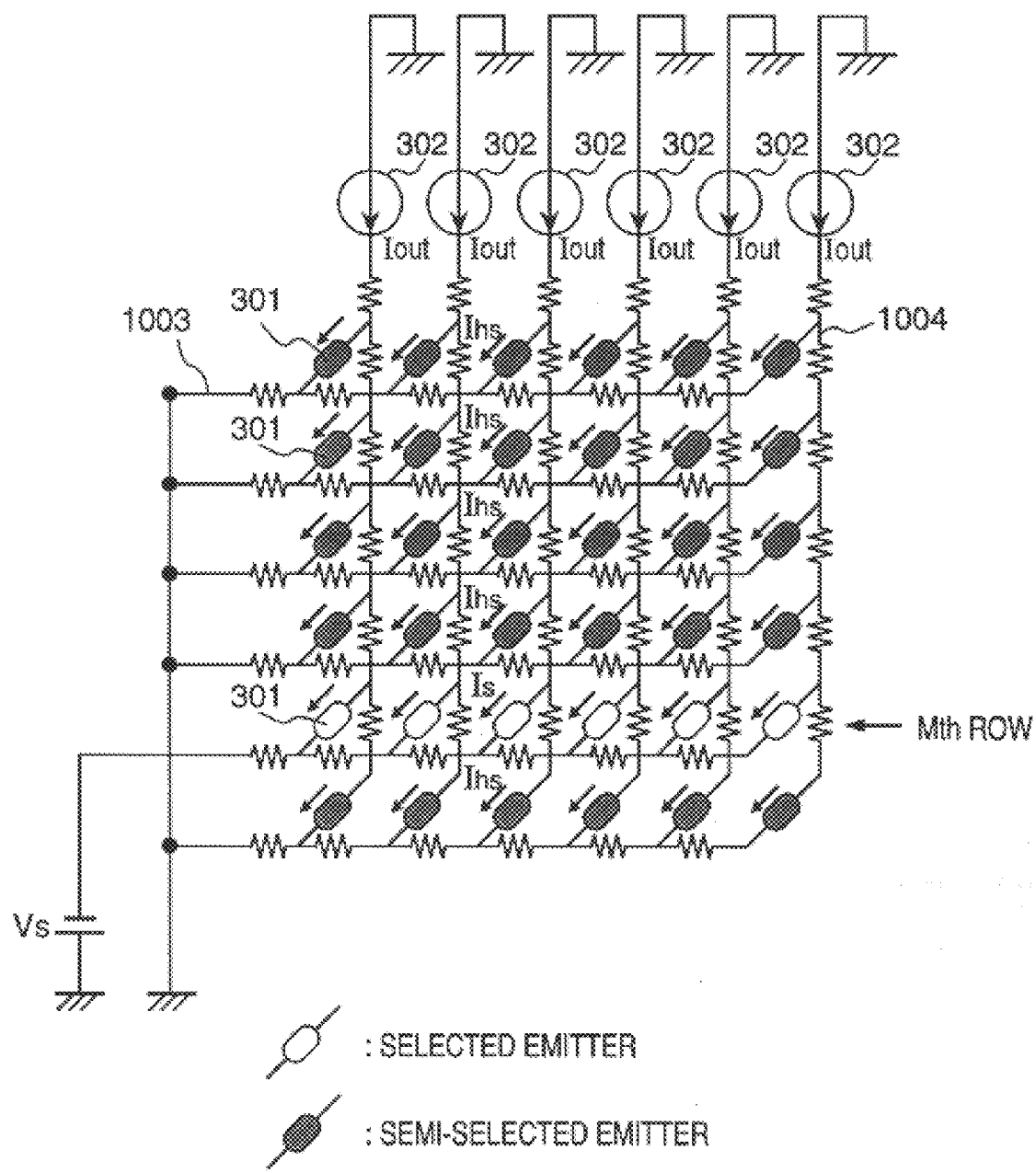
FIG. 41 is a circuit diagram showing the flows of currents in the multi-electron source.
Figure 42:
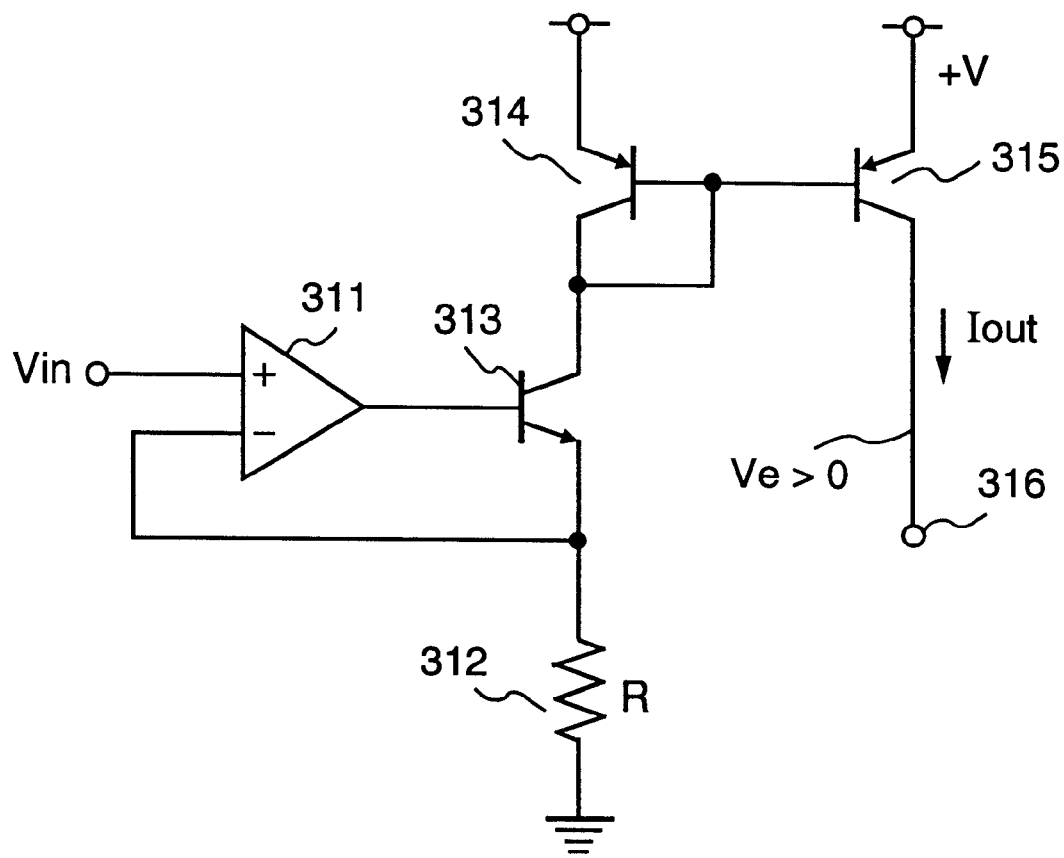
FIG. 42 is a circuit diagram showing a conventional V/I conversion circuit.

The present invention can be applied to either a constant-current driving operation in which a controlled current source is connected to each column wiring layer, or a constant-voltage driving operation in which a controlled voltage source is connected to each column wiring layer. Surface-conduction type electron emitters are preferably used in the present invention. However, the FE-type emitters described with reference to FIG. 38 or the MIM-type electron emitters described with reference to FIG. 39 may be used.

In all the embodiments to be described later, a driving circuit outputs a modulation signal to each column wiring layer as a data wiring layer, and a scanning signal to each row wiring layer as a scanning wiring layer. However, the present invention includes a form in which a scanning signal is output to each column wiring layer as a scanning wiring layer, and a modulation signal is output to each row wiring layer as a data wiring layer.

In all the embodiments to be described later, a modulation circuit has positive polarity, and a scanning circuit has negative polarity, so a current is flowed from the modulation circuit to each electron emitter. However, in the present invention, the modulation circuit and the scanning circuit may have negative polarity and positive polarity, respectively, so a current may be flowed from the scanning circuit to each electron emitter.

According to the present invention, in a multi-electron source having many electron emitters wired in the form of a matrix, currents flowing in electron emitters (semi-selected emitters) on a selected column other than the electron emitter to be driven can be greatly reduced. For this reason, a modulation signal supplied via the column wiring layer can be applied to the electron emitter to be driven with almost no loss. Therefore, an electron beam having a desired intensity can be easily and accurately output without using any complicated correction circuit like a conventional circuit for compensating for the current flowing in each semi-selected emitter. In addition, the power consumption of each semi-selected emitter is reduced. In other words, a low-power-consumption electron generating device with high output accuracy can be provided at a low cost.

Furthermore, with application of the above multi-electron source to an image display apparatus, there is provided a low-power-consumption, inexpensive image display apparatus which can maintain the accurate luminance of the formed image without requiring any complicated correction circuit.

First Embodiment

A driving method for a multi-electron source and an image display apparatus using the same have the following structure, as shown in, e.g., FIG. 1. FIG. 1 shows a case wherein the emitters (the hollow portions in FIG. 1) at the intersections of the fifth row and second, third, and fifth columns, of a large number of electron emitters wired in the form of a matrix, are caused to emit electrons.

This apparatus includes a multi-electron source 601 and a modulation circuit 602. The multi-electron source 601 has row and column wiring layers in the form of a simple matrix, with a pair of emitter electrodes of each surface-conduction type electron emitter being connected to row and column wiring layers near their intersection. The modulation circuit 602 generates predetermined current signals on the basis of a modulation signal, and drives surface-conduction type electron emitters through column wiring layers. The apparatus also includes a scanning circuit 603 for sequentially selecting the row wiring layers on the basis of a scanning signal Tscan. The scanning circuit 603 applies a potential Vs to a selected row wiring layer ($D_{x5}$ in FIG. 1), and applies a potential Vns to the non-selected row wiring layers (other than the row wiring layer $D_{x5}$ in FIG. 1). The modulation circuit 602 fixes the column wiring layers ($D_{y1}$, $D_{y4}$, and $D_{y6}$ in FIG. 1) to which the emitters which are not to emit electrons are connected to a potential Vg, and applies a potential Ve to the column wiring layers ($D_{y2}$, $D_{y3}$, and $D_{y5}$ in FIG. 1) to which the emitters which are to emit electrons are connected. In this case, the difference between the potentials Ve and Vs is set to obtain a desired amount of electrons emitted, and both the differences between the potentials Vns and Vg and between the potentials Vg and Vs are set to be smaller than a threshold Vth at which electron emission takes place. In the present invention, the potentials Vns and Ve are set to be equal to each other.

For the sake of convenience, FIG. 1 shows a 6×6 matrix of emitters. In this embodiment, however, a 50 (row)×100 (column) matrix is manufactured. If a variable voltage source is used as a voltage source for applying the potential Vns, the voltage can be finely adjusted.

According to this arrangement, a potential Ve–Vs is applied to each of the selected emitters on the row wiring layer to which the scanning signal is applied, of the emitters connected to the column wiring layers to which the selected emitters are connected, whereas a voltage Ve–Vns, i.e., 0 V, is applied to each of the semi-selected emitters, i.e., the emitters on the wiring layers to which no scanning signal is applied. As a result, all the currents injected into the second, third, and fifth column wiring layers flow to the emitters which are to emit electrons, but are not shunted to the semi-selected emitters. Since no correction is required for currents shunted to semi-selected emitters, a simple circuit can drive each emitter with a constant current. This is one of the advantageous points of this embodiment.

A driving method for an image display apparatus according to an embodiment of the present invention will be described next. The arrangement of the image display apparatus including surface-conduction type electron emitters will be described first with reference to FIG. 2. Referring to FIG. 2, reference numeral 101 denotes a display panel connected to an external electric circuit via terminals $D_{x1}$ to $D_{x50}$ and $D_{y1}$ to $D_{y100}$. The high-voltage terminal of the faceplate is connected to an external high-voltage source 513. A high voltage Va is applied to this high-voltage terminal to accelerate emission-electrons. A scanning signal for sequentially driving the multi-electron source in the above panel, i.e., the surface-conduction type electron emitters wired in the form of a 50 (row)×100 (column) matrix in units of rows is applied to each of the terminals $D_{x1}$ to $D_{x50}$.

Meanwhile, a modulation signal for controlling an output electron beam from each surface-conduction type electron emitter on a row selected by the scanning signal is applied to each of the terminals $D_{y1}$ to $D_{y100}$.

Figure 3:
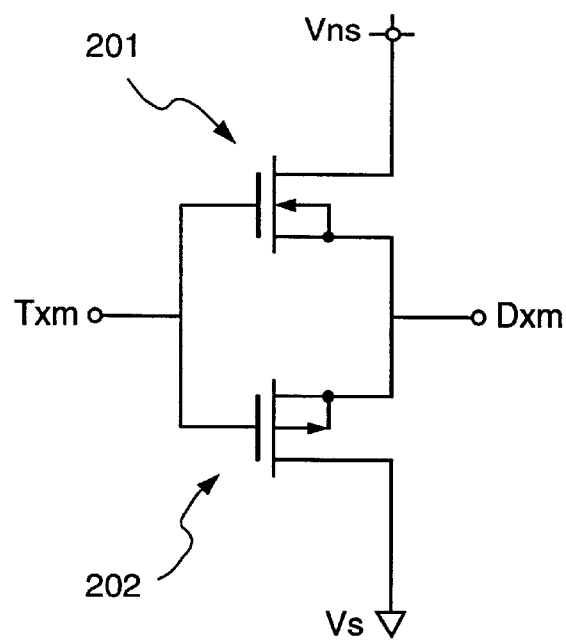
FIG. 3 is a circuit diagram showing the internal structure of a scanning circuit.
Figure 4:
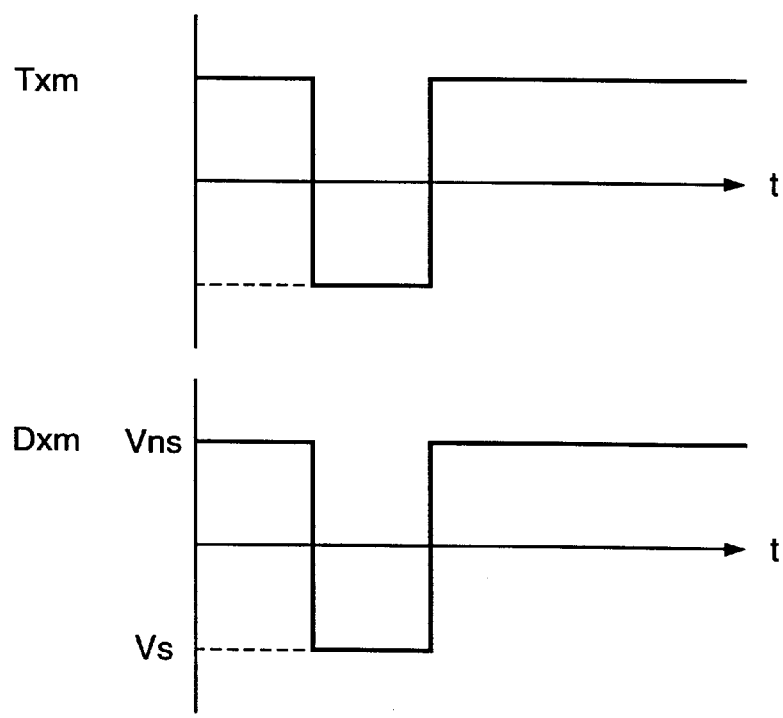
FIG. 4 is a timing chart showing the input/output characteristics of the circuit in FIG. 3.

A scanning circuit 102 will be described next. This circuit incorporates 50 switching elements. Each switching element selects one of the two output voltages Vs and Vns from the DC voltage source (not shown), and is electrically connected to the terminals $D_{x1}$ to $D_{x50}$ of the display panel 101. Each switching element operates on the basis of a control signal Tscan output from a timing signal generation circuit 104 (to be described later). In practice, for example, with a combination of switching elements such as FETs, each switching element can be easily realized by a push-pull structure like the one shown in FIG. 3. As shown in FIG. 4, an output Dxm is switched between two values, i.e., the potentials Vs and Vns in synchronism with a timing signal Txm generated from the control signal Tscan and corresponding to each row wiring layer.

Figure 5:
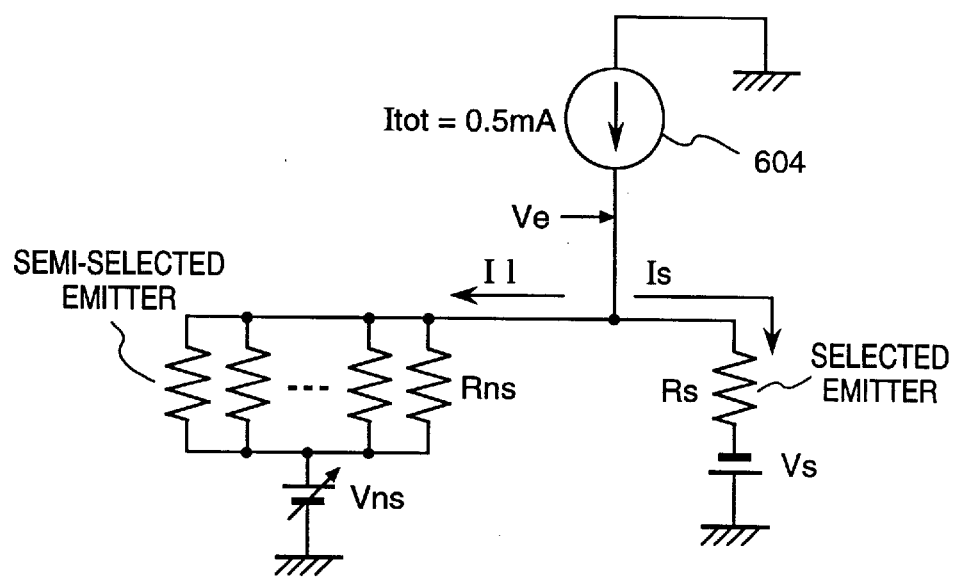
FIG. 5 is an equivalent circuit diagram showing the flows of currents.

Note that the above DC power supply voltage Vs is set to −7 V on the basis of the characteristics (an electron emission threshold voltage of 8 V) of a surface-conduction type electron emitter in FIG. 16 which will be described later. If the desired electron emission current is 1.0 μA, the current to be supplied to the emitter is 0.5 mA. FIG. 5 shows an equivalent circuit diagram of each driving power supply and a given column wiring layer as the column wiring layer of interest. An output current Itot from a controlled current source 604 is given by $$Itot = Is + I1 \quad (1)$$

where I1 is the current flowing in each semi-selected emitter. In addition, $$Ve = Vs + Is \cdot Rs \quad (2)$$
$$= Vns + I1 \cdot Rns$$

where Rns is the parallel resistance value of each semi-selected emitter. In this case, the potential Vns is determined such that Itot=Is, i.e., I1=0 in equation (1). According to equation (2), therefore, $$Vns = Vs + Is \cdot Rs \quad (3)$$

In this case, since the potential Vs is −7 V, and the emitter resistance Rs is 29 kΩ; and the current Is is 0.5 mA, the potential Vns is 7.5 V. A voltage of 14.5 V is therefore applied to the selected emitter. With these settings, a voltage of 0 V is applied to each semi-selected emitter on the column wiring layer to which the selected emitter is connected, and a voltage of 7 V or 7.5 V is applied to each emitter on each column wiring layer to which no selected emitter is connected. Both the applied voltages are lower than the electron emission threshold voltage.

The flow of an input image signal will be described with reference to FIG. 2. The input composite image signal is separated by a decoder into luminance signals of primary colors and horizontal and vertical sync signals HSYNC and VSYNC. The timing signal generation circuit 104 generates various timing signals synchronized with the horizontal and vertical sync signals HSYNC and VSYNC. The R, G. and B luminance signals are sampled by an S/H circuit or the like at a proper timing. The held signals are converted by a shift register circuit 106 into parallel image signals, in units of rows, which are arranged in the order corresponding to the arrangement of the respective phosphors of the image formation panel. The parallel image signals are then stored in a latch circuit 105.

The signals are converted by a pulse width modulation circuit 111 into pulse signals each having a pulse width corresponding to the image signal intensity. Each pulse signal is converted by a voltage/current conversion circuit 112 from a voltage amount to a current amount. In forming an image, each current output is supplied to a corresponding surface-conduction type electron emitter in the display panel 101 via one of the terminals $D_{y1}$ to $D_{y100}$ of the display panel. In the panel to which the current output pulse is supplied, only the surface-conduction type electron emitter connected to a row selected by the scanning circuit 102 emits electrons for a period of time corresponding to the pulse width of the supplied pulse signal, thereby causing a corresponding phosphor to emit light. When the scanning circuit 102 sequentially scans selected rows, a two-dimensional image is formed.

Figure 6:
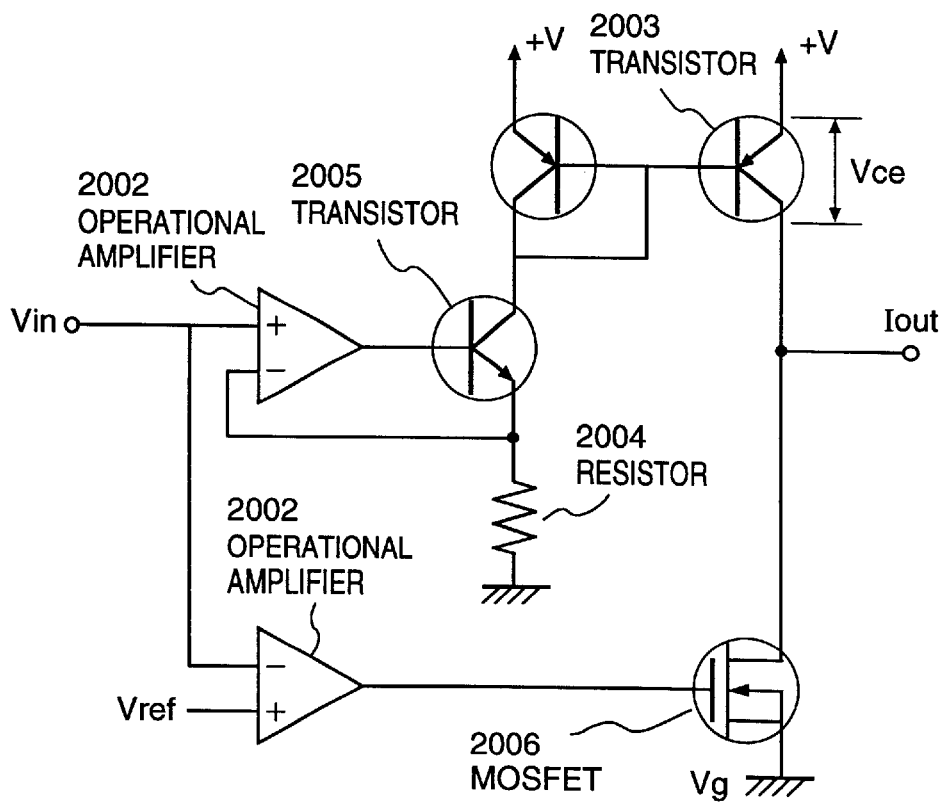
FIG. 6 is a circuit diagram of a modulation circuit used in the first embodiment.

The voltage/current conversion-circuit 112 will be described next. The voltage/current conversion circuit 112 is a circuit for controlling the current flowed to each surface-conduction type electron emitter in accordance with the amplitude of an input voltage signal. The voltage/current conversion circuit 112 has voltage/current converters equal in number to the column wiring layers. The outputs of the voltage/current converters are respectively connected to the terminals $D_{y1}$, $D_{y2}$, $D_{y3}$, . . . , $D_{y100}$ of the display panel. Each voltage/current converter is constituted by a constant-current circuit based on a current mirror circuit like the one shown in FIG. 6. Referring to FIG. 6, reference numeral 2002 denotes an operational amplifier; 2005, an npn transistor; 2003, a pnp transistor; 2006, a MOSFET; and 2004, a resistor (resistance value R). Assume that a power supply voltage +V in FIG. 6 is set to a potential obtained by adding a potential Vce of the pnp transistor 2003 to the maximum voltage applied to a column wiring layer. In this embodiment, +V=10 V. According to the circuit shown in FIG. 6, a current Iout to be output is determined in accordance with the amplitude of an input voltage signal Vin, and the amplitude and the current have the following relationship:

$$Iout = Vin/Rtm \quad (4)$$

By setting proper design parameters for the voltage/current conversion circuit, the current Iout flowed to each surface-conduction type electron emitter can be controlled in accordance with the voltage signal.

In the circuit shown in FIG. 6, when the input voltage is equal to or lower than Vref, the MOSFET 2006 is turned on, and the output voltage is set to Vg, i.e., the ground level. With this operation, the emitters on each column which are not to emit electrons are set in the semi-selected state regardless of whether the emitters are connected to selected or non-selected rows. In this embodiment, the voltage Vg applied to each column wiring layer which is not to emit electrons is set to the ground level (0 V). In general, however, the voltage Vg may be set almost between the voltages Vs and Vns.

Figure 7A:
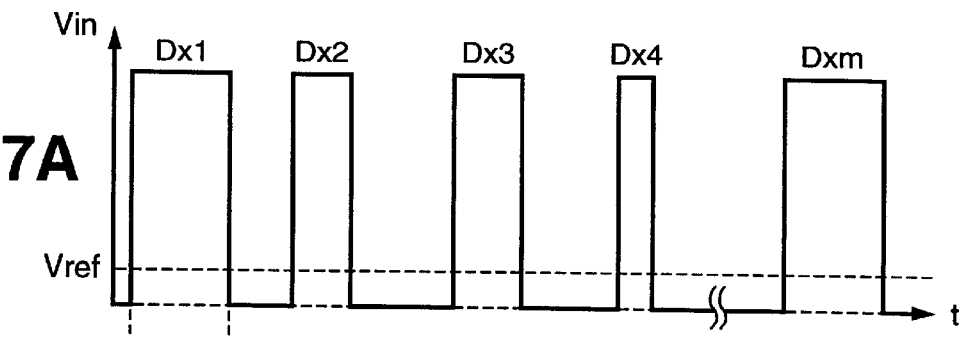
FIGS. 7A to 7D are timing charts showing the waveforms of signals.
Figure 7B:
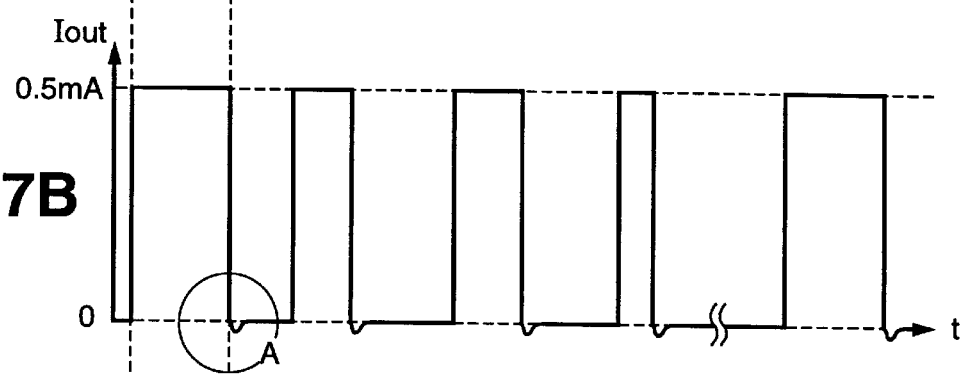
Figure 7C:
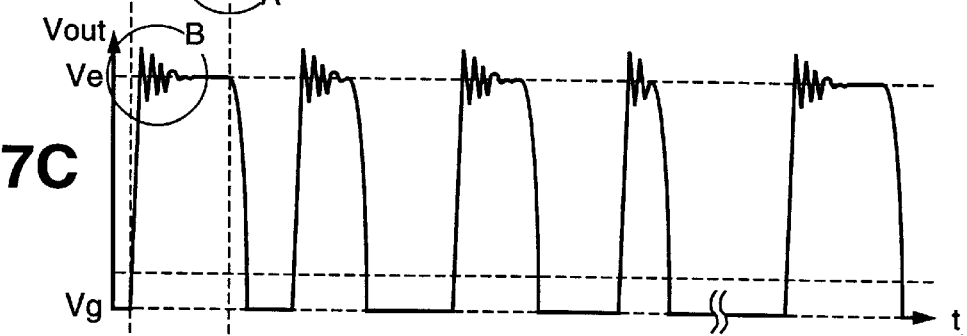
Figure 7D:
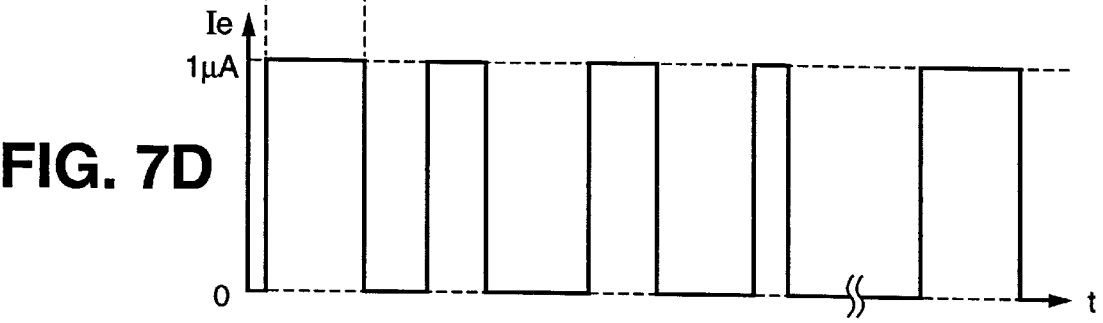

FIGS. 7A to 7D show how an input waveform from the modulation circuit is actually converted into a current waveform. Consider the column wiring layer $D_{y1}$ of the display panel. Assume that a voltage Vin like the one shown in FIG. 7A is input to the circuit in FIG. 6 to drive the emitters connected to row wiring layers $D_{x1}$, $D_{x2}$, $D_{x3}$, $D_{x4}$, . . . . In this case, each pulse width of this voltage pulse reflects luminance data, and the peak value of this voltage is set such that the output current Iout is 0.5 mA according to equation (1). As shown in FIG. 7B, the waveform of an output Iout from the voltage/current conversion circuit exhibits a peak value of 0.5 mA. Referring to FIG. 7B, reference symbol A denotes ringing caused by the capacitive component of the panel. An output voltage Vout from the voltage/current conversion circuit has a waveform like the one shown in FIG. 7C. The waveform of the output voltage Vout has blunt leading and trailing edges owing to the capacitive components of the panel, and ringing is caused by inductive components, as shown in FIG. 7B. The average of the final peak values of the respective pulses becomes Ve, i.e., 7.5 V. The dull portions and ringing of the voltage waveform are not associated with the gist of this embodiment, and hence will be neglected hereinafter. FIG. 7D shows the waveform of an emission current Ie obtained when the modulation circuit is driven under the above conditions. As shown in FIG. 7D, the emission currents from all the emitters are set to 1 $\mu$A.

According to this embodiment, the amount of current shunted to each semi-selected emitter can be reduced, and the output current from the modulation circuit can be made to coincide with the current flowing in a selected emitter. For this reason, an image can be displayed with luminances very faithful to an original image signal throughout the display screen. In addition, the power consumed by each semi-selected emitter can be reduced.

In this embodiment, as a voltage/current conversion circuit, the circuit having the arrangement shown in FIG. 6 is used. However, the present invention is not limited to this circuit arrangement, and any circuit may be used as long as it can modulate the current to be supplied to each surface-conduction type electron emitter in accordance with the input signal. If, for example, a large output current is required, the transistor portions may be connected in the form of a Darlignton amplifier.

(Arrangement of Display Panel and Manufacturing Method therefor)

The arrangement of the display panel of an image display apparatus to which this embodiment is applied, and a manufacturing method therefor will be described in detail below.

Figure 8:
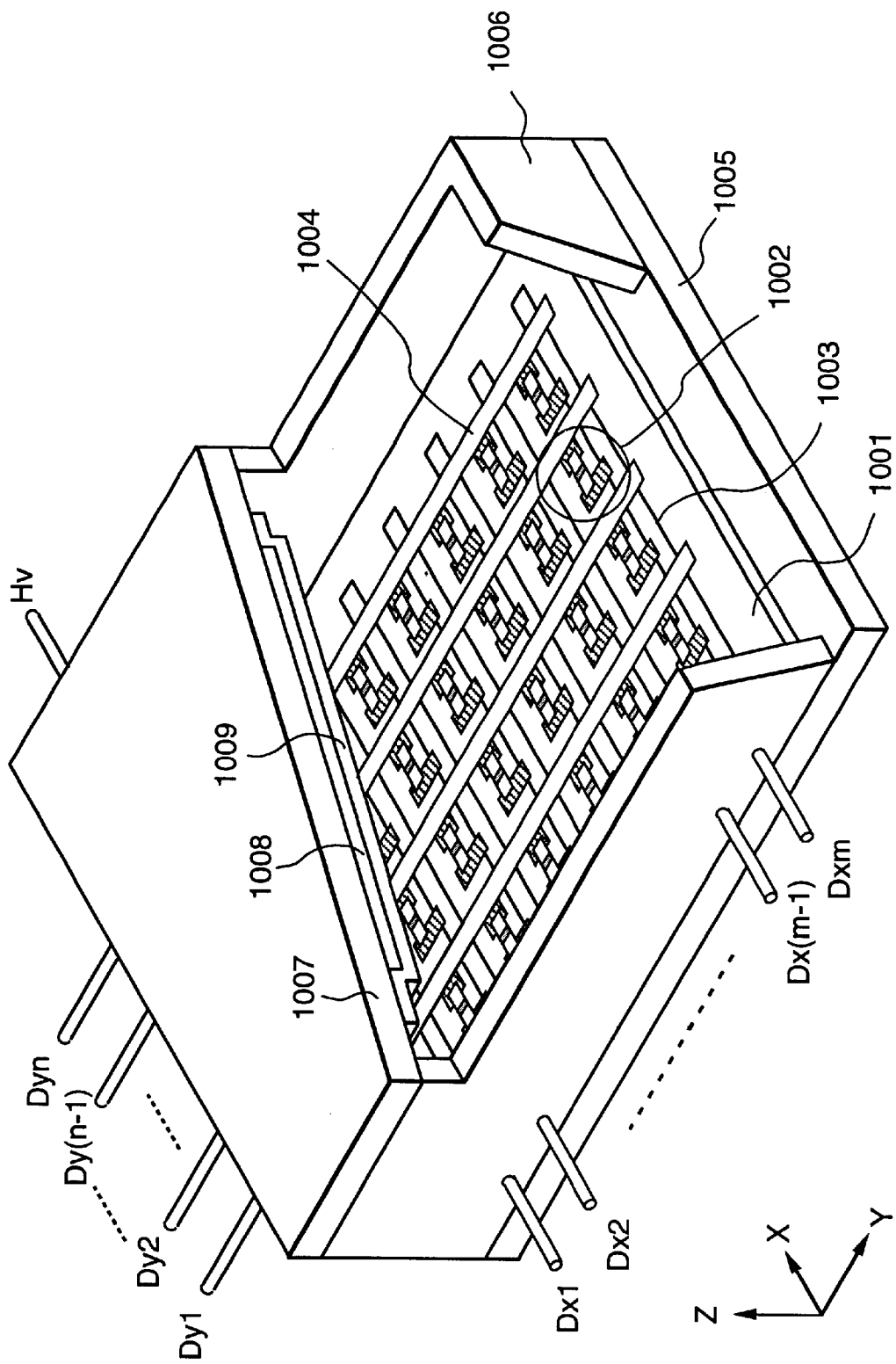
FIG. 8 is a perspective view showing the structure of a display panel.

FIG. 8 is a partially cutaway perspective view of the display panel used in this embodiment, showing the internal structure of the panel.

Referring to FIG. 8, reference numeral 1005 denotes a rear plate; 1006, a side wall; and 1007, a faceplate. These parts form an airtight envelope for maintaining a vacuum in the display panel. To construct the airtight envelope, it is necessary to seal the respective parts to allow their junction portions to hold a sufficient strength and airtight condition. For example, frit glass is applied to the junction portions, and sintered at 400 to 500° C. in air or a nitrogen atmosphere for 10 minutes or more, thereby sealing the parts. A method of evacuating the airtight envelope will be described later.

The rear plate 1005 has a substrate 1001 fixed thereon, on which N×M surface-conduction type electron emitters 1002 are formed (M, N=positive integer equal to 2 or more, approximately set in accordance with the objective number of display pixels. For example, in a display apparatus for high-definition television display, preferably N=3,000 or more, M=1,000 or more). The N×M surface-conduction type electron emitters are wired in the form of a simple matrix with M row wiring layers 1003 and N column wiring layers 1004. The portion constituted by these parts (1001 to 1004) will be referred to as a multi-electron source. Note that a manufacturing method and the structure of the multi-electron source will be described in detail later.

In this embodiment, the substrate 1001 of the multi-electron source is fixed to the rear plate 1005 of the airtight envelope. However, if the substrate 1001 has sufficient strength, the substrate 1001 of the multi-electron source itself may be used as the rear plate of the airtight envelope.

Figure 9A:
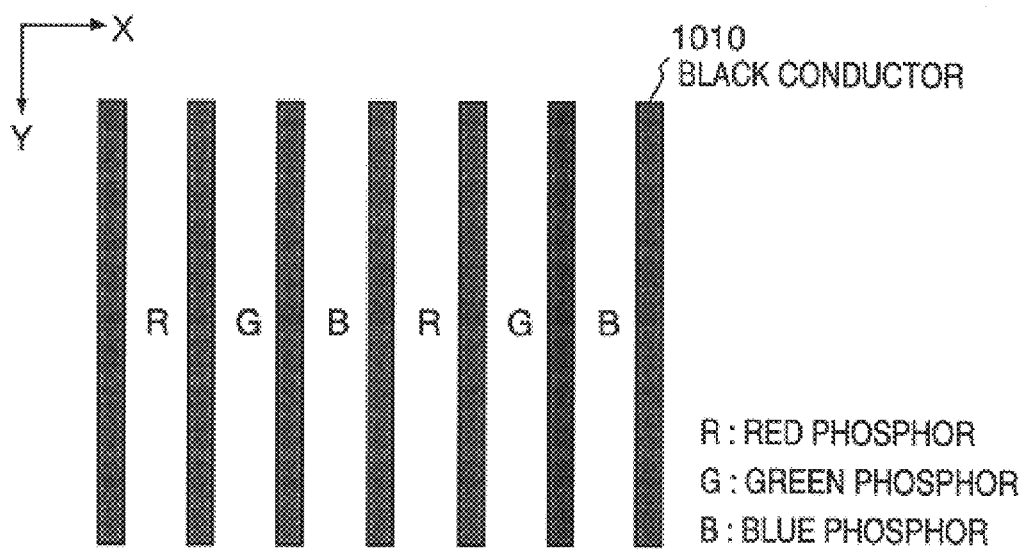
FIG. 9A is a view showing the arrangement of phosphors.

Furthermore, a phosphor film 1008 is formed on the lower surface of the faceplate 1007. As this embodiment is a color display apparatus, the phosphor film 1008 is coated with red, green, and blue phosphors, i.e., three primary color phosphors used in the CRT field. As shown in FIG. 9A, R, G, and B phosphors are arranged in the form of stripes. Black conductors 1010 are provided between the stripes of the phosphors. The purpose of providing the black conductors 1010 is to prevent display color misregistration even if the electron-beam irradiation position is shifted to some extent, to prevent degradation of the display contrast by shutting off reflection of external light, to prevent charge-up of the phosphor film by electron beams, and the like. The black conductor 1010 mainly consists of graphite, however, any other materials may be used as long as the above purpose can be attained.

Figure 9B:
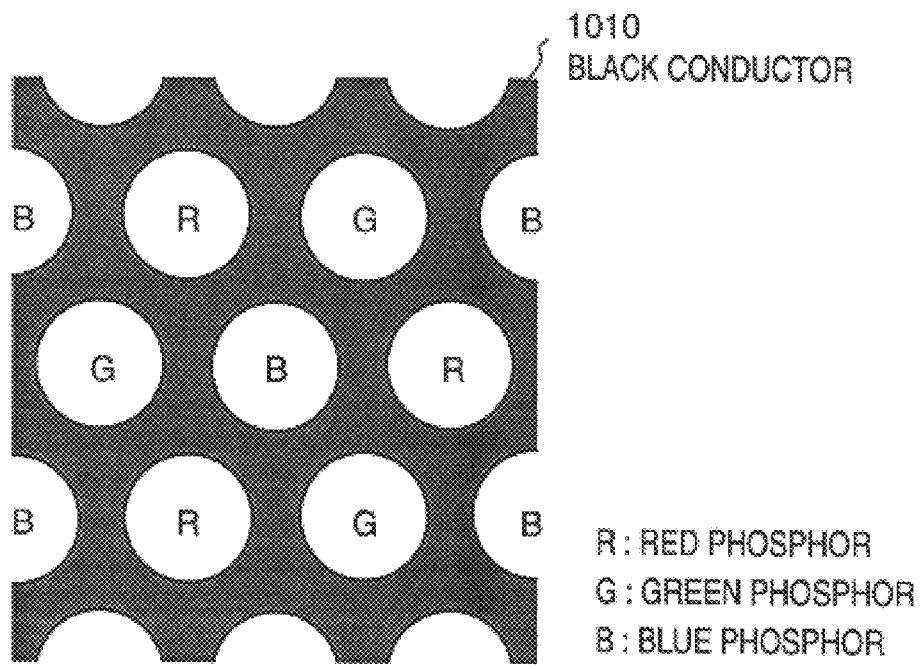
FIG. 9B is a view showing the arrangement of phosphors.

The arrangement of the three primary color phosphors is not limited to the stripe arrangement shown in FIG. 9A. For example, a delta arrangement like the one shown in FIG. 9B or other arrangements may be used.

When a monochrome display panel is to be formed, a monochrome phosphor material may be used for the phosphor film 1008, and a black conductive material need not always be used.

Furthermore, a metal back 1009, which is well-known in the CRT field, is provided on the rear-plate-side surface of the phosphor film 1008. The purpose of providing the metal back 1009 is to improve the light-utilization ratio by mirror-reflecting part of light emitted from the phosphor film 1008, to protect the phosphor film 1008 from bombardment of negative ions, to use the metal back 1009 as an electrode for applying an electron-beam accelerating voltage, to use the metal back 1009 as a conductive path for electrons which excited the phosphor film 1008, and the like. The metal back 1009 is formed by forming the phosphor film 1008 on the faceplate 1007, smoothing the front surface of the phosphor film, and depositing Al thereon by vacuum deposition. Note that when a phosphor material for a low voltage is used for the phosphor film 1008, the metal back 1009 is not used.

Furthermore, for application of an accelerating voltage or improvement of the conductivity of the phosphor film, transparent electrodes made of, e.g., ITO may be provided between the faceplate 1007 and the phosphor film 1008.

Referring to FIG. 8, reference symbols $D_{x1}$ to $D_{xM}$, $D_{y1}$ to $D_{yN}$, and $H_v$ denote electric connection terminals for an airtight structure provided to electrically connect the display panel to the electric circuit (not shown). The terminal $D_{x1}$ to $D_{xM}$ are electrically connected to the row wiring layers 1003 of the multi-electron source; the terminals $D_{y1}$ to $D_{yN}$, to the column wiring layers 1004; and the terminal Hv, to the metal back 1009 of the faceplate 1007.

To evacuate the airtight envelope, after forming the airtight envelope, an exhaust pipe and a vacuum pump (neither are shown) are connected, and the airtight envelope is evacuated to a vacuum of about $10^{-7}$ Torr. Thereafter, the exhaust pipe is sealed. To maintain the vacuum in the airtight envelope, a gettering film (not shown) is formed at a predetermined position in the airtight envelope immediately before/after the sealing. The gettering film is a film formed by heating and evaporating a Bettering material mainly consisting of, e.g., Ba, by heating or RF heating. The adsorption effect of the gettering film maintains a vacuum of $1 \times 10^{-5}$ or $1 \times 10^{-7}$ Torr in the envelope.

The basic arrangement of the display panel of this embodiment and a manufacturing method therefor have been described above.

A method of manufacturing the multi-electron source used in the display panel according to this embodiment will be described next. In manufacturing the multi-electron source used in the image display apparatus of the embodiment, any material, shape, and manufacturing method for a surface-conduction type electron emitter may be employed so long as it is for manufacturing an electron source having surface-conduction type electron emitters wired in the form of a simple matrix. However, the present inventors have found that among the surface-conduction type electron emitters, an emitter having an electron-emitting portion or its peripheral portion consisting of a fine particle film is excellent in electron-emitting characteristic and can be easily manufactured. Accordingly, such an emitter is the most appropriate-emitter to be used for the multi-electron source of a high-luminance, large-screen image display apparatus. In the display panel of this embodiment, surface-conduction type electron emitters each having an electron-emitting portion or its peripheral portion made of a fine particle film are used. First, the basic structure, manufacturing method, and characteristic of the preferred surface-conduction type electron emitter will be described, and the structure of the multi-electron source having many emitters wired in a simple matrix will be described later.

(Structure Suitable for Surface-conduction Type Electron Emitter and Manufacturing Method therefor)

The typical structure of the surface-conduction type electron emitter having an electron-emitting portion or its peripheral portion made of a fine particle film includes a flat type structure and a stepped type structure.

(Flat Surface-conduction Type Electron emitter)

Figure 10A:
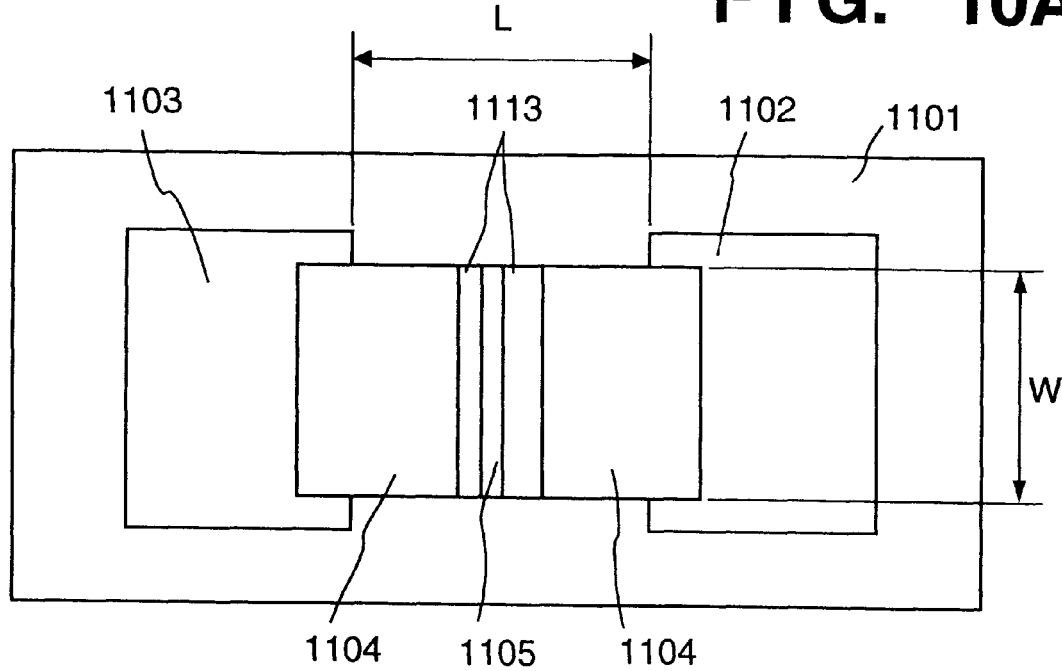
FIG. 10A is a plan view showing the structure of a flat surface-conduction type electron emitter.
Figure 10B:
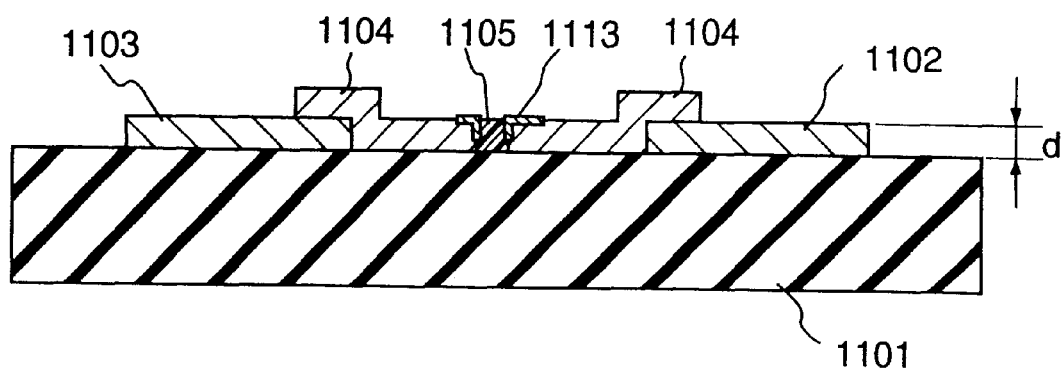
FIG. 10B is a sectional view showing the structure of the flat surface-conduction type electron emitter.

First, the structure of a flat surface-conduction type electron emitter and its manufacturing method will be described. FIG. 10A is a plan view for explaining the structure of the flat surface-conduction type electron emitter; and FIG. 10B, a cross-sectional view of the emitter. Referring to FIGS. 10A and 10B, reference numeral 1101 denotes a substrate; 1102 and 1103, emitter electrodes; 1104, a conductive thin film; 1105, an electron-emitting portion formed by a energization forming process; and 1113, a thin film formed by an activation process.

As the substrate 1101, various glass substrates of, e.g., quartz glass and soda-lime glass, various ceramic substrates of, e.g., alumina, or any of those substrates with an insulating layer consisting of, e.g., $SiO_2$ and formed thereon can be employed.

The emitter electrodes 1102 and 1103 formed on the substrate 1101 to be parallel to its surface and oppose each other are made of a conductive material. For example, one of the following materials may be selected and used: metals such as Ni, Cr, Au, Mo, W, Pt, Ti, Cu, Pd, and Ag, alloys of these materials, metal oxides such as $In_2O_3$—$SnO_2$, and semiconductors such as polysilicon. These electrodes can be easily formed by the combination of a film-forming technique such as vacuum deposition and a patterning technique such as photolithography or etching, however, any other method (e.g., a printing technique) may be employed.

The shape of the electrodes 1102 and 1103 is appropriately designed in accordance with an application purpose of the electron emitter. Generally, the shape is designed by setting an interval L between electrodes to be an appropriate value in the range from several hundred Å to several hundred μm. The most preferable range for a display apparatus is from several μm to several ten μm. As for an electrode thickness d, an appropriate value is generally selected from the range from several hundred Å to several μm.

The conductive thin film 1104 is made of a fine article film. The "fine particle film" is a film which contains a lot of fine particles (including island-like aggregates as constituent elements). Microscopic observation of the fine particle film will reveal that the individual particles in the film are spaced apart from each other, adjacent to each other, or overlap each other.

One particle has a diameter within the range from several Å to several thousand Å. Preferably, the diameter falls within the range from 10 Å to 200 Å. The thickness of the film is appropriately set in consideration of the following conditions: a condition necessary for electrical connection to the emitter electrode 1102 or 1103, a condition for the energization forming process to be described later, a condition for setting the electric resistance of the fine particle film itself to an appropriate value to be described later, and the like.

More specifically, the thickness of the film is set in the range from several Å to several thousand Å, more preferably, 10 Å to 500 Å.

For example, materials used for forming the fine particle film are metals such as Pd, Pt, Ru, Ag, Au, Ti, In, Cu, Cr, Fe, Zn, Sn, Ta, W, and Pb, oxides such as PdO, $SnO_2$, $In_2O_3$, PbO, and $Sb_2O_3$, borides such as $HfB_2$, $ZrB_2$, $LaB_6$, $CeB_6$, $YB_4$, and $GdB_4$, carbides such as TiC, Zrc, HfC, TaC, SiC, and WC, nitrides such as TiN, ZrN, and HfN, semiconductors such as Si and Ge, and carbon. An appropriate material is selected from these materials.

As described above, the conductive thin film 1104 is formed using a fine particle film, and the sheet resistance of the film is set to fall within the range from $10^3$ to $10^7$ Ω/sq.

As it is preferable that the conductive thin film 1104 is connected to the emitter electrodes 1102 and 1103 in an electrically good state, they are arranged so as to partly overlap each other. Referring to FIGS. 10A and 10B, the respective parts are stacked in the following order from the bottom: the substrate, the emitter electrodes, and the conductive thin film. This overlapping order may be: the substrate, the conductive thin film, and the emitter electrodes, from the bottom.

The electron-emitting portion 1105 is a fissure portion formed at a part of the conductive thin film 1104. The electron-emitting portion 1105 has a resistance higher than that of a peripheral conductive thin film. The fissure portion is formed by the energization forming process to be described later on the conductive thin film 1104. In some cases, particles, having a diameter of several Å to several hundreds Å, are arranged within the fissure portion. As it is difficult to exactly illustrate the actual position and shape of the electron-emitting portion, FIGS. 10A and 10B show the fissure portion schematically.

The thin film 1113, which consists of carbon or a carbon compound material, covers the electron-emitting portion 1105 and its peripheral portion. The thin film 1113 is formed by the activation process to be described later after the energization forming process.

The thin film 1113 is preferably made of monocrystalline graphite, polycrystalline graphite, amorphous carbon, or a mixture thereof, and its thickness is 500 Å or less, and more preferably 300 Å or less.

As it is difficult to exactly illustrate the actual position or shape of the thin film 1113, FIGS. 10A and 10B show the film schematically. FIG. 10A is a plan view showing the emitter in which a part of the thin film 1113 is removed.

The preferred basic emitter structure is described above. In the embodiment, the following emitter is used in this embodiment.

That is, the substrate 1101 consists of a soda-lime glass, and the emitter electrodes 1102 and 1103, an Ni thin film. The thickness d of the emitter electrodes is 1,000 Å and the electrode interval L is 2 μm.

As the main material for the fine particle film, Pd or PdO is used. The thickness and width W of the fine particle film are respectively set to about 100 Å and 100 µm.

A method of manufacturing a preferred flat surface-conduction type electron emitter will be described next. FIGS. 11A to 11E are sectional views for explaining the manufacturing process of a surface-conduction type electron emitter. Note that the same reference numerals denote the same parts as in FIG. 10A.

Figure 11A:
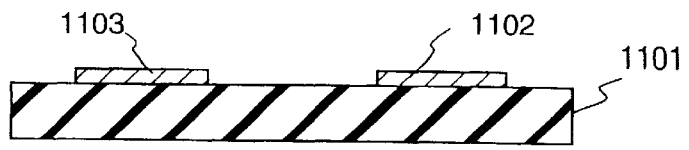
FIG. 11A is a sectional view showing a step in manufacturing the surface-conduction type electron emitter.

1) First, as shown in FIG. 11A, emitter electrodes 1102 and 1103 are formed on a substrate 1101.

In forming these electrodes, the substrate 1101 is fully cleaned with a detergent, pure water, and an organic solvent, and a material for the emitter electrodes is deposited on the substrate 1101. (As a depositing method, a vacuum film-forming technique such as deposition and sputtering may be used.) Thereafter, the deposited electrode material is patterned by a photolithographic etching technique. Thus, the pair of emitter electrodes 1102 and 1103 in FIG. 12A are formed.

Figure 11B:
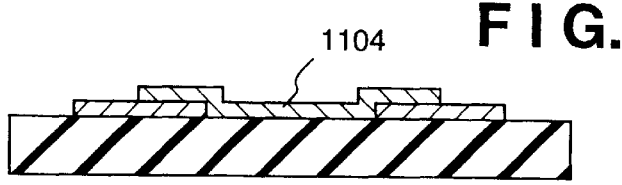
FIG. 11B is a sectional view showing a step in manufacturing the surface-conduction type electron emitter.

2) Next, as shown in FIG. 11B, a conductive thin film 1104 is formed. In forming the conductive thin film, an organic metal solution is applied to the substrate first, and the applied solution is then dried and sintered, thereby forming a fine particle film. Thereafter, the fine particle film is patterned into a predetermined shape by photolithographic etching. The organic metal solution means an organic metal compound solution containing a material for fine particles, used for the conductive thin film, as a main element. (More specifically, in this embodiment, Pd is used as the main element. In the embodiment, application of an organic metal solution is performed by the dipping method, however, the spinner method or spraying method may be employed.)

As a method of forming the conductive thin film made of fine particles, the application of an organic metal solution used in the embodiment can be replaced with any other method such as the vacuum deposition method, the sputtering method, or the chemical vapor deposition method.

3) As shown in FIG. 1C, an appropriate voltage is applied between the emitter electrodes 1102 and 1103, from a power supply 1110 for the energization forming process, and the energization forming process is performed to form an electron-emitting portion 1105.

The forming process is a process of performing electric energization of the conductive thin film 1104 made of a fine particle film to appropriately destroy, deform, or denature a part of the conductive thin film, thereby changing the film into a structure suitable for electron emission. In the conductive thin film, the portion changed into a structure suitable for electron emission (i.e., the electron-emitting portion 1105) has an appropriate fissure in the thin film. Comparing the thin film having the electron-emitting portion 1105 with the thin film before the energization forming process, the electric resistance measured between the emitter electrodes 1102 and 1103 has greatly increased.

Figure 12:
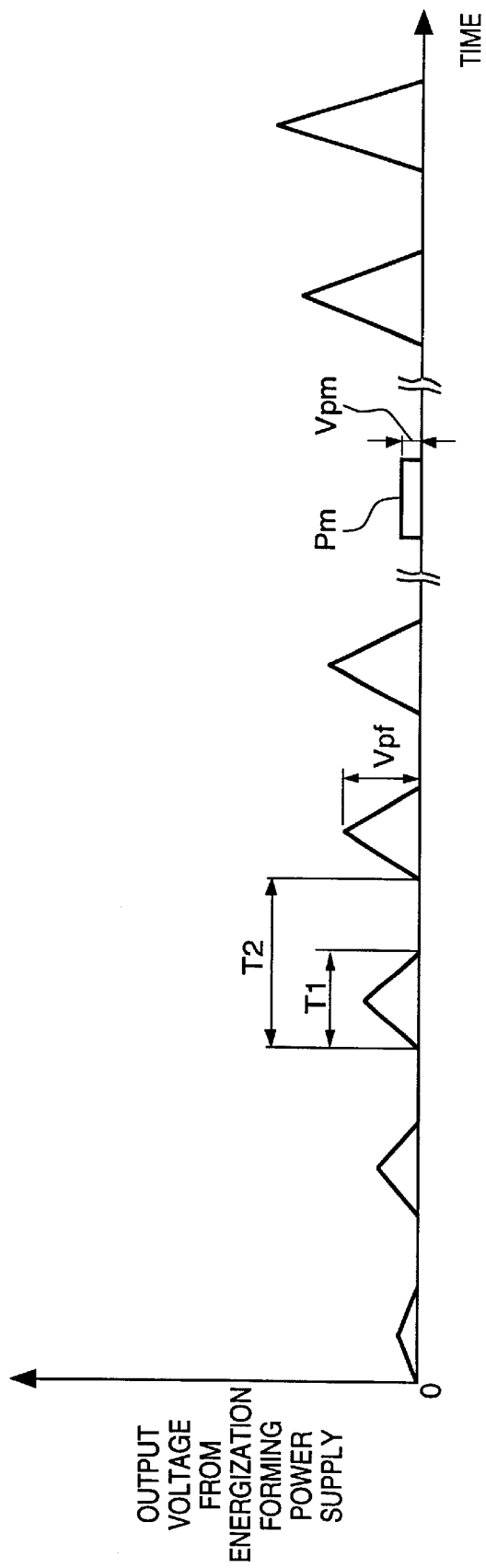
FIG. 12 is a graph showing the waveforms of voltages applied in a energization forming process.

An electric energization method will be described in detail with reference to FIG. 12 showing an example of the waveform of an appropriate voltage applied from the power supply 1110. In forming a conductive thin film made of a fine particle film, a pulse-like voltage is preferably used. In this embodiment, as shown in FIG. 12, a triangular pulse having a pulse width T1 is continuously applied at a pulse interval T2. In this case, a peak value Vpf of the triangular pulse is sequentially increased. Furthermore, a monitor pulse Pm is inserted between the triangular pulses at appropriate intervals to monitor the formed state of the electron-emitting portion 1105, and the current that flows upon insertion of the monitor pulse is measured by an ammeter 1111.

In this embodiment, for example, in a $10^{-5}$ Torr vacuum atmosphere, the pulse width T1 is set to 1 msec; and the pulse interval T2, to 10 msec. The peak value Vpf is increased by 0.1 V per pulse. Each time five triangular pulses are applied, one monitor pulse Pm is inserted. To avoid adverse effects on the energization forming process, a voltage Vpm of the monitor pulse Pm is set to 0.1 V. When the electric resistance between the emitter electrodes 1102 and 1103 becomes $1 \times 10^{-6}$ Ω, i.e., the current measured by the ammeter 1111 upon application of the monitor pulse becomes $1 \times 10^{-7}$ A or less, the energization for the forming process is terminated.

Note that the above method is preferable for the surface-conduction type electron emitter of this embodiment. In case of changing the design of the surface-conduction type electron emitter concerning, e.g., the material or thickness-of the fine particle film, or the emitter electrode interval L, the conditions for energization are preferably changed in accordance with the change in the emitter design.

4) As shown in FIG. 1D, an appropriate voltage is applied next, from an activation power supply 1112, between the emitter electrodes 1102 and 1103, and the activation process is performed to improve the electron-emitting characteristic.

The activation process here is a process of performing energization of the electron-emitting portion 1105, formed by the energization forming process, under appropriate conditions, to deposit carbon or a carbon compound around the electron-emitting portion 1105. (FIG. 11D shows the deposited material of carbon or a carbon compound as a material 1113.) Comparing the electron-emitting portion with that before the activation process, the emission current at the same applied voltage can be increased typically 100 times or more.

The activation process is performed by periodically applying a voltage pulse in a $10^{-4}$ to $10^{-5}$ Torr vacuum atmosphere to deposit carbon or a carbon compound mainly derived from an organic compound existing in the vacuum atmosphere. The deposition material 1113 is any of monocrystalline graphite, polycrystalline graphite, amorphous carbon, and a mixture thereof. The thickness of the deposition material 62 is 500 Å or less, and more preferably, 300 Å or less.

Figure 13A:
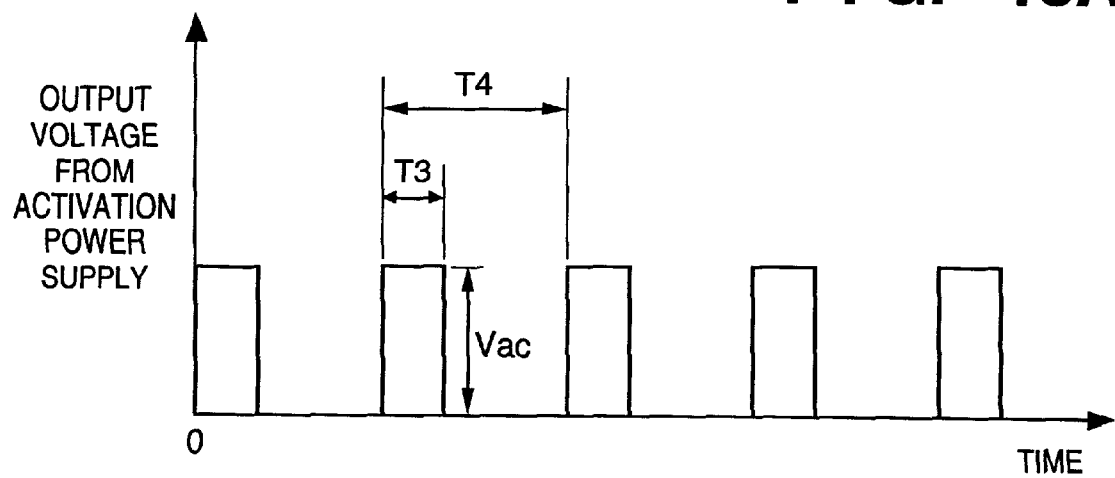
FIG. 13A is a graph showing the waveforms of voltages applied in an activation process.

FIG. 13A shows an example of the waveform of an appropriate voltage applied from the activation power supply 1112 to explain the energization method used for this operation. In this case, the activation process is performed by periodically applying a constant rectangular voltage. More specifically, a rectangular voltage Vac is set to 14 V; a pulse width T3, to 1 msec; and a pulse interval T4, to 10 msec.

Note that the above energization conditions are preferable for the surface-conduction type electron emitter of the embodiment. When the design of the surface-conduction type electron emitter is changed, the energization conditions are preferably changed in accordance with the change in emitter design.

Figure 13B:
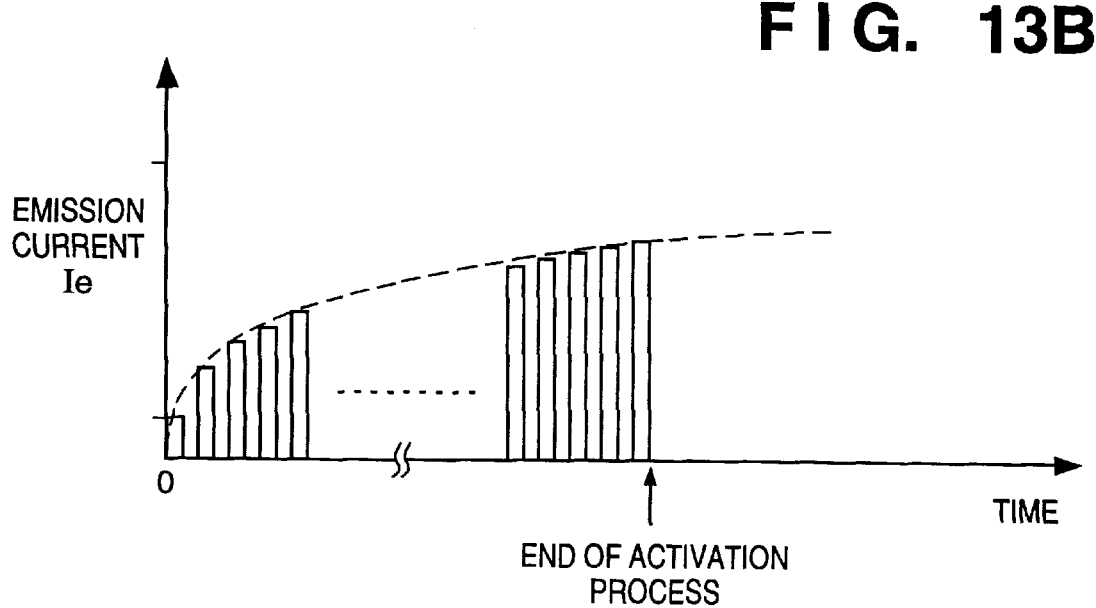
FIG. 13B is a graph showing the waveforms of emission currents measured in the activation process.

Referring to FIG. 1D, reference numeral 1114 denotes an anode electrode, which is connected to a DC high-voltage power supply 1115 and an ammeter 1116, and adapted to capture an emission current Ie emitted from the surface-conduction type electron emitter. (Note that when the substrate 1101 is incorporated into the display panel before the activation process, the phosphor surface of the display panel is-used as the anode electrode 1114.) While applying a voltage from the activation power supply 1112, the ammeter 1116 measures the emission current Ie to monitor the progress of the activation process so as to control the operation of the activation power supply 1112. FIG. 13B shows an example of the emission current Ie measured by the ammeter 1116. As application of a pulse voltage from the activation power supply 1112 is started, the emission current Ie increases with the elapse of time, gradually reaches saturation, and hardly increases after being saturated. At the substantial saturation point, the voltage application from the activation power supply 1112 is stopped, and the activation process is then terminated.

Note that the above energization conditions are preferable for the surface-conduction type electron emitter of the embodiment. When the design of the surface-conduction type electron emitter is changed, the conditions are preferably changed in accordance with the change in emitter design.

Figure 11C:
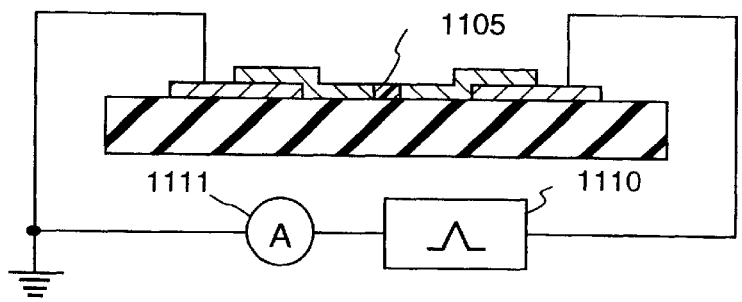
FIG. 11C is a sectional view showing a step in manufacturing the surface-conduction type electron emitter.
Figure 11D:
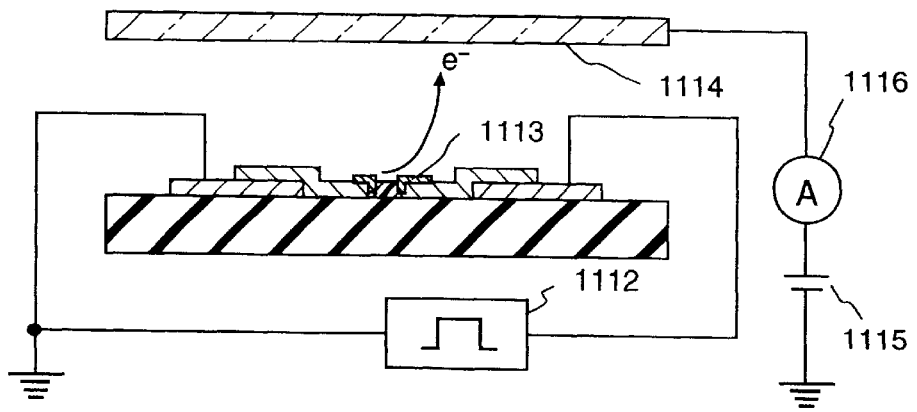
FIG. 11D is a sectional view showing a step in manufacturing the surface-conduction type electron emitter.
Figure 11E:
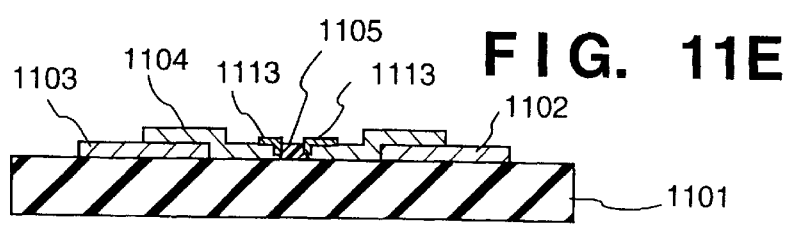
FIG. 11E is a sectional view showing a step in manufacturing the surface-conduction type electron emitter.

The flat surface-conduction type electron emitter shown in FIG. 11E is manufactured in the above manner.

(Stepped Surface-conduction Type Electron Emitter)

Another typical structure of the surface-conduction type electron emitter having an electron-emitting portion or its peripheral portion made of a fine particle film, i.e., the structure of a stepped surface-conduction type electron emitter, will be described next.

Figure 14:
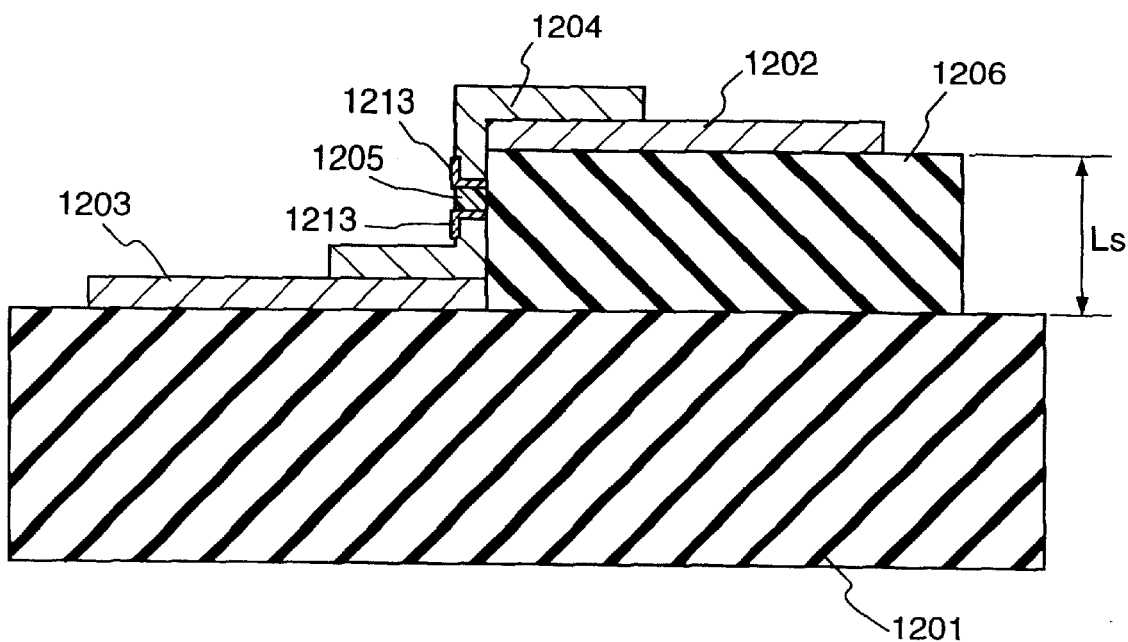
FIG. 14 is a sectional view showing the structure of a stepped surface-conduction type electron emitter.

FIG. 14 is a sectional view for explaining the basic structure of the stepped type. Referring to FIG. 14, reference numeral 1201 denotes a substrate; 1202 and 1203, emitter electrodes; 1206, a step forming member; 1204, a conductive thin film consisting of a fine particle film; 1205, an electron-emitting portion formed by the energization forming process; and 1213, a thin film formed by the activation process.

The stepped type is different from the flat type described above in that one (1202) of the emitter electrodes is formed on the step forming member 1206, and the conductive thin film 1204 covers the side surface of the step forming member 1206. In the plan views of FIGS. 10A and 10B, therefore, an emitter electrode interval L is set as a step height Ls of the step forming member 1206 in the stepped type. Note that the same materials as those listed in the description of the flat type can be used for the substrate 1201, the emitter electrodes 1202 and 1203, and the conductive thin film 1204 consisting of a fine particle film. An electrically insulating material such as $SiO_2$ is used for the step forming member 1206.

A method of manufacturing the stepped surface-conduction type electron emitter will be described next. FIGS. 15A to 15F are sectional views for explaining the manufacturing process. The same reference numerals in FIGS. 15A to 15F denote the same parts as in FIG. 14.

Figure 15A:
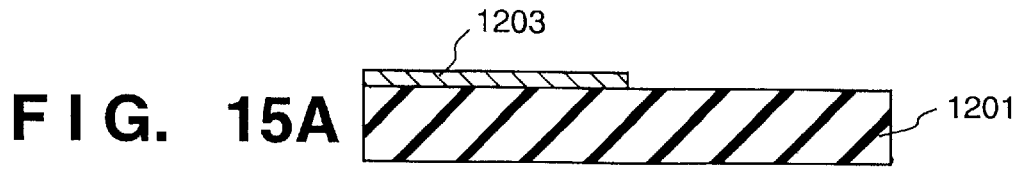
FIG. 15A is a sectional view showing a step in manufacturing the stepped surface-conduction type electron emitter.

1) As shown in FIG. 15A, an emitter electrode 1203 is formed-on a substrate 1201.

Figure 15B:
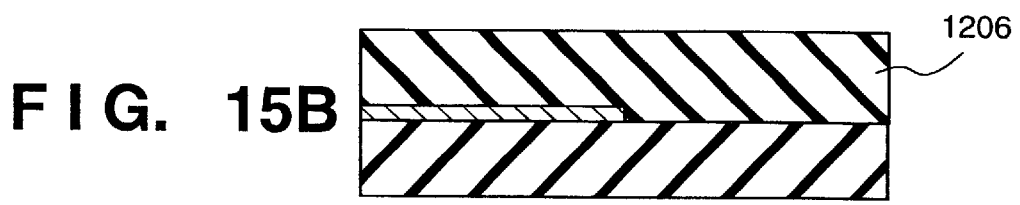
FIG. 15B is a sectional view showing a step in manufacturing the stepped surface-conduction type electron emitter.

2) As shown in FIG. 15B, an insulating layer is stacked on the resultant structure to form a step forming member. For example, the insulating layer may be formed by depositing $SiO_2$ using the sputtering method. However, other film-forming techniques such as the vacuum deposition method and the printing method may be used.

Figure 15C:
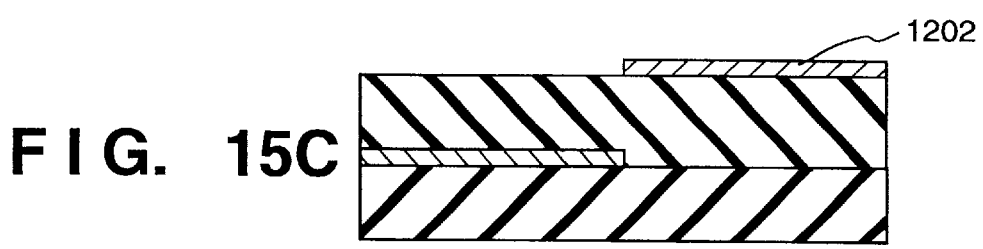
FIG. 15C is a sectional view showing a step in manufacturing the stepped surface-conduction type electron emitter.

3) As shown in FIG. 15C, an emitter electrode 1202 is formed on the insulating layer.

Figure 15D:
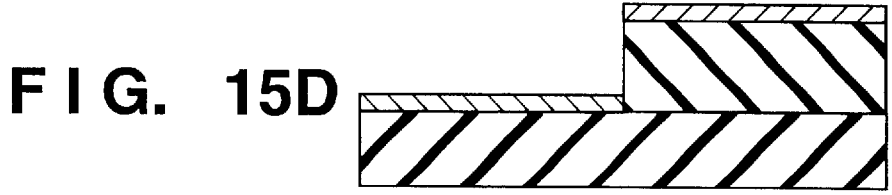
FIG. 15D is a sectional view showing a step in manufacturing the stepped surface-conduction type electron emitter.

4) As shown in FIG. 15D, part of the insulating layer is removed by, e.g., an etching method to expose an emitter electrode 1203.

Figure 15E:
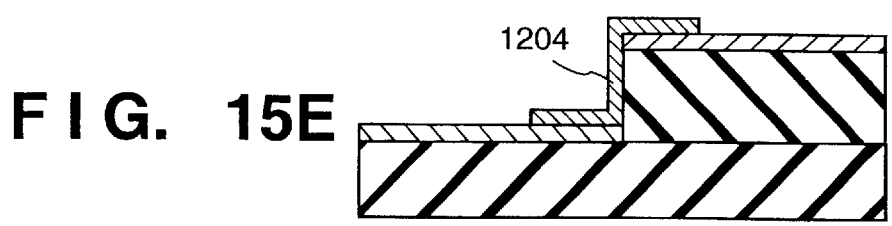
FIG. 15E is a sectional view showing a step in manufacturing the stepped surface-conduction type electron emitter.

5) As shown in FIG. 15E, a conductive thin film 1204 is formed by using a fine particle film. This film may be formed by using a film-forming technique such as the coating method as in the case of the flat type described above.

6) As in the case of the flat type, the energization forming process is performed to form an electron-emitting portion (it suffices if the same energization forming process as that for the flat type described with reference to FIG. 11C is performed).

7) As in the case of the flat type, the activation process is performed to deposit carbon or a carbon compound near the electron-emitting portion (it suffices if the same activation process as that for the flat type described with reference to FIG. 11D is performed).

Figure 15F:
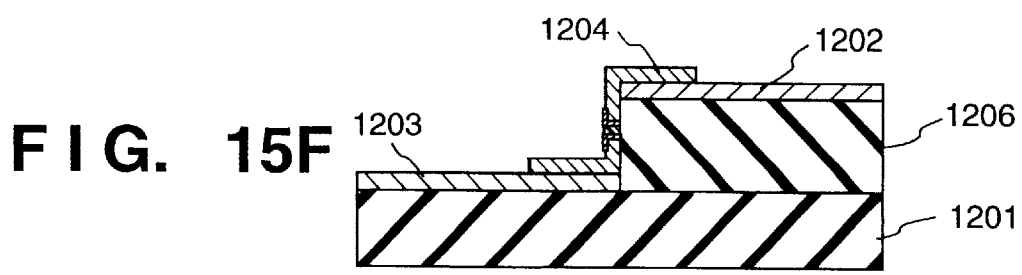
FIG. 15F is a sectional view showing a step in manufacturing the stepped surface-conduction type electron emitter.

The stepped surface-conduction type electron emitter shown in FIG. 15F is manufactured in the above manner.

(Characteristics of Surface-conduction Type Electron Emitter Used in Display Apparatus)

The structures of the flat,and stepped surface-conduction type electron emitters and their manufacturing methods have been described above. The characteristics of such an emitter used in a display apparatus will be described next.

Figure 16:
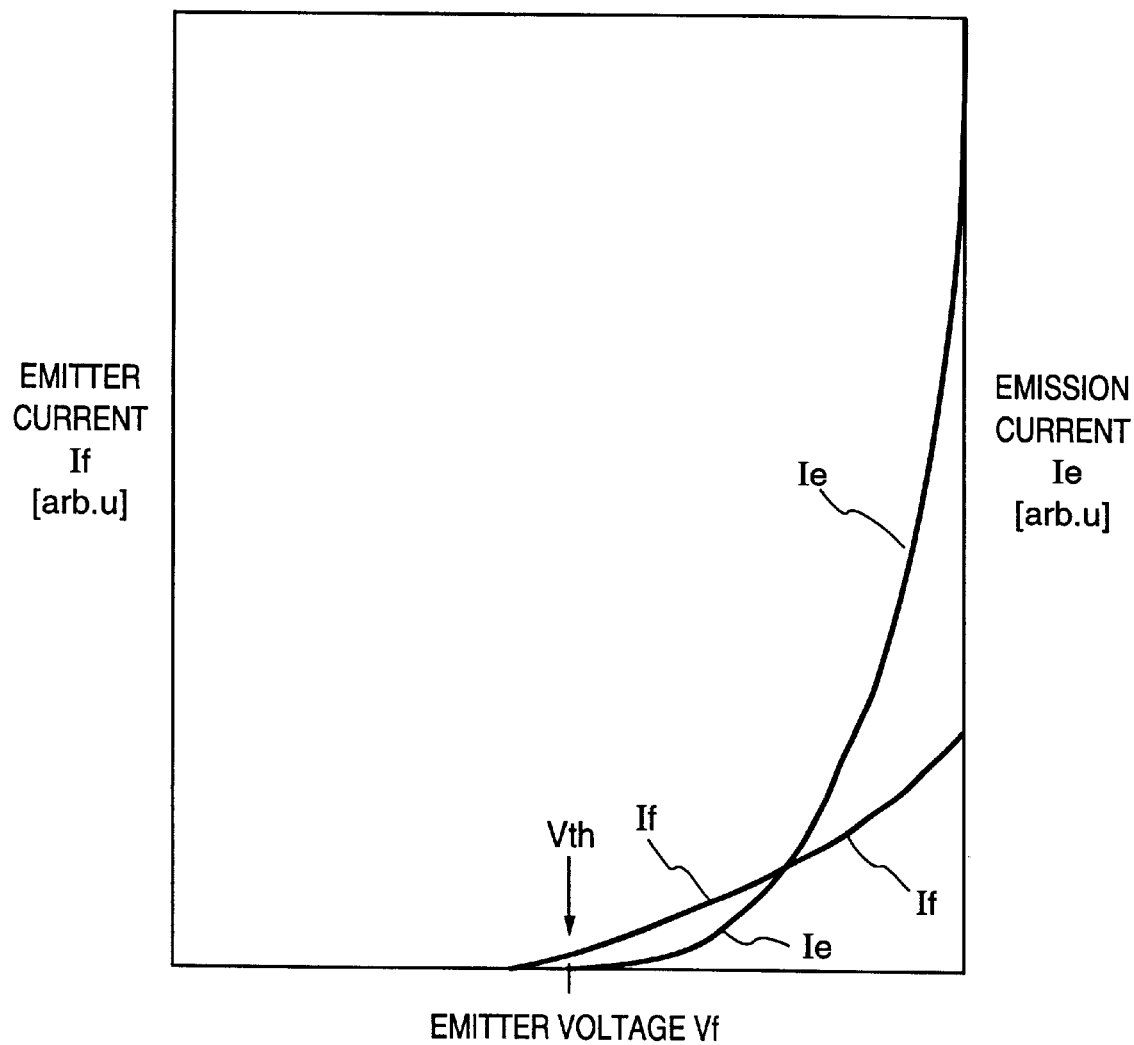
FIG. 16 is a graph showing the input/output characteristics of a surface-conduction type electron emitter.

FIG. 16 shows typical examples of the (emission current Ie) to (emitter applied voltage Vf) characteristic and the (emitter current If) to (emitter applied voltage Vf) characteristic of the emitter used in the display apparatus. Note that compared with the emitter current If, the emission current Ie is very small, and hence it is difficult to illustrate the emission current Ie by the same measure as that for the emitter current If. In addition, these characteristics change upon changing design parameters such as the size and shape of the emitter. For these reasons, the two curves in FIG. 16 are respectively plotted in arbitrary units.

Regarding the emission current Ie, the emitter used in the display apparatus has the following three characteristics:

First, when a given voltage (referred to as a threshold voltage Vth) or more is applied to the emitter, the emission current Ie drastically increases. However, with a voltage lower than the threshold voltage Vth, almost no emission current Ie is detected.

That is, regarding the emission current Ie, the emitter has a nonlinear characteristic exhibiting a clear threshold voltage Vth.

Second, the emission current Ie changes depending on the voltage Vf applied to the emitter. Accordingly, the magnitude of the emission current Ie can be controlled by changing the voltage Vf.

Third, the emission current Ie is output quickly in response to application of the emitter voltage Vf to the emitter. Accordingly, the charge amount of electrons to be emitted from the emitter can be controlled by changing the duration of application of the emitter voltage vf.

The surface-conduction type electron emitter with the above three characteristics is conveniently applied to a display apparatus. For example, in a display apparatus having a large number of emitters arranged in correspondence with the pixels of the display screen, if the first characteristic is utilized, a display operation can be performed by sequentially scanning the display screen. This means that a voltage equal to or higher than the threshold voltage Vth is appropriately applied to a driven emitter, while a voltage lower than the threshold voltage Vth is applied to a non-selected emitter. In this manner, sequentially changing the driven emitters enables display by sequential scanning of the display screen.

Furthermore, the emission luminance can be controlled by utilizing the second or third characteristic. Gradation display can therefore be realized.

(Structure of Multi-electron Source Having Many Emitters Wired in Simple Matrix)

The structure of a multi-electron beam source having the above surface-conduction type electron emitters arranged on a substrate and wired in a simple matrix will be described next.

Figure 17:
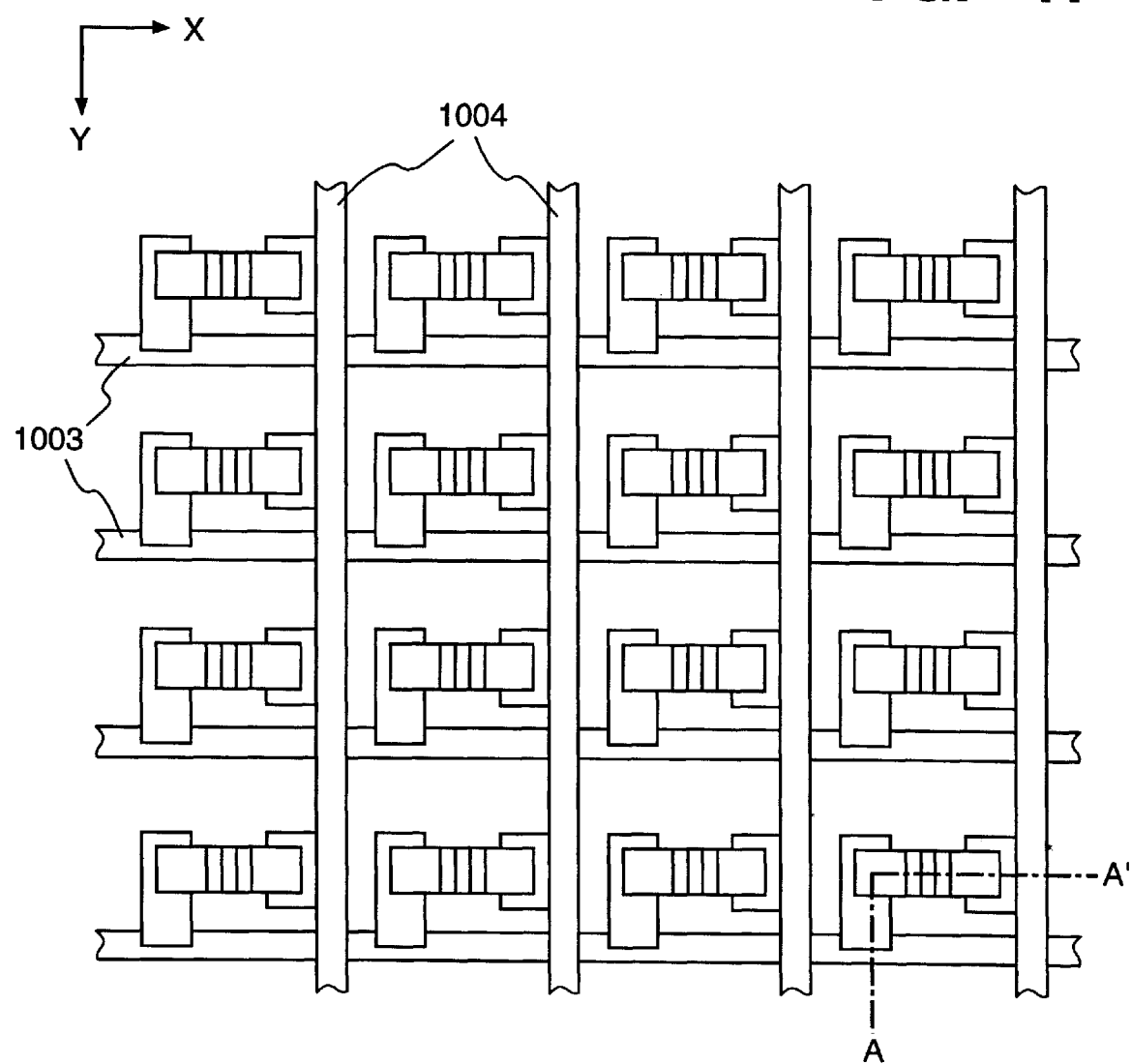
FIG. 17 is a plan view showing a multi-electron source used for a display panel.

FIG. 17 is a plan view showing a multi-electron source used for the display panel in FIG. 8. Emitters each identical to the one shown in FIGS. 10A and 10B are arranged on the substrate and connected to the row and column wiring layers 1003 and 1004 to be wired in a simple matrix. An insulating layer (not shown) is formed between the electrodes at each intersection between the row and column wiring layers to electrically insulate the wiring layers from each other.

Figure 18:
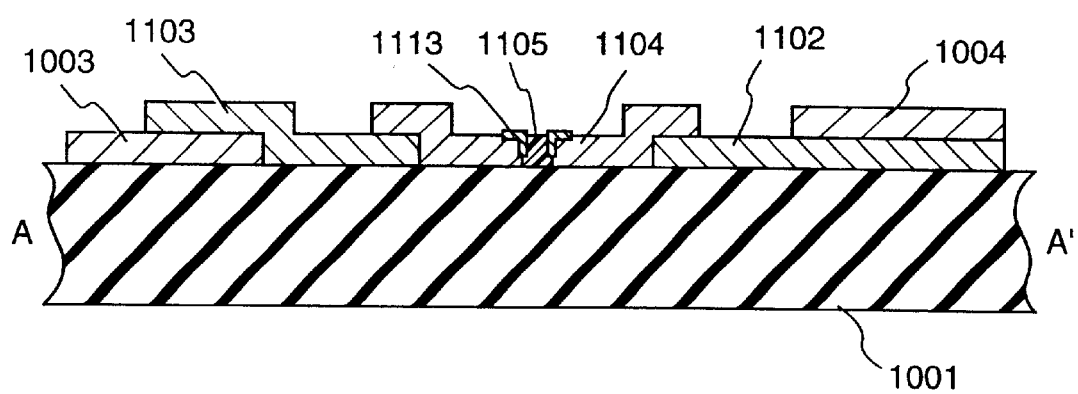
FIG. 18 is a sectional view taken along a line A–A' in FIG. 17.

FIG. 18 is a sectional view taken along a line A–A' in FIG. 17.

The multi-electron source having the above structure is manufactured by forming row wiring layers 1003, column wiring layers 1004, insulating layers between the row wiring layers and the column wiring layers (not shown), the emitter electrodes of the surface-conduction type electron emitters, and a conductive thin film on a substrate in advance, and the respective emitters are energized through the row and column wiring layers 1003 and 1004 to perform the energization forming process and the activation process.

Second Embodiment

The second embodiment of the present invention will be described below.

Figure 19:
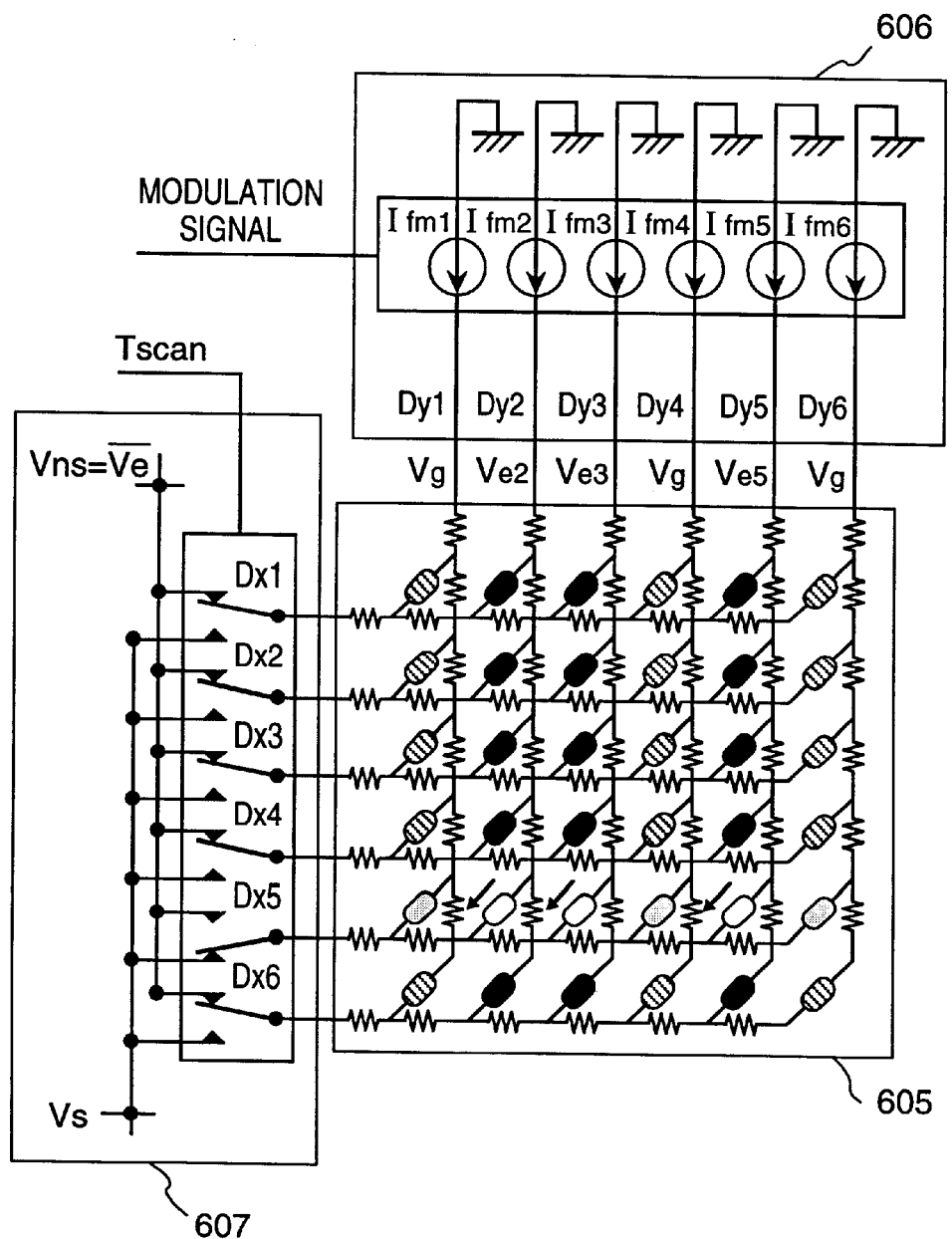
FIG. 19 is a circuit diagram showing a driving circuit for an electron source according to the second embodiment of the present invention.

A method of driving a multi-electron source according to this embodiment and an image display apparatus using the same have the following structure, as shown in FIG. 19.

Figure 20:
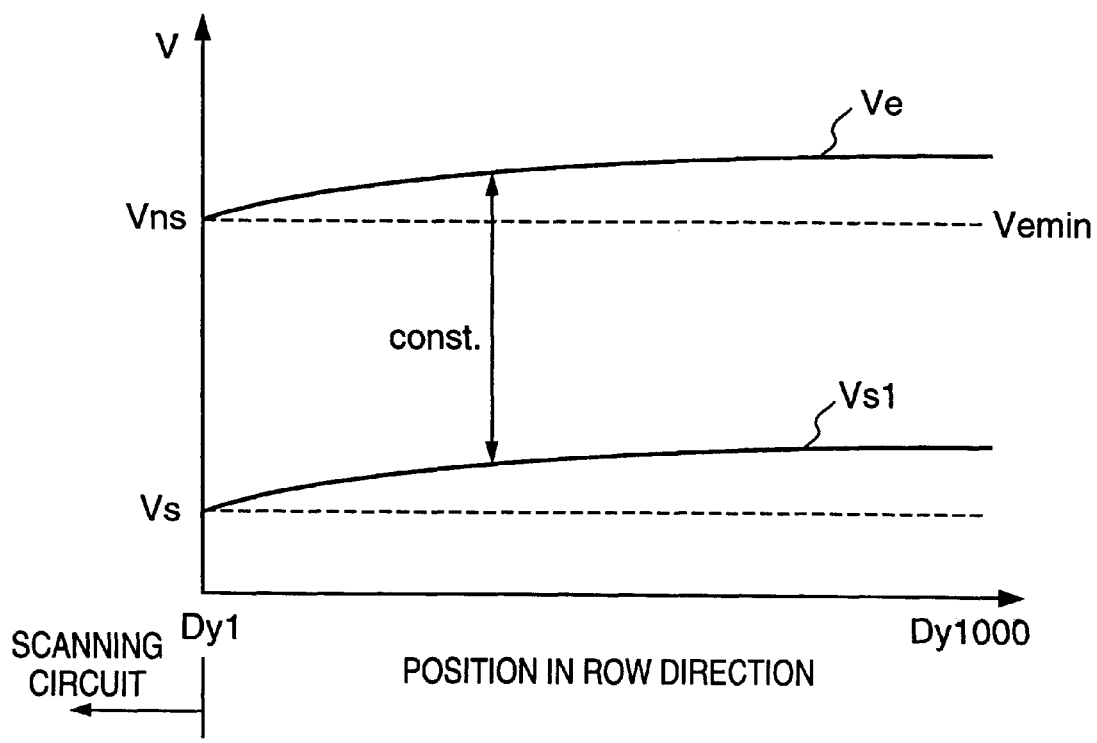
FIG. 20 is a graph showing the voltages applied to the electron emitters on the respective columns.

This apparatus includes a multi-electron source 605 having surface-conduction type electron emitters, like those in the first embodiment, arranged in the form of a simple matrix, a modulation circuit 606 for generating a current signal and driving the surface-conduction type electron emitters through the column wiring layers, and a scanning circuit 607 for sequentially selecting the row wiring layers. The scanning circuit 607 fixes a selected row wiring layer ($D_{x5}$ in FIG. 19) to a potential Vs, and fixes each of the non-selected row wiring layers (other than the row wiring layer $D_{x5}$) to a potential Vns. The modulation circuit 606 fixes the driving potential for column wiring layers ($D_{y1}$, $D_{y4}$, and $D_{y6}$ in FIG. 19) to which emitters which are not to emit electrons are connected to a potential Vg, and applies a voltage Ve to each of column wiring layers ($D_{y2}$, $D_{y3}$, and $D_{y5}$ in FIG. 19) to which a modulation signal for each emitter which is to emit electrons is applied. Although FIG. 19 shows only a 6×6 matrix of emitters, a 500×1,000 matrix of emitters is formed in this embodiment. In the embodiment, since the wiring resistances are high, voltage drops across the wiring resistances cannot be neglected. FIG. 20 shows the distribution of voltages Vsl of a selected row wiring layer in a case wherein electrons are to be emitted from all the emitters on the selected row wiring layer. The output voltage Ve from a current signal driving circuit changes in units of column wiring layers such that the voltage applied to each selected emitter becomes constant at the voltage at which a desired electron emission amount of 1 μA can be obtained. That is, the voltage Ve applied to a column wiring layer, i.e., a column wiring layer $D_{y1000}$ located far away from the scanning circuit 607 is higher than that applied to a column wiring layer, i.e., the column wiring layer $D_{y1}$, located near the scanning circuit 607. In addition, the voltage Ve applied to the same column wiring layer changes in accordance with the number of emitters selected at the same time. In this case, both the differences between the potentials Vns and Vg and between the potentials Vg and Vs are set to be smaller than the threshold at which electron emission occurs from an emitter, and the potential Vns is set to be equal to a minimum value Vemin of the potential Ve.

According to this structure, a potential of Ve–Vsl is applied to each emitter on a selected row wiring layer to which a scanning signal is applied, of the emitters connected to the column wiring layers to which the emitters which are to emit electrons are connected. Meanwhile, a potential Ve–Vns, i.e., near 0, is applied to each emitter on the non-selected row wiring layers, i.e., the non-selected row wiring layers to which no scanning signal is applied, and hence the magnitude of a current flowing in each emitter can be neglected. As a result, all the currents which are injected into the column wiring layers to drive the surface-conduction type electron emitters flow to the emitters which are to emit electrons, but are not shunted to the semi-selected emitters. Since no correction is required for currents shunted to semi-selected emitters, a simple circuit can drive each emitter with a constant current. This is one of the advantageous points of this embodiment.

A method of driving the image display apparatus will be described next.

Figure 21:
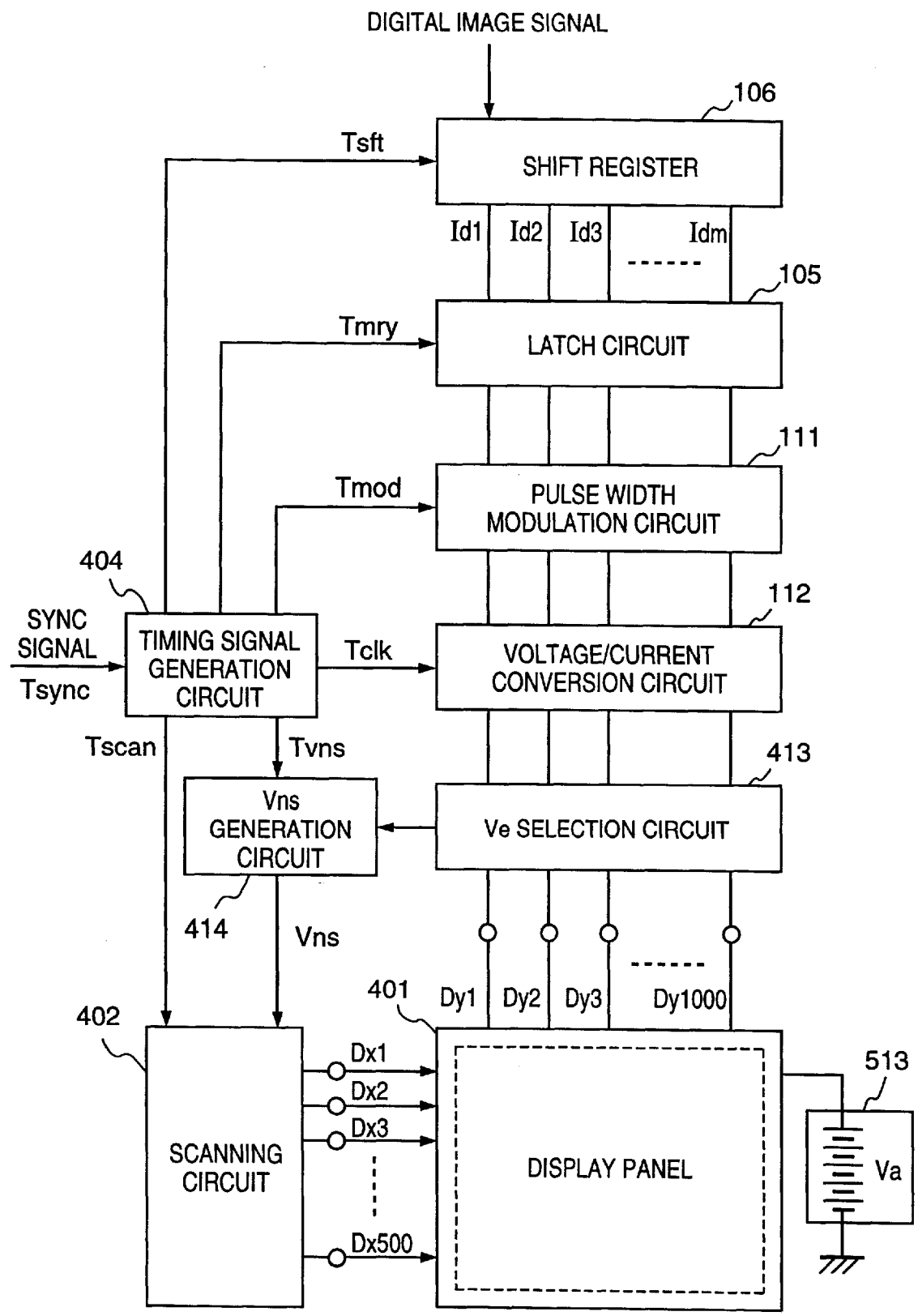
FIG. 21 is a block diagram showing a driving circuit for an image display apparatus according to the second embodiment.

The structure of the image display apparatus including the surface-conduction type electron emitters will be described first with reference to FIG. 21. Referring to FIG. 21, reference numeral 401 denotes a display panel connected to an external electric circuit via terminals $D_{x1}$ to $D_{x500}$ and $D_{y1}$ to $D_{y10000}$. The high-voltage terminal on the faceplate is connected to an external high-voltage source 513. A high voltage Va is applied to this high-voltage terminal to accelerate emission electrons. A scanning signal for sequentially driving the multi-electron source in the above panel, i.e., the surface-conduction type electron emitters wired in the form of a 500 (row)×1,000 (column) matrix in units of rows is applied to each of the terminals $D_{x1}$ to $D_{x500}$.

Meanwhile, a modulation signal for controlling the output electron beam from each surface-conduction type electron emitter on a row selected by the scanning signal is applied to each of the terminals $D_{y1}$ to $D_{y1000}$.

Figure 22:
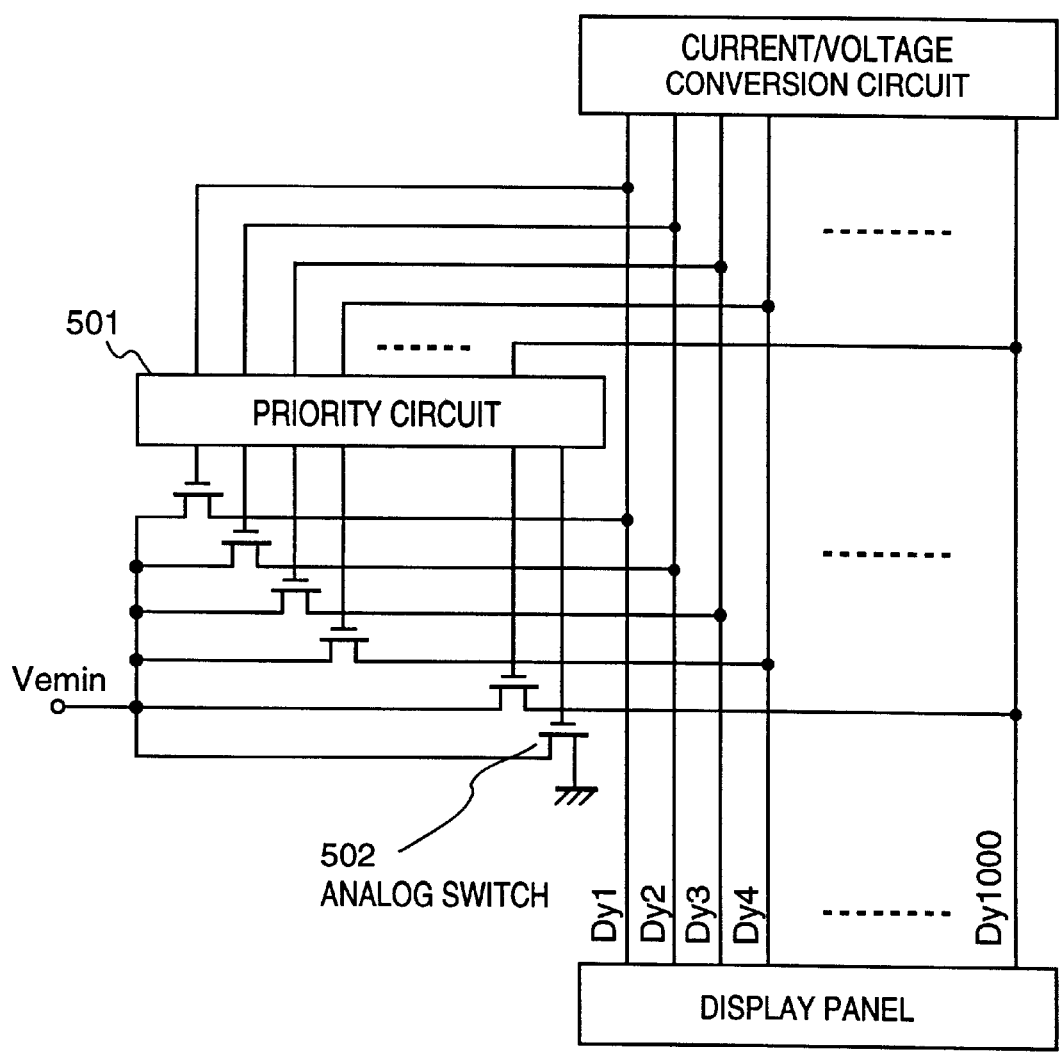
FIG. 22 is a block diagram showing a circuit for detecting the minimum value of Ve.

A scanning circuit 402 will be described next. This circuit incorporates 500 switching elements. Each switching element selects an output voltage Vs from a voltage source (not shown) or an output voltage Vns from a Vns generation circuit 414, and is electrically connected to the terminals $D_{x1}$ to $D_{x500}$ of the display panel 401. Each switching element has the circuit shown in FIG. 3 as in the first embodiment. As shown in FIG. 4, an output Vxm from each switching element is switched between the two potentials Vs and Vns in synchronism with a timing signal Txm generated from a control signal Tscan and corresponding to each row wiring layer. A Ve selection circuit 413 selects a column wiring layer located nearest to the scanning circuit 402, of the column wiring layers to which the potential Ve is applied, and sends the potential of the selected column wiring layer, as a potential Vemin, to the Vns generation circuit 414. As shown in FIG. 22, in the Ve selection circuit 413, analog switches 502 constituted by FETs are connected to the respective column wiring layers, and the gates of the FETs are connected to a priority circuit 501 in which only a switch corresponding to a column wiring layer, of the column wiring layers to which the potential Ve is applied, which is located nearest to the scanning circuit 402 is turned on. When a potential Vg is applied to all the column wiring layers, the Ve selection circuit 413 outputs 0 V. The Vns generation circuit 414 sends a potential equal to the potential Vemin as the potential Vns to the scanning circuit 402. In this embodiment, the minimum value of the voltages of the column wiring layers subjected to electron emission is actually monitored, and the value of the voltage Vns is set on the basis of the monitored value.

Figure 23:
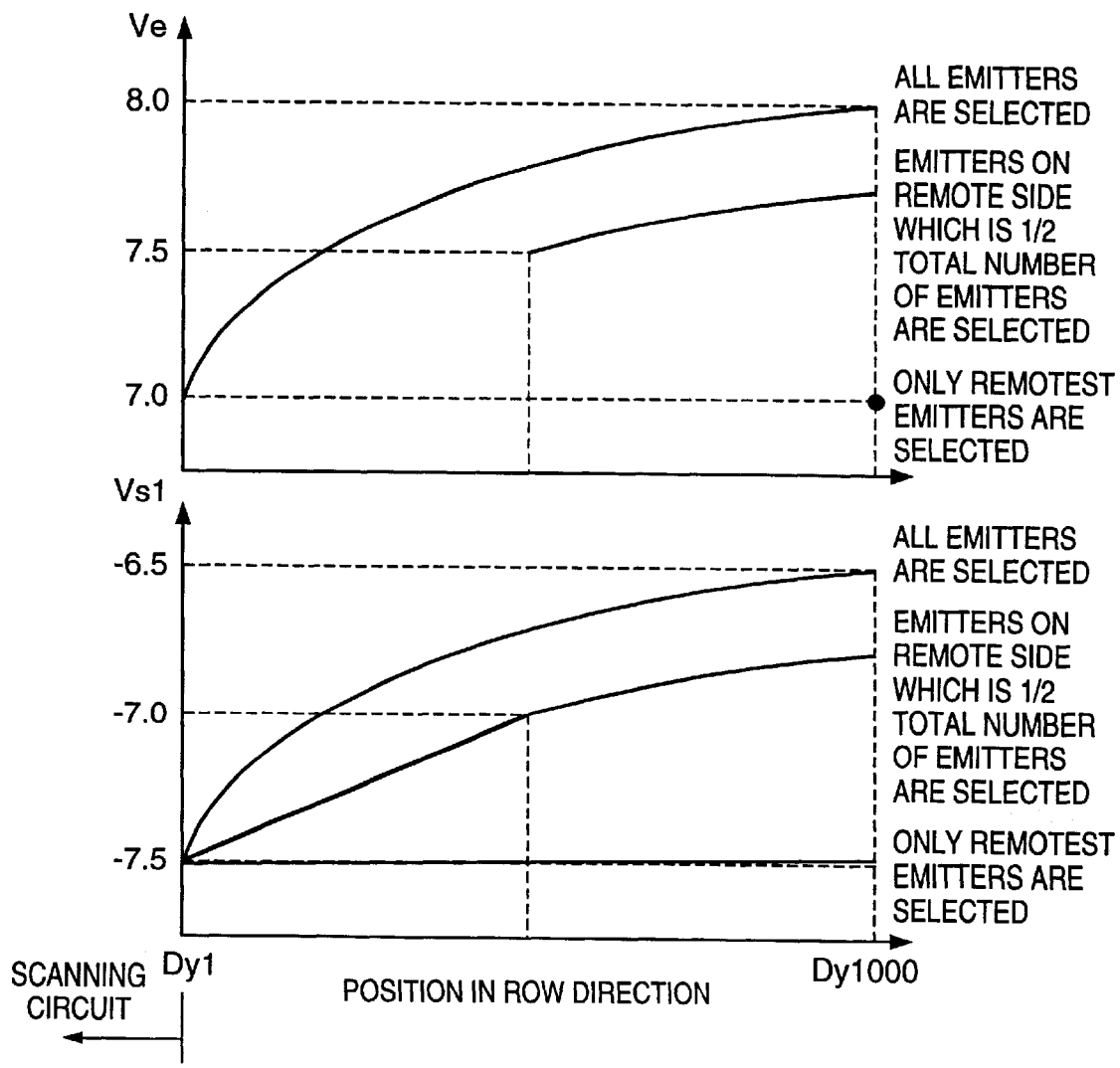
FIG. 23 is a graph showing the differences between the applied voltages in correspondence with different driving patterns.

In this embodiment, the DC power supply voltage Vs is set to −7.5 V. The potential Vsl of a selected row wiring layer variously changes depending on the number of selected emitters because of the above drop voltage in the row wiring layer, as shown in FIG. 23. Similar to the first embodiment, when the desired electron emission current is 1 μA, since the voltage applied to each emitter is kept constant at 14.5 V, the voltage Ve applied to column wiring layers changes to 7.0 V on the side near the scanning circuit 402; 7.0 V on the far side if the number of selected emitters is small; and 8.0 V on the far side if the number of selected emitters is large. The voltage Vns applied to each non-selected row wiring layer, i.e., the minimum value Vemin of the potential Ve applied to each column wiring layer, changes depending on the number of selected emitters and their positions. In this embodiment, the voltage Vns changed in the range of 7.0 V to 7.5 V.

With these settings, the voltage applied to each of the semi-selected emitters on the column wiring layers to which the selected emitters are connected becomes 0 V to 0.5 V. The voltage applied to each of the emitters on the column wiring layers to which no selected emitters are connected becomes 7 V to 7.5 V. Both the voltages are lower than the electron emission threshold voltage Vth.

In this case, when 0.5 V is applied to each emitter, a current flowing in each emitter is as small as several ten μA, and a sum total Ifn of currents flowing in the semi-selected emitters is as small as several ten μA, which is sufficiently smaller than 0.5 mA which is the value of a current flowing in each selected emitter. For this reason, no correction is required.

The flow of an input image signal will be described next. An input composite image signal is converted into a pulse signal having a pulse width corresponding to the image signal intensity, and is further converted into an electrical signal by the same method as that in the first embodiment.

Figure 24:
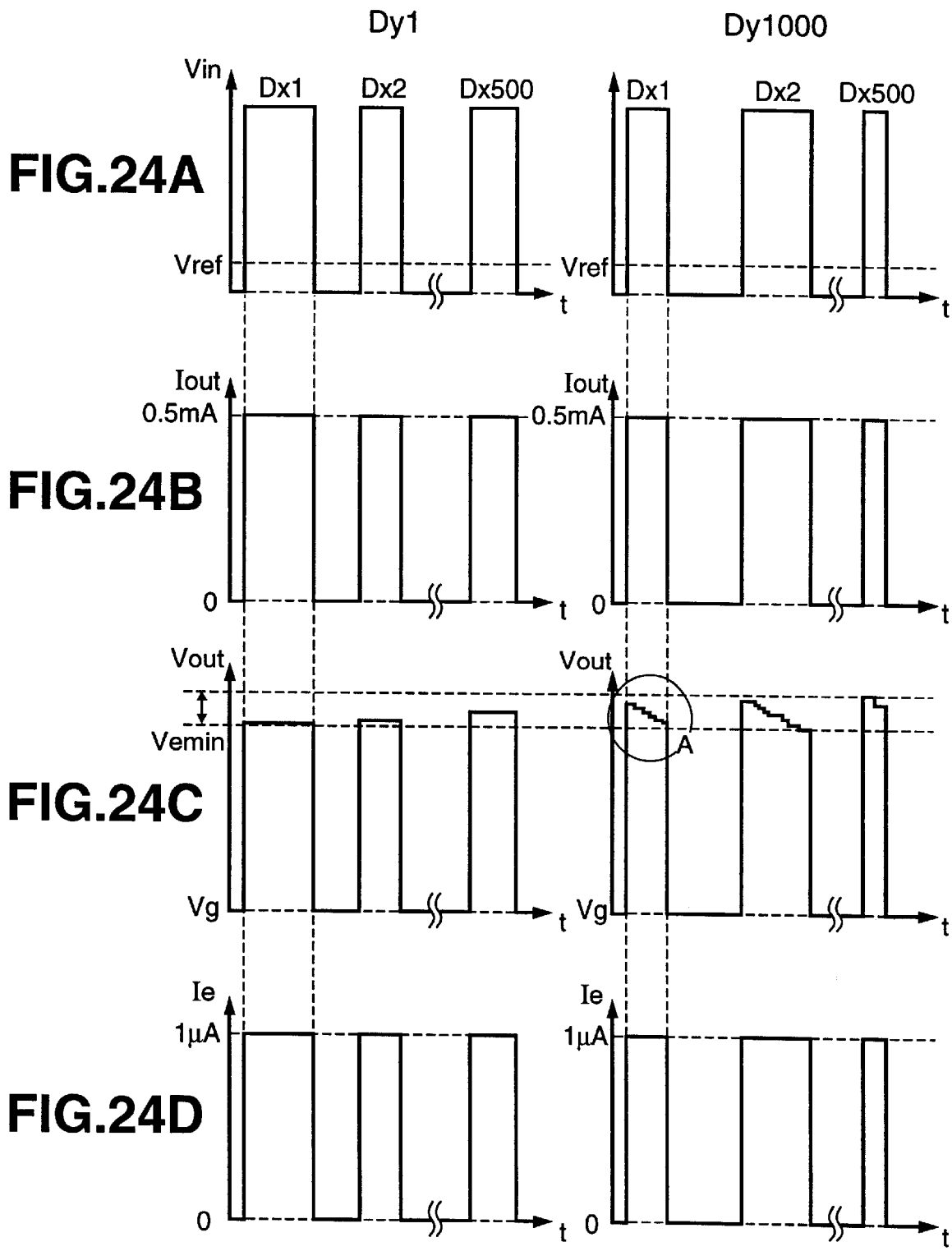
FIGS. 24A to 24D are timing charts showing the waveforms of signals in the second embodiment.

FIGS. 24A to 24D show how an input waveform from the modulation circuit is actually converted into a current waveform. Consider the column wiring layers $D_{y1}$ and $D_{y1000}$ of the display panel. Assume that a voltage Vin like the one shown in FIG. 24A is input to the circuit in FIG. 6 to drive the emitters connected to row wiring layers $D_{x1}$, $D_{x2}$, $D_{x3}$, $D_{x4}$, . . . . In this case, each pulse width of this voltage pulse reflects luminance data, and the peak value of this voltage is set such that the output current Iout is 0.5 mA. As shown in FIG. 24B, all the peak values of the waveform of an output Iout from the voltage/current conversion circuit are set to 0.5 mA. FIG. 24C shows an output voltage Vout from the voltage/current conversion circuit in this case. Owing to voltage drops across the resistances of the row wiring layers, the voltage peak values increase with an increase in distance from the scanning circuit 402, i.e., the voltage applied to the column wiring layer $D_{y1000}$ becomes higher than that applied to the column wiring layer $D_{y1}$. In addition, owing to voltage drops across the resistances of column wiring layers, the drive voltage increases with an increase in distance from the driving circuit for each column wiring layer, i.e., the drive voltage for the row wiring layer $D_{x500}$ is higher than that for the row wiring layer $D_{x1}$, even though this voltage difference is very small. In addition, pulses having different widths are applied to the respective emitters on the same row wiring layer, and the number of emitters simultaneously selected decreases with time within one pulse. For this reason, as indicated by "A" in FIG. 24C, the applied voltage gradually decreases within one pulse. FIG. 24D shows the state of each emission current Ie in a driving operation under these conditions. As is apparent, the emission currents from all the emitters are 1 μA.

According to this embodiment, currents shunted to semi-selected emitters can be mostly eliminated, and the output current from the modulation circuit can be made to coincide with the current flowing in a selected emitter. For this reason, an image can be displayed with luminances very faithful to an original image signal throughout the display screen.

In this embodiment, the potential Ve nearest to the scanning/driving circuit is selected such that the voltage Vns applied to a non-selected row wiring layer becomes the minimum value of the voltage Ve applied to a column wiring layer. However, the applied voltage Vns is not limited to this minimum value. The current flowing in each semi-selected emitter can be almost eliminated as long as this value is set within the range in which the potential Ve changes. Furthermore, when the applied voltage Vns is fixed to the minimum value of the applied voltage Ve, e.g., 7 V in this embodiment, which is calculated by computer simulation in an electric circuit without measuring the voltage applied to each column wiring layer, the same effects as described above could be obtained.

Third Embodiment

The third embodiment of the present invention will be described.

Figure 25:
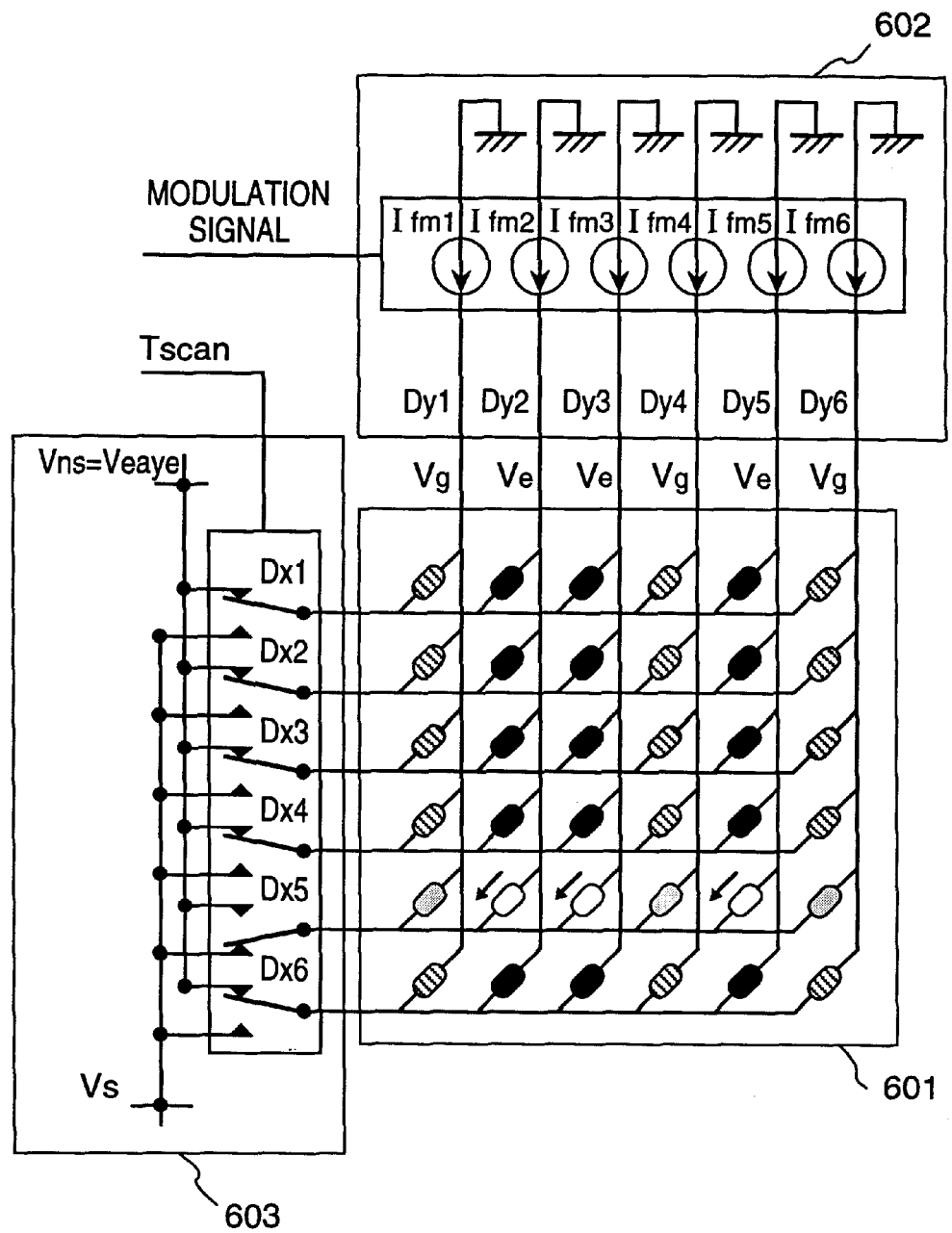
FIG. 25 is a circuit diagram showing a driving circuit for an electron source according to the third embodiment of the present invention.

A method of driving a multi-electron source according to this embodiment and an image display apparatus using the same have the following structure, as shown in FIG. 25.

Similar to the first embodiment, this apparatus includes a multi-electron source 601 having surface-conduction type electron emitters arranged in the form of a simple matrix, a modulation circuit 602 for generating a current signal and driving the surface-conduction type electron emitters through the column wiring layers, and a scanning circuit 603 for sequentially selecting the row wiring layers. The scanning circuit 603 fixes a selected row wiring layer ($D_{x5}$ in FIG. 25) to a potential Vs, and fixes each of the non-selected row wiring layers (other than the row wiring layer $D_{x5}$) to a potential Vns. The modulation circuit 602 fixes the driving potential for column wiring layers ($D_{y1}$, $D_{y4}$, and $D_{y6}$ in FIG. 25) to which emitters which are not to emit electrons are connected to a potential Vg, and applies a voltage Ve to each of column wiring layers ($D_{y2}$, $D_{y3}$, and $D_{y5}$ in FIG. 25) to which a modulation signal for each emitter which is to emit electrons is applied. Although FIG. 25 shows only a 6×6 matrix of emitters, a 50×100 matrix of emitters is formed in this embodiment. In this embodiment, the surface-conduction type electron emitters vary in current emission efficiency. That is, the emitters differ in the rates of the amounts of currents supplied to the emitters to the amounts of currents emitted from the emitters to the faceplate to which a high voltage is applied. For this reason, the output voltage Ve from a current signal driving circuit automatically changes in units of column wiring layers such that the voltage applied to each selected emitter becomes a voltage at which a desired electron emission amount of 1 μA can be obtained.

Both the differences between the potentials Vns and Vg and between the potentials Vg and Vs are set to be smaller than a threshold Vth at which electron emission occurs from an emitter, and the potential Vns is set to be equal to an arithmetic mean Veave of the different potentials Ve applied to the respective column wiring layers.

According to this structure, a potential Ve−Vs is applied to each of the emitters on a selected column wiring layer which is to emit electrons. Meanwhile, a potential Ve−Veave, i.e., near 0, is applied to each semi-selected emitter, and hence the magnitude of a current flowing in each emitter can be neglected. As a result, all the currents which are injected into the column wiring layers to drive the surface-conduction type electron emitters flow to the emitters which are to emit electrons, but are not shunted to the semi-selected emitters. Since no correction is required for currents shunted to semi-selected emitters, a simple circuit can drive each emitter with a constant current. This is one of the advantageous points of this embodiment.

A method of driving the image display apparatus will be described next.

Figure 26:
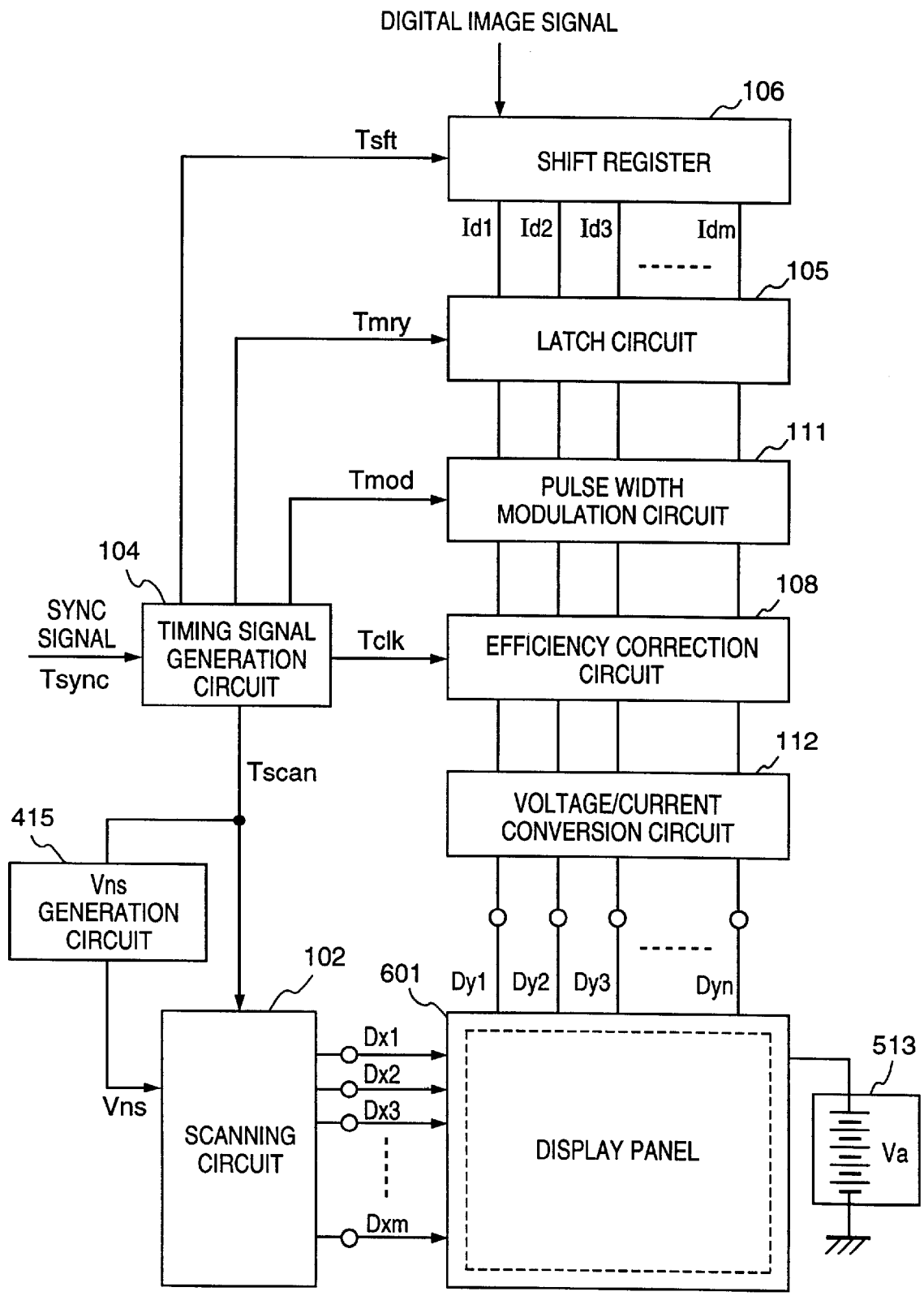
FIG. 26 is a block diagram showing a driving circuit for an image display apparatus according to the third embodiment.

The structure of the image display apparatus including the surface-conduction type electron emitters will be described first with reference to FIG. 26. Referring to FIG. 26, reference numeral 601 denotes a display panel connected to an external/electric circuit via terminals $D_{x1}$ to $D_{x50}$ and $D_{y1}$ to $D_{y100}$ The high-voltage terminal on the faceplate is connected to an external high-voltage source 513. A high voltage Va is applied to this high-voltage terminal to accelerate emission electrons. A scanning signal for sequentially driving the multi-electron source in the above panel, i.e., the surface-conduction type electron emitters wired in the form of a 50 (row)×100 (column) matrix in units of rows is applied to each of the terminals $D_{x1}$ to $D_{x50}$.

Meanwhile, a modulation signal for controlling the output electron beam from each surface-conduction type electron emitter on a row selected by the scanning signal is applied to each of the terminals $D_{y1}$ to $D_{y100}$.

A scanning circuit 402 will be described next. This circuit incorporates 50 switching elements. Each switching element selects an output voltage Vs from a voltage source (not shown) or an output voltage Vns from a Vns generation circuit 415, and is electrically connected to the terminals $D_{y1}$ to $D_{x50}$ of a display panel 401. Each switching element has the circuit shown in FIG. 3 as in the first embodiment. As shown in FIG. 4, the scanning circuit 402 applies the potential Vs to each selected row wiring layer and the potential Vns to each non-selected row wiring layer in synchronism with a timing signal Txm generated from a control signal Tscan and corresponding to each row wiring layer. The Vns generation circuit 415 sequentially reads out different set values of Vns, which are obtained in units of rows by a method to be described later, from a memory in accordance with the control signal Tscan, generates corresponding potentials Vns, and sends them to the scanning circuit 402.

In this embodiment, every time selected rows are switched, the potential Vns can be changed to an optimal value.

The flow of an input image signal will be described next. An input composite image signal is converted into a pulse signal having a pulse width corresponding to the image signal intensity, and is further converted into an electrical signal by the same method as that in the first embodiment.

An efficiency correction circuit 108 generates a drive pulse from the obtained pulse signal on the basis of the efficiency variation data of each emitter which is acquired by a method to be described later. The peak value of each pulse reflects the efficiency of a corresponding emitter. The drive pulse is converted by a voltage/current conversion circuit 112 from a voltage value to a current amount, and is supplied to a corresponding surface-conduction type electron emitter in a display panel 511 via one of the terminals $D_{y1}$ to $D_{y100}$ of the display panel 511.

Figure 27:
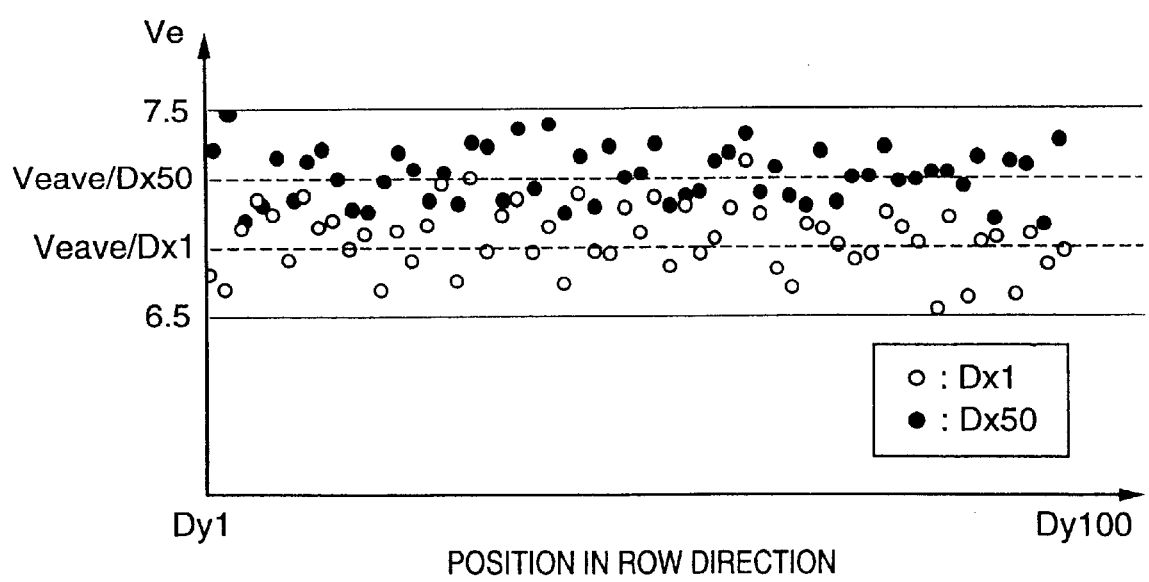
FIG. 27 is a graph showing a mean Veave of the voltages of modulation signals.

In this embodiment, the above DC power supply voltage Vs is set to −7.5 V. When the desired emitter emission current is 1 μA, the voltage applied to each emitter varies between 14 V and 15 V. The voltage Ve applied to each column wiring layer therefore varies between 6.5 V and 7.5 V, as shown in FIG. 27. The arithmetic mean Veave of the voltages Ve for the respective selected rows varies, as shown in FIG. 27.

Figure 28:
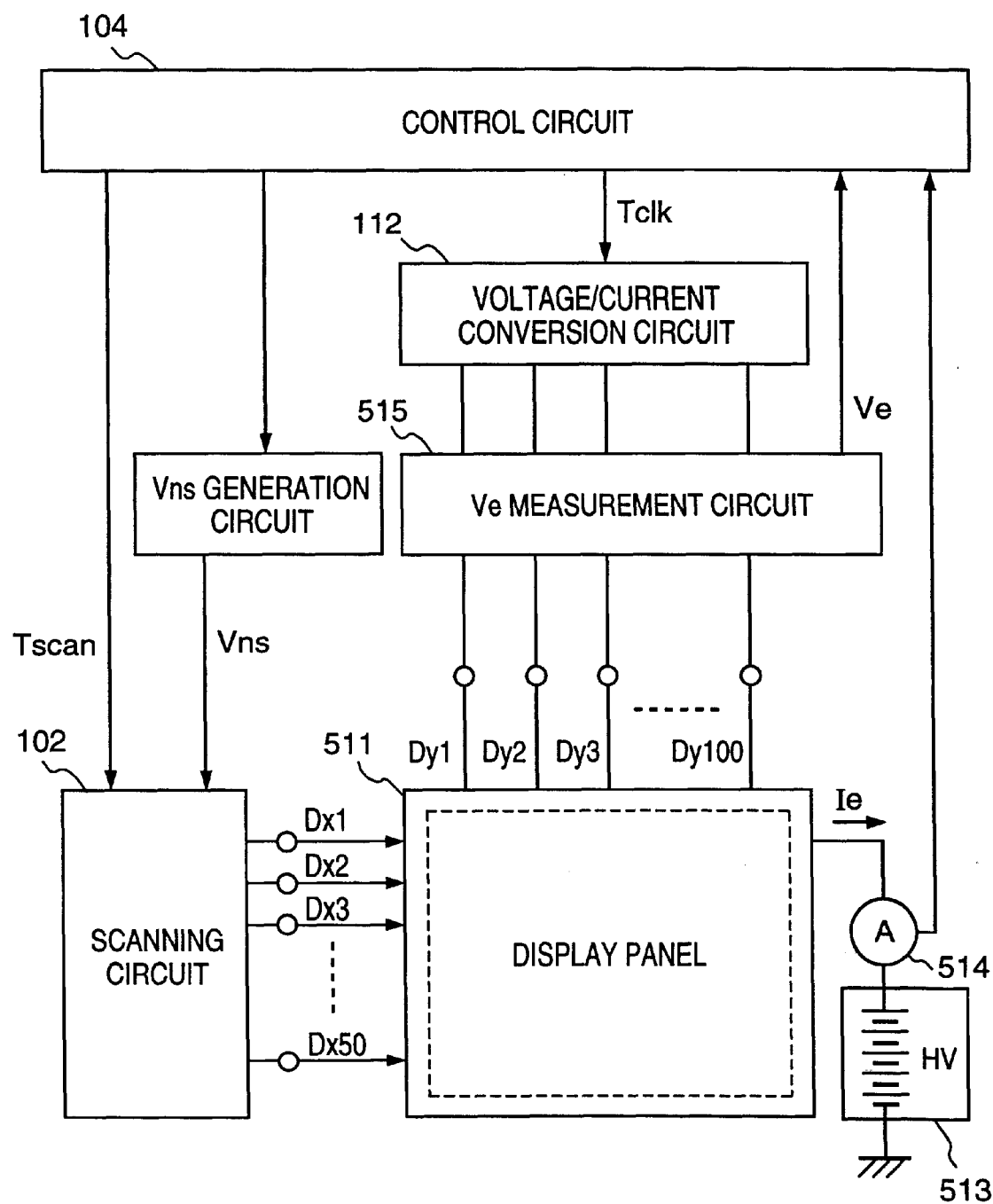
FIG. 28 is a block diagram showing an electron source having a Ve measurement circuit.
Figure 29:
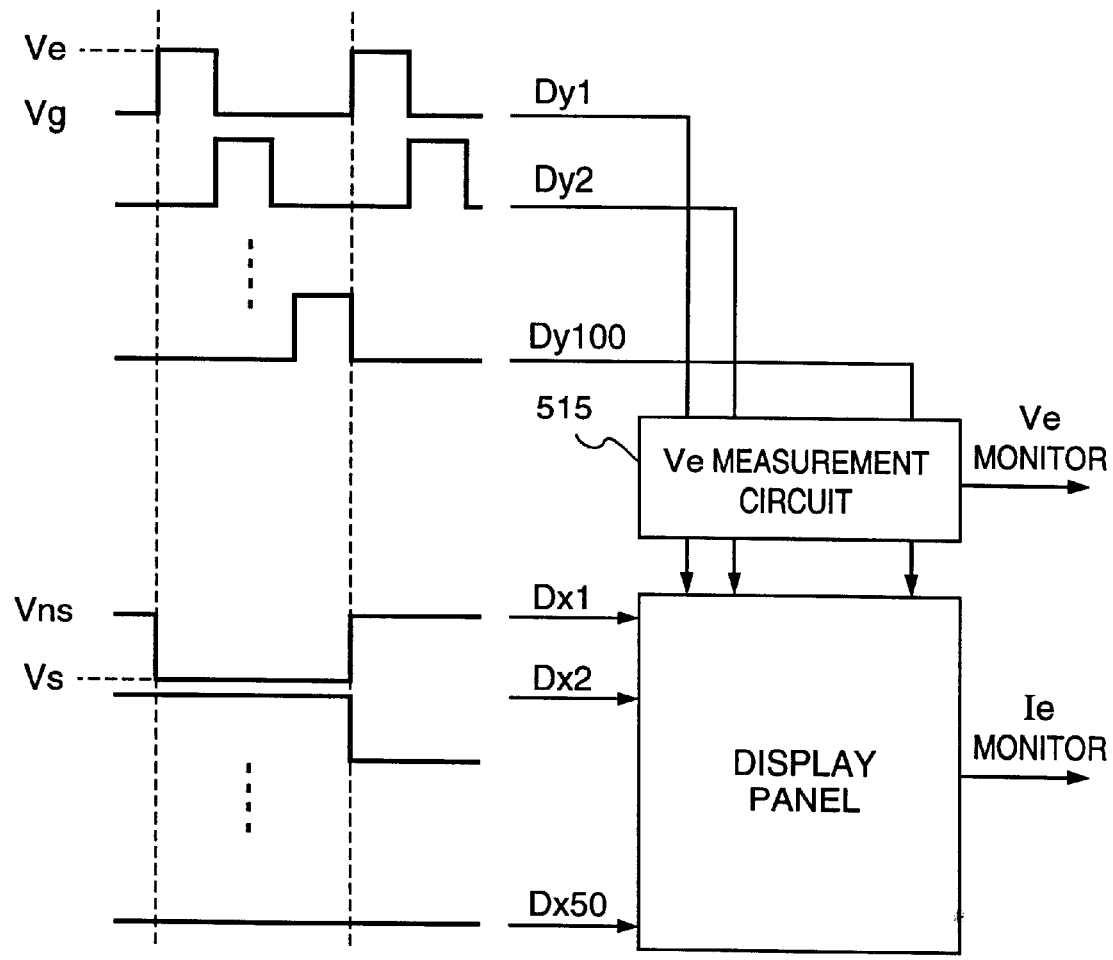
FIG. 29 is a view showing a procedure for measuring Ve in units of rows.

A method of acquiring the efficiency variation data of the emission current amount/energization current amount of the respective emitters will be described below, together with the potential Vns set for each row on the basis of the variation data. FIG. 28 shows a data acquisition system. A high voltage is applied from a high-voltage source 513 to the faceplate of the display panel 511 through an ammeter 514 for measuring the amount of emission current from each emitter, and the measured current amount is sent to a controller 104. The emitters are selected one by one from an end of the display panel 511 on the basis of a signal from the controller 104. More specifically, the potentials Vns and Vs are selectively applied to each of the row wiring layers $D_{x1}$ to $D_{x50}$. The row wiring layers are sequentially selected one by one from an end of the display panel 511, and the potential Vs is applied to each selected row wiring layer, as shown in FIG. 29. Circuits each identical to the above voltage/current conversion circuit 112 are respectively connected to the column wiring layers $D_{y1}$ to $D_{y100}$ to switch between an operation of injecting a specific output current and an operation of applying the potential Vg. As shown in FIG. 29, the column wiring layers are selected one by one from an end, and the potential Ve is applied to each selected column wiring layer to inject a specific current. With this operation, the emitters arranged in a matrix can be selected and driven one by one from an end. A standard emitter requires an emitter current of 0.5 mA to obtain an emission electron amount of 1 μA. In this case, the voltage applied to each emitter is 14.5 V. In selecting and driving one emitter, the initial value of the injection current If is set to 0.5 mA, the potential Vs is fixed to −7.5 V, and the initial value of the potential Vns is set to 7 V. With these set values, the selected emitter is driven, and the voltage Ve applied to the corresponding column wiring layer is measured by a Ve measurement circuit 515. The potential Vns is changed to the measured potential. A current Ie emitted from each selected emitter is measured by the ammeter 514. If the measured current Ie does not reach a desired current value 1 μA, a set current If is increased by a set current step width of 0.1 mA. The potential Ve is measured, and the potential Vns is set. The current Ie is then measured. If the current Ie exceeds a desired current, the set current is decreased by the step width. The current Ie is then measured in the same manner. The set current step width is repeatedly reduced to ½, and this series of operations is repeated until the current Ie converges to the desired current value 1 [μA]±0.01 [μA]. The set current If obtained when the current Ie converges to the desired current value is written as correction data in an efficiency correction LUT 1 (Look Up Table 1), and the corresponding potential Ve is temporarily stored as Ve at the corresponding address.

If the current Ie does not converge to the desired value, and the potential Ve exceeds the set range (6 V to 8V in this embodiment), "0" is written in the efficiency correction LUT 1 at the corresponding address to indicate that the emitter is an abnormal emitter, and a standard value of 7 V is written as a temporarily stored value of Ve.

After a set value for one selected emitter is determined, an adjacent emitter is sequentially selected. With similar processing, temporary storage of correction data and Ve at the corresponding addresses is repeated.

After the above series of operations for one row is completed, the arithmetic mean Veave of the temporarily stored potentials Ve is calculated, and the calculated value is written as a Vns set value of the row in a LUT 2 in the Vns generation circuit.

Figure 30:
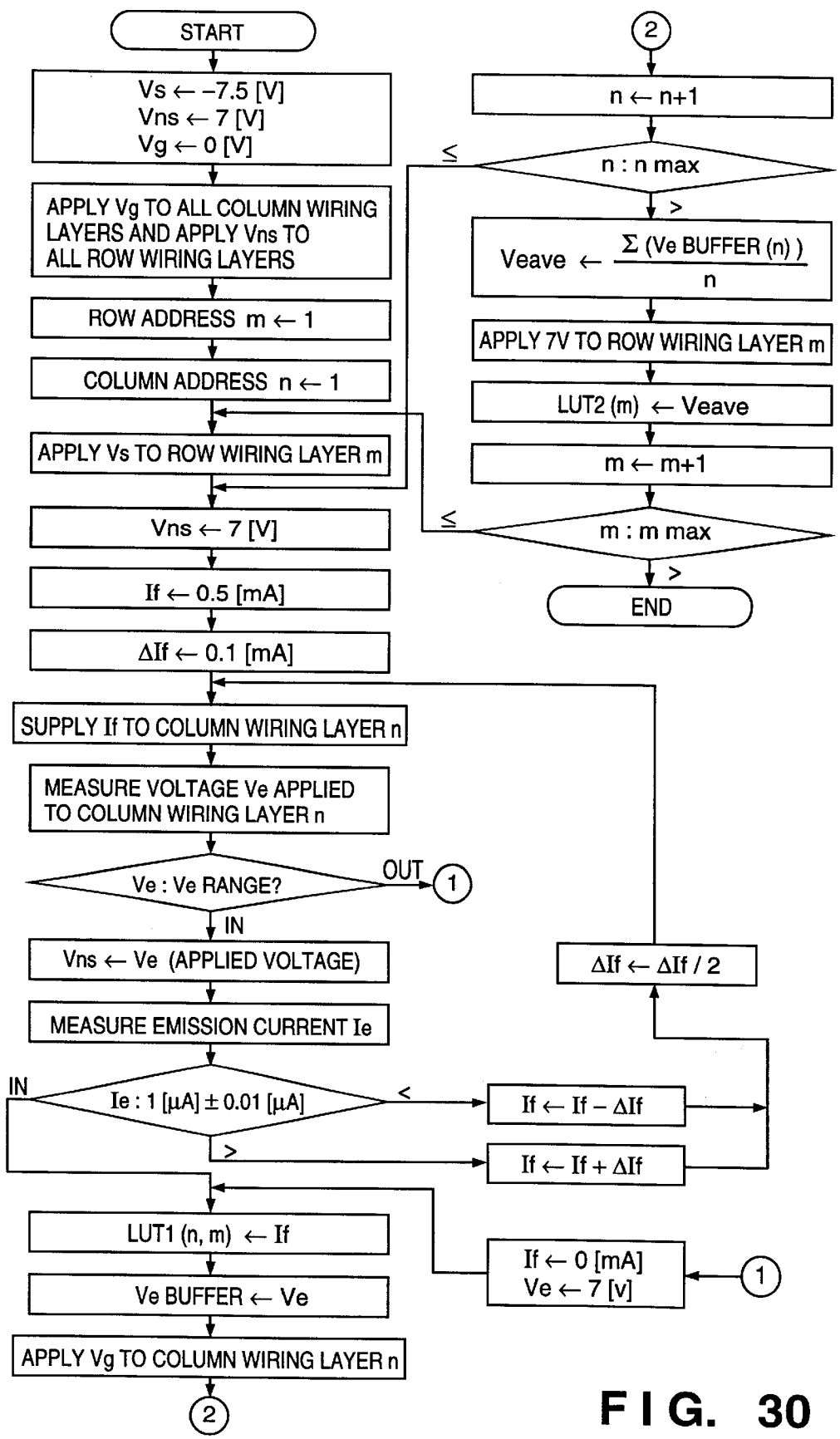
FIG. 30 is a flow chart showing a procedure for measuring a characteristic of each emitter and determining the mean Veave in units of rows.

FIG. 30 is a flow chart showing the above series of operations.

In this manner, efficiency correction values for all the emitters in the display panel, and Vns set values for the respective rows are acquired.

With these settings, the voltages applied to the semi-selected emitters on a column wiring layer to which a selected emitter is connected range from 0 V to 0.5 V. The voltages applied to the emitters on a column wiring layer to which no selected emitter is connected range from 7 V to 7.5 V. That is, the applied voltages are lower than the electron emission threshold voltage.

When 0.5 V is applied to each emitter, the current flowing in each emitter is as small as several ten nA, and a sum total Ifn of currents flowing in the semi-selected emitters is as small as several ten $\mu$A, which is sufficiently smaller than 0.5 mA that is the value of a current flowing in each selected emitter. For this reason, no correction is required.

Figure 31:
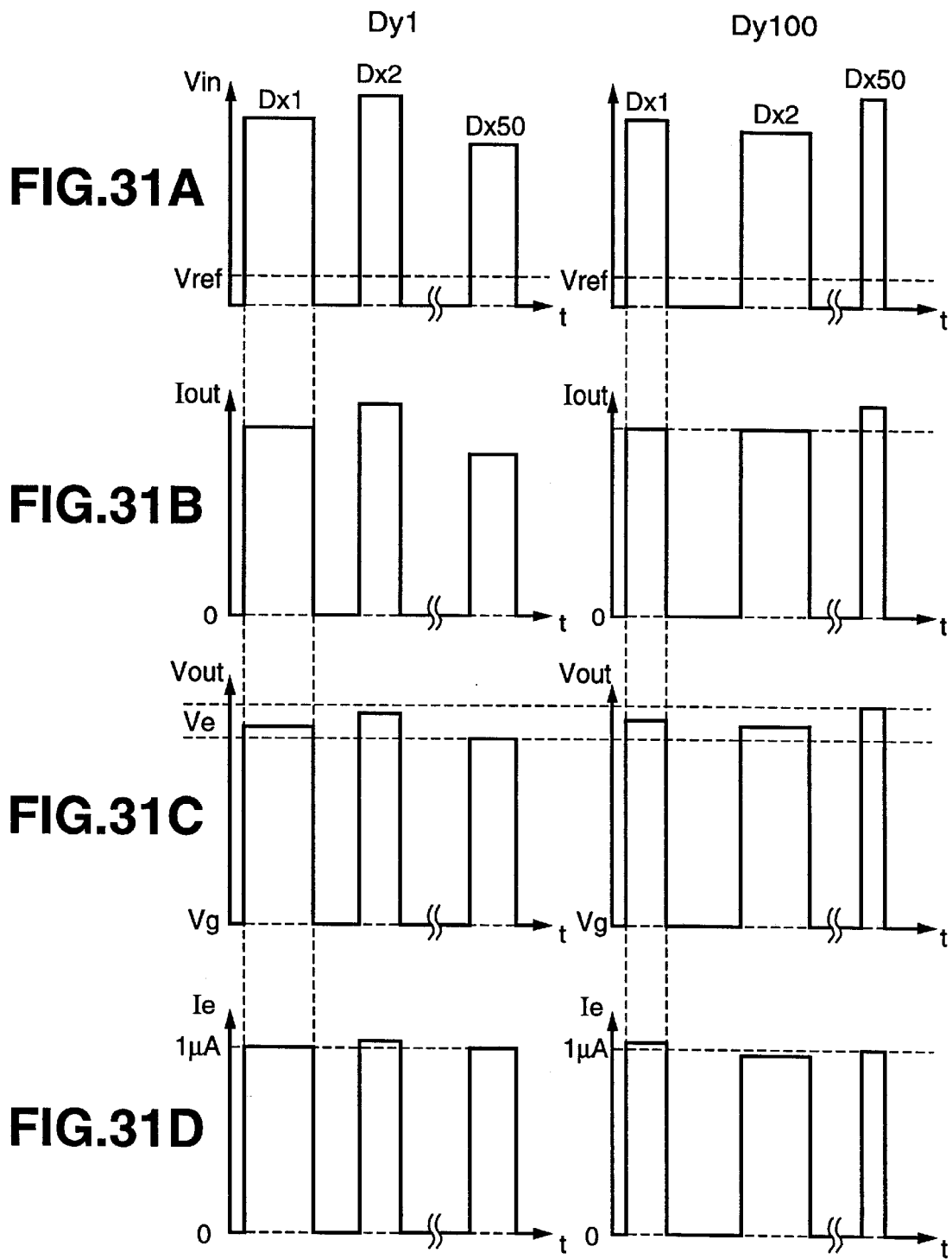
FIGS. 31A to 31D are timing charts showing the waveforms of signals in the third embodiment.

FIGS. 31A to 31D show how an input waveform from the modulation circuit is actually converted into a current waveform. Consider the column wiring layers $D_{y1}$ and $D_{y100}$ of the display panel. Assume that a voltage Vin like the one shown in FIG. 31A is input to the circuit in FIG. 6 to drive the emitters connected to row wiring layers $D_{x1}$, $D_{x2}$, $D_{x3}$, $D_{x4}$, . . . . The width of each voltage pulse reflects luminance data. The peak value of each pulse corresponds to a voltage at which an output current Iout becomes a current value to be injected into each emitter on the basis of a corresponding correction value acquired by the above method and stored in the LUT 1, and the waveform of the output Iout from the voltage/current conversion circuit has peak values coinciding with the correction values in the LUT 1, as shown in FIG. 31B. FIG. 31C shows the output voltages from the voltage/current conversion circuit in this case. As is apparent, different voltages are output in units of column wiring layers.

FIG. 31D shows the state of emission currents Ie in a driving operation under these conditions. As is apparent, the emission currents from the respective emitters fall within the range of 1 $\mu$A±0.01 $\mu$A.

According to this embodiment, currents shunted to semi-selected emitters can be eliminated, and the output current from the modulation circuit can be made to coincide with a current flowing in a selected emitter. For this reason, an image can be displayed with luminances very faithful to an original image signal throughout the display screen.

In this embodiment, the voltage Vns applied to a non-selected row wiring layer is set to the average of the voltages Ve applied to column wiring layers corresponding to one row. However, a similar effect can be obtained even if the voltage Vns is set to the average of the applied voltages Ve corresponding to all the rows instead of one row. In addition, the voltage Vns need not always be set to an average, but may be set to a value within the range in which the voltage Ve changes, e.g., the minimum value. With this setting, a current flowing in each semi-selected emitter can be reduced.

Fourth Embodiment

Figure 32:
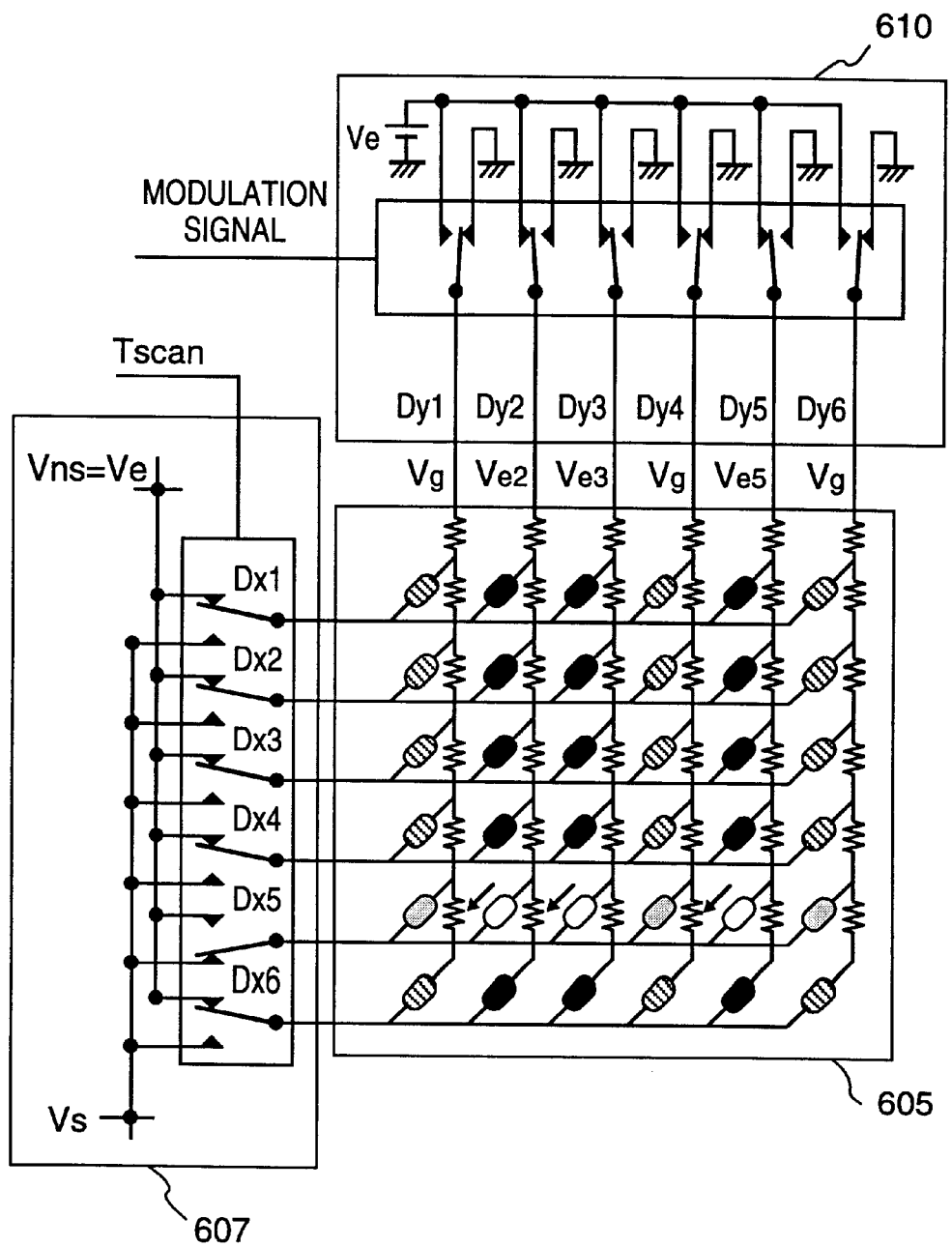
FIG. 32 is a circuit diagram showing a driving circuit for voltage-driving an electron source.

The fourth embodiment of the present invention will be described. A method of driving a multi-electron source according to this embodiment and an image display apparatus using the same have the following structure, as shown in FIG. 32.

This apparatus includes a multi-electron source 605 having surface-conduction type electron emitters, like those in the first embodiment, arranged in the form of a simple matrix, and a scanning/driving unit 603 for sequentially selecting row wiring layers. A potential Vs is applied to a selected row wiring layer, and a potential Vns is applied to a non-selected row wiring layer.

This apparatus also includes a voltage driving unit 610 for applying modulation signals to surface-conduction type electron emitters via column wiring layers. The voltage driving unit 610 fixes the potential of a column wiring layer corresponding to an emitter which is not to emit no electrons to a potential Vg, and applies a modulation voltage pulse signal Ve to a column wiring layer corresponding to an emitter which is to emit electrons. In this embodiment, a modulation circuit has no V/I conversion circuit. Although FIG. 32 shows only a 6×6 matrix of emitters, a 1,000 (row)×100 (column) matrix of emitters is formed in this embodiment. In the embodiment, the column wiring layers have large resistances.

Both the differences between the potentials Vns and Vg and between the potentials Vg and Vs are set to be smaller than a threshold at which electron emission occurs from an emitter, and the potential Vns is set to be equal to the voltage Ve applied to each column wiring layer.

According to this structure, a potential Ve−Vs is applied to one of the emitters connected to a column wiring layer, corresponding to an emitter which is to emit electrons, which is located on a selected row wiring layer. Meanwhile, a potential Ve−Vns, i.e., 0, is applied to each of the emitters on the non-selected row wiring layers, and hence the magnitude of a current flowing in each emitter can be neglected. As a result, all the currents which are injected into the column wiring layers to drive the surface-conduction type electron emitters flow to the emitters which are to emit electrons, but are not shunted to the semi-selected emitters. Since no correction is required for voltage drops due to currents shunted to semi-selected emitters, a simple circuit can drive each emitter at a constant voltage. This is one of the advantageous points of this embodiment.

A method of driving the image display apparatus will be described next.

Figure 33:
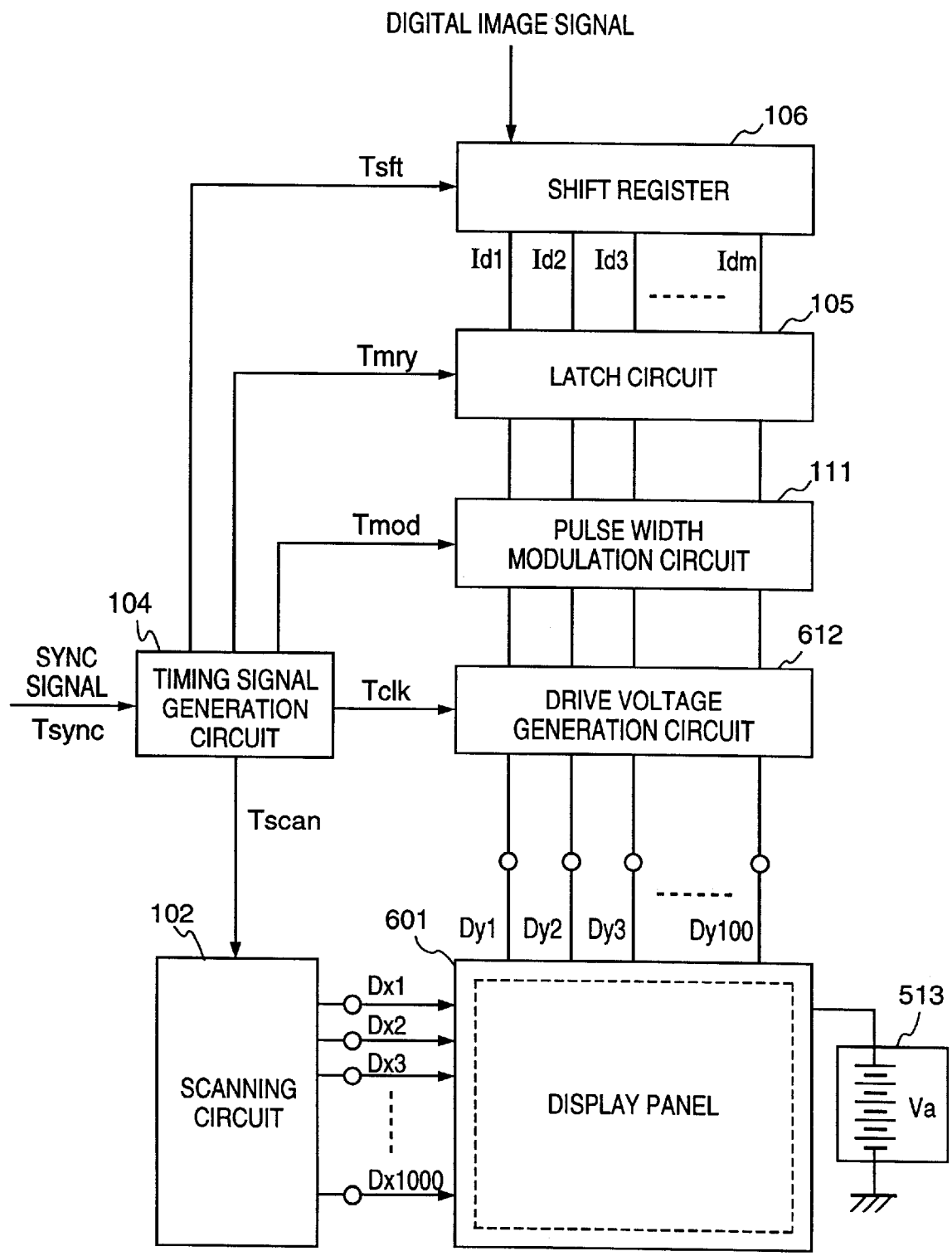
FIG. 33 is a block diagram showing a driving circuit for voltage-driving an image display apparatus according to the fourth embodiment of the present invention.

The structure of the image display apparatus including the surface-conduction type electron emitters will be described first with reference to FIG. 33. Referring to FIG. 33, reference numeral 601 denotes a display panel connected to an external electric circuit via terminals $D_{x1}$ to $D_{x1000}$ and $D_{y1}$ to $D_{y100}$. The high-voltage terminal on the faceplate is connected to an external high-voltage source 513. A high voltage Va is applied to this high-voltage terminal to accelerate emission electrons. A scanning signal for sequentially driving the multi-electron source in the above panel, i.e., the surface-conduction type electron emitters wired in the form of a 1,000 (row)×100 (column) matrix in units of rows is applied to each of the terminals $D_{x1}$ to $D_{x1000}$.

Meanwhile, a modulation signal for controlling the output electron beam from each surface-conduction type electron emitter on a row selected by the scanning signal is applied to each of the terminals $D_{y1}$ to $D_{y100}$.

A scanning circuit 402 will be described next. This circuit incorporates 1,000 switching elements. Each switching element selects an output voltage Vs from a voltage source (not shown) or a voltage Vns, i.e., a potential equal to the voltage Ve applied to a column wiring layer, and is electrically connected to the terminals $D_{x1}$ to $D_{x1000}$ of the display panel 601. Each switching element has the circuit shown in FIG.

3 as in the first embodiment. As shown in FIG. 4, the scanning circuit 402 switches an output Dxm to Vs or Vns in synchronism with a timing signal Txm generated from a control signal Tscan and corresponding to each row wiring layer.

In this embodiment, the DC power supply voltage Vs is set to −7.5 V. As in the first embodiment, when the desired electron emission current is 1 μA, the voltage applied to each emitter becomes constant at 14.5 V. For this reason, the voltage Ve applied to each column wiring layer is set to 7.0 V. The voltage Vns applied to each non-selected row wiring layer is also set to 7.0 V. With these settings, the voltage applied to each semi-selected emitter becomes 0 V.

The flow of an input image signal will be described next. An input composite image signal is converted into a pulse signal having a pulse width corresponding to the image signal intensity, and is further converted into an electrical signal by the same method as that in the first embodiment.

Upon reception of this pulse signal, a drive voltage generation circuit 612 generates a pulse having a peak value equal to Ve, i.e., 7.0 V. This output is connected to the column wiring layers $D_{y1}$ to $D_{y100}$ of the display panel.

The display panel used in this embodiment has high column wiring layer resistances. For this reason, if the display panel is driven by the voltage application method described in "DESCRIPTION OF THE RELATED ART", voltage drops across the resistances cannot be neglected. More specifically, large voltage drops occur due to semi-selection currents flowing in the semi-selected emitters of the emitters connected to column wiring layers. For this reason, even if modulation signals applied to column wiring layers have the same voltage, different voltages are applied to the emitters depending on whether emitters near the column wiring layer driving unit are selected or emitters located far away from the column wiring layer driving unit are selected. That is, the voltage applied to an emitter near the driving unit becomes higher than that applied to an emitter located far away from the driving unit. According to the method of this embodiment, however, no semi-selection current flows in semi-selected emitters, and emitters can be driven at a uniform voltage regardless of the distance from the driving unit. An image can therefore be displayed with luminances very faithful to an original image signal throughout the display screen.

Fifth Embodiment

In the first to fourth embodiments, the multi-electron sources and the display panels have been described above. However, when the surface-conduction type electron emitters incorporated in these units were replaced with other types of electron emitters, it was found that the driving methods of the present invention were equally effective.

When the present inventors executed the driving methods of the first to fourth embodiments for electron sources and display panels using field emitters as electron emitters, currents flowing in semi-selected emitters were greatly reduced.

Figure 34A:
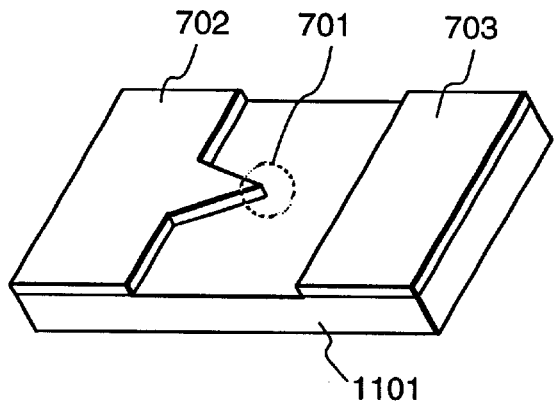
FIGS. 34A to 34C are perspective views showing lateral-type field emitters.
Figure 34B:
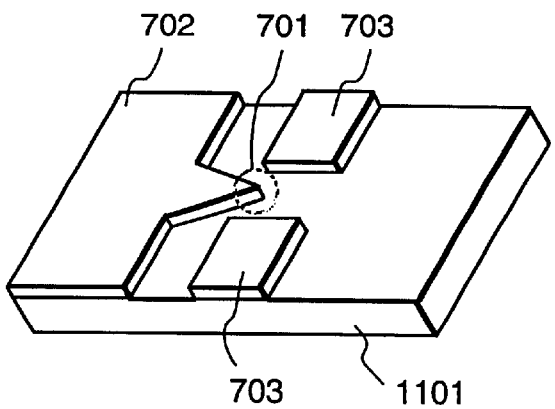
Figure 34C:
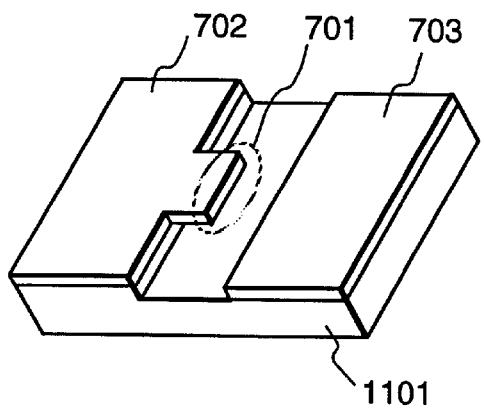

For examples, lateral-type field emitters like those shown in FIGS. 34A, 34B, and 34C were used in place of surface-conduction type electron emitters. Referring to FIGS. 34A to 34C, reference numeral 1101 denotes a glass substrate; 701, an electron-emitting portion; 702, a negative electrode; and 703, a gate (positive electrode). In each of these lateral-type field emitters, when an appropriate voltage is applied between the negative electrode 702 and the gate 703, an electron beam is emitted from the electron-emitting portion 701.

Figure 35:
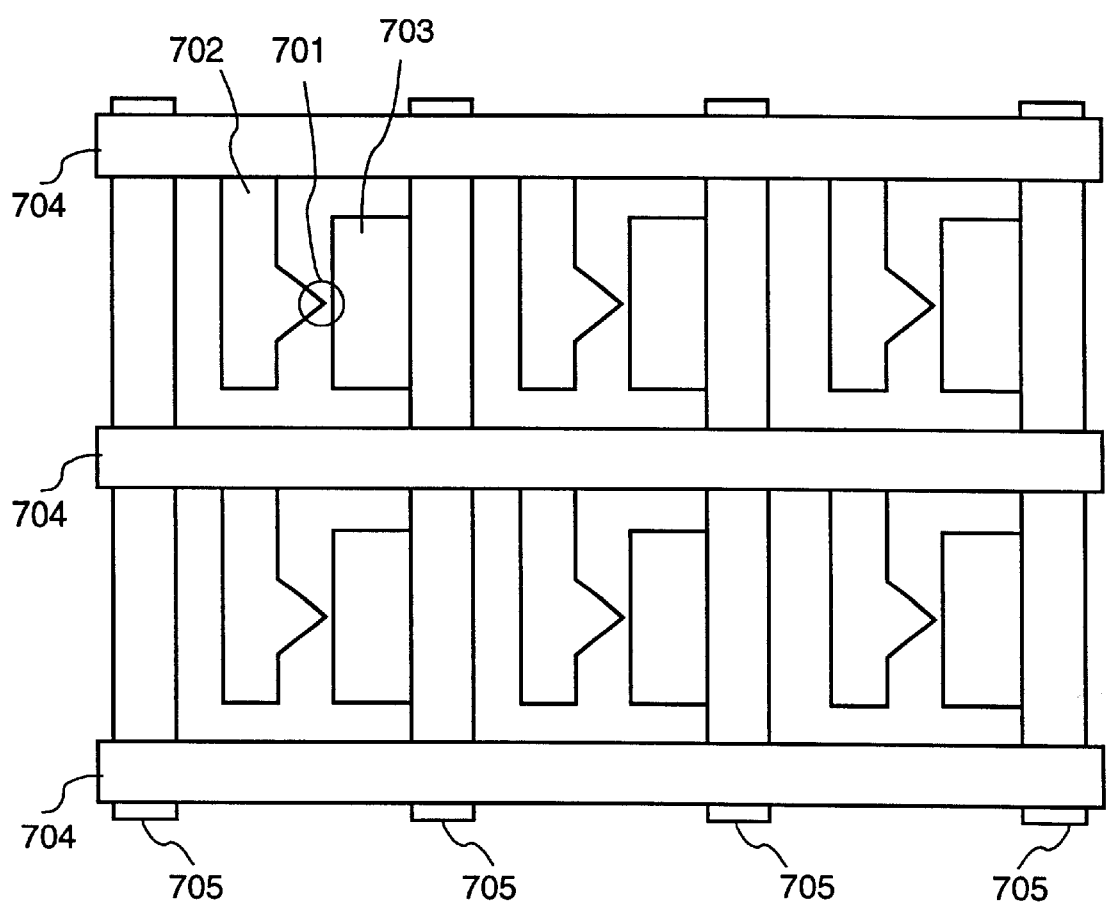
FIG. 35 is a view showing a multi-electron source using lateral-type field emitters.

FIG. 35 is a plan view showing a multi-electron source having lateral-type field emitters, each identical to the one shown in FIG. 34A, wired in the form of a matrix. Referring to FIG. 35, reference numeral 704 denotes a row wiring layer to which the negative electrodes 702 of the lateral-type field emitters are commonly connected; and 705, a column wiring layer to which the gates 703 of the lateral-type field emitters are commonly connected.

When the driving method of the present invention was applied to the above multi-electron source and an image display apparatus having the multi-electron source, an electron beam having a desired intensity could be accurately output without using any complicated compensation circuit. In addition, the power consumed by each semi-selected emitter could be reduced.

Furthermore, the present invention was effective for an electron source using electron emitters different from those described above and an image display apparatus using the electron source. For example, the present invention was also effective for Spindt-type field emitters and MIM-type electron emitters.

Sixth Embodiment

Figure 36:
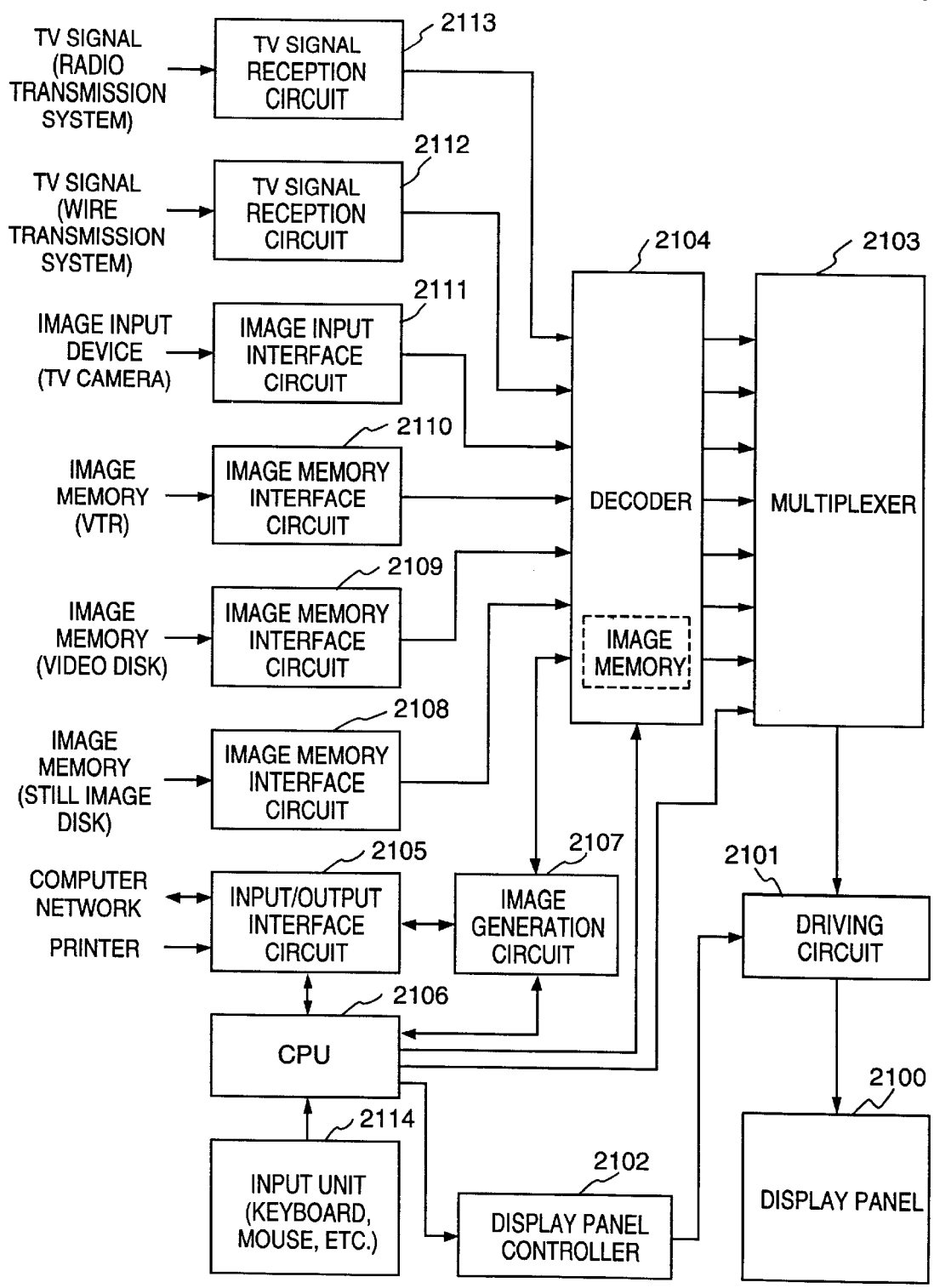
FIG. 36 is a block diagram showing the arrangement of a multi-image display apparatus.
Figure 37:
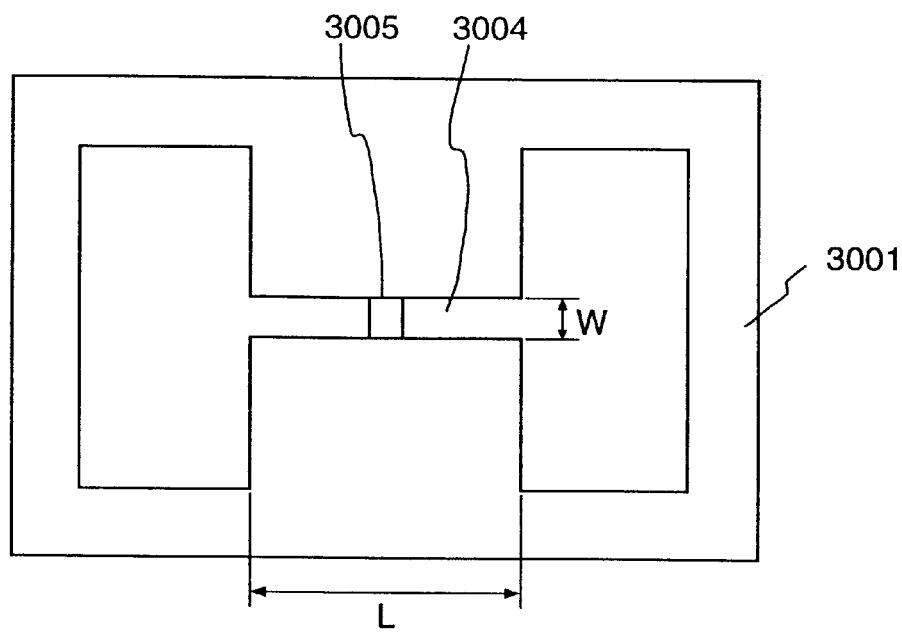
FIG. 37 is a view showing a conventional surface-conduction type electron emitter.

FIG. 36 shows a multi-function display apparatus designed to display image information provided from various image information sources such as a TV broadcast on a display panel using surface-conduction type electron emitters, manufactured by the manufacturing method described above, for an electron source.

Referring to FIG. 36, reference numeral 2100 denotes a display panel; 2101, a driving circuit for the display panel 2100; 2102, a display panel controller; 2103, a multiplexer; 2104, a decoder; 2105, an input/output interface circuit; 2106, a CPU; 2107, an image generation circuit; 2108, 2109, and 2110, image memory interface circuits; 2111, an image input interface circuit; 2112 and 2113, TV signal reception circuits; and 2114, an input unit.

Note that this display apparatus is designed to display images and reproduce sounds at the same time upon reception of a signal including both video information and audio information, e.g., a TV signal. Since circuits, a speaker, and the like associated with reception, separation, reproduction, processing, storage, and the like of audio information are not directly associated with the features of the embodiments of the present invention, a description thereof will be omitted.

The functions of the respective units will be described along the flow of an image signal.

The TV signal reception circuit 2113 is a circuit for receiving a TV image signal transmitted through a radio transmission system such as a radio or spatial optical communication system. The scheme of a TV signal to be received is not specifically limited. For example, the NTSC scheme, the PAL scheme, or the SECAM scheme may be used. A signal source for a TV signal consisting of a larger number of scanning lines (a so-called high-definition TV signal such as a signal of the MUSE scheme or the MPEG II Scheme) is suitably used to make the most of the above display panel suitable for a large screen or a large number of pixels. The TV signal received by the TV signal reception circuit 2113 is output to the decoder 2104.

The TV signal reception circuit 2112 is a circuit for receiving a TV image signal transmitted through a wire transmission system using a coaxial cable, an optical fiber, or the like. Similar to the TV signal reception circuit 2113, the scheme of a TV signal to be received is not specifically limited. The TV signal received by this circuit is also output to the decoder 2104.

The image input interface circuit 2111 is a circuit for inputting an image signal supplied from an image input apparatus such as a TV camera or an image scanner. The input image signal is output to the decoder 2104.

The image memory interface circuit 2110 is a circuit for inputting an image signal stored in a video tape recorder (to be abbreviated as VTR). The input image signal is output to the decoder 2104.

The image memory interface circuit 2109 is a circuit for inputting an image signal stored in a video disk. The input image signal is output to the decoder 2104.

The image memory interface circuit 2108 is a circuit for inputting an image signal from an emitter storing still image data, such as a still image disk. The input still image data is output to the decoder 2104.

The input/output interface circuit 2105 is a circuit for connecting this display apparatus to an external computer, a computer network, or an output apparatus such as a printer. The input/output interface circuit 2105 performs input/output processing of image data and character/graphic information. In some case, this circuit can perform input/output processing of control signals and numerical data between the CPU 2106 of the display apparatus and an external unit.

The image generation circuit 2107 is a circuit for generating display image data on the basis of image data and character/graphic information externally input through the input/output interface circuit 2105 or image data and character/graphic information output from the CPU 2106. For example, this circuit incorporates a random-access memory for storing image and character/graphic information, a read-only memory in which image patterns corresponding to character codes are stored, and circuits required for generation of images, such as a processor for image processing.

The display image data generated by the image generation circuit 2107 is output to the decoder 2104. In some case, the image data may be input/output to/from an external computer network or a printer through the input/output interface circuit 2105.

The CPU 2106 mainly performs operation control of the display apparatus and generation, selection, and editing of a display image.

For example, the CPU 2106 outputs a control signal to the multiplexer 2103 to properly select or combine image signals to be displayed on the display panel. In this case, the CPU 2106 generates a control signal for the display panel controller 2102 in accordance with an image signal to be displayed, and properly controls the operation of the display apparatus, e.g., the screen display frequency, the scanning method (e.g., the interlaced or non-interlaced'scanning mode), and the number of scanning lines per frame.

In addition, the CPU 2106 directly outputs character/graphic information to the image generation circuit 2107, and inputs image data and character/graphic information by accessing an external computer or memory through the input/output interface circuit 2105.

Note that the CPU 2106 may be associated with operations for other purposes. For example, the CPU 2106 may be directly associated with a function of generating and processing information, such as a function of a personal computer or wordprocessor.

Alternatively, as described above, the CPU 2106 may be connected to an external computer network via the input/output interface circuit 2105 to perform numerical calculations and the like in cooperation with an external device.

The input unit 2114 is used by the user to input an instruction, a program, or data to the CPU 2106. For example, as the input unit 2114, various input devices, e.g., a keyboard, a mouse, a joystick, a bar code reader, and a speech recognition device, can be used.

The decoder 2104 is a circuit for inversely converting various image signals input from the image generation circuit 2107 or the TV signal reception circuits 2112 and 2113 into three primary color signals or luminance signals and I and Q signals. As indicated by the dotted line in FIG. 35, the decoder 2104 preferably incorporates an image memory. With this memory, the decoder 2104 can process a TV signal, e.g., a signal of the MUSE scheme, which demands an image memory for inverse conversion. In addition, with the image memory, a still image can be easily displayed, and the decoder 2104 can easily perform image processing and editing such as thinning, interpolation, enlargement, reduction, and synthesis of images.

The multiplexer 2103 properly selects a display image on the basis of a control signal input from the CPU 2106. More specifically, the multiplexer 2103 selects a desired image signal from inversely converted image signals input from the decoder 2104, and outputs the selected signal to the driving circuit 2101. In this case, by switching and selecting image signals within one frame display period, one screen is divided into a plurality of areas, and different images can be displayed in the respective areas as in a so-called multi-screen TV set.

The display panel controller 2102 is a circuit for controlling the operation of the driving circuit 2101 on the basis of a control signal input from the CPU 2106.

As for a basic operation of the display panel, for example, a signal for controlling the operation sequence of a driving power supply (not shown) for the display panel is output to the driving circuit 2101.

As for the driving method for the display panel, for example, a signal for controlling the frame display frequency or the scanning method (the interlaced or non-interlaced scanning mode) is output to the driving circuit 2101.

In some case, a control signal associated with the adjustment of image quality, e.g., the luminance, contrast, tone, and sharpness of the displayed image may be output to the driving circuit 2101.

The driving circuit 2101 is a circuit for generating a drive signal to be applied to the display panel 2100. The driving circuit 2101 operates on the basis of an image signal input from the multiplexer 2103 and a control signal input from the display panel controller 2102.

The functions of the respective units have been described above. With the arrangement shown in FIG. 36, in this display apparatus, image information input from various information sources can be displayed on the display panel 2100.

Various types of image signals such as TV signals are inversely converted by the decoder 2104. Some of the resultant signals are properly selected by the multiplexer 2103 to be input to the driving circuit 2101. Meanwhile, the display panel controller 2102 generates a control signal for controlling the operation of the driving circuit 2101 in accordance with each image signal to be displayed. The driving circuit 2101 applies a drive signal to the display panel 2100 on the basis of the image signal and the control signal.

With this operation, an image is displayed on the display panel 2100. This series of operations is systematically controlled by the CPU 2106.

With the use of the image memory incorporated in the decoder 2104, the image generation circuit 2107, and the CPU 2106, this apparatus can perform image processing for image information to be displayed, e.g., enlargement, reduction, rotation, shift, edge emphasis, thinning, interpolation, color conversion, and aspect ratio conversion, and image editing such as synthesis, deletion, connection, replacement, and insertion as well as displaying selected information of pieces of image information. Although not mentioned in the description of this embodiment, the apparatus may include circuits exclusively used for processing and editing of audio information as in the case of the above image processing and editing.

This display apparatus can therefore have various functions to serve as a display device for TV broadcasting, a terminal device for a video conference, an image editing device for still and motion images, a computer terminal device, an office terminal device such as a wordprocessor, a game machine, and the like. That is, the range of applications of the apparatus as an industrial product or consumer product is very wide.

FIG. 36 shows only an example of the arrangement of a display apparatus using a display panel having an electron source constituted by surface-conduction type electron emitters. As is apparent, the present invention is not limited to this. For example, of the constituent elements shown in FIG. 36, circuits associated with functions which are not required for a certain application purpose can be omitted. In contrast to this, other constituent elements may be added depending on the intended application purpose. If, for example, this display apparatus is used as a TV telephone set, a TV camera, a microphone, an illumination unit, a transmission/reception circuit including a modem, and the like are preferably added.

In this display apparatus, a display panel having a electron source constituted by the surface-conduction type electron emitters can be easily reduced in profile. The depth of the overall display apparatus can therefore be reduced. In addition, a display panel having an electron source constituted by the surface-conduction type electron emitters can be easily increased in screen size, and has excellent view angle characteristics with high luminance. The display apparatus can therefore display an image with a realistic, powerful effect and good visibility.

The present invention can be applied to a system constituted by a plurality of devices or an apparatus constituted by one device. As is apparent, the present invention can also be applied to a case wherein the effects of the present invention are obtained by supplying programs to a system or apparatus.

As has been described above, according to each embodiment of the present invention, in the driving method in which surface-conduction type electron emitters are wired in the form of a matrix, and an electron emission distribution caused by a voltage distribution on the wiring layers can be compensated, the amount of current shunted to each semi-selected emitter can be reduced by appropriately selecting the combination of voltages applied to the wiring layers.

The overall multi-electron source can therefore be driven, at a very low cost, with an electron emission amount faithfully reflecting the level of an original signal.

As many apparently widely different embodiments of the present invention can be made without departing from the spirit and scope thereof, it is to be understood that the invention is not limited to the specific embodiments thereof except as defined in the appended claims.

What is claimed is:

1. An electron generating device comprising a multi-electron source having a plurality of electron emitters wired in the form of a matrix through a plurality of data wiring layers and a plurality of scanning wiring layers, and a driving circuit for driving said multi-electron source, said driving circuit including:

first driving means for applying a first voltage to a scanning wiring layer to which an electron emitter which is to emit electrons is connected, and applying a second voltage to a remaining scanning wiring layer of the plurality of scanning wiring layers to which an electron emitter which is not to emit electrons is connected; and second driving means for selectively applying one of a third voltage and a fourth voltage, wherein the third voltage is applied to a data wiring layer to which an electron emitter which is to emit electrons is connected and the fourth voltage is applied to a data wiring layer to which an electron emitter which is not to emit electrons is connected, wherein the second voltage is substantially equal to the third voltage.

2. The device according to claim 1, wherein the first and second voltages applied to the scanning wiring layers are based on a scanning signal for selecting each row of the matrix.

3. The device according to claim 1, further comprising modulation means for generating a modulation signal based on a image signal.

4. The device according to claim 3, wherein the third and fourth voltages applied to the data wiring layers are based on the modulation signal.

5. The device according to claim 3, wherein the modulation signal is a pulse-width modulated signal.

6. The device according to claim 3, wherein the modulation signal is a amplitude modulated signal.

7. The device according to claim 1, wherein the electron emitter is a surface-conduction type electron emitter having a nonlinear characteristic including a threshold voltage point as a boundary point between electron emission and non-electron emission in a relationship between a voltage applied to a pair of emitter electrodes and a corresponding electron emission amount.

8. The device according to claim 1, wherein both a potential difference between the second voltage and the fourth voltage and a potential difference between the fourth voltage and the first voltage are smaller than a value of the threshold voltage point.

9. The device according to claim 1, wherein said driving circuit generates the first and second voltages by using a push-pull structure.

10. The device according to claim 1, wherein said second driving means further comprises measurement means for measuring emitter currents flowing in the electron emitters and variations in input/output efficiencies of the electron emitters, and storage means for storing correction values for correcting the input/output efficiency variations measured by said measurement means, and said second driving means generates the third and fourth voltages on the basis of the correction values stored in said storage means and the modulation signal.

11. The device according to claim 1, wherein said second driving means comprises a controlled current source connected to the data wiring layer.

12. An image display apparatus comprising said electron generating device defined in one of claims 1 to 11, and light-emitting means for emitting light upon reception of electrons emitted from said electron generating device.

13. The device according to claim 1, wherein the second voltage is substantially equal to the third voltage within a range defined by upper and lower limits of variations in the third voltage at the respective data wiring layers.

14. A driving circuit for driving a multi-electron source having a plurality of electron emitters wired in the form of a matrix through a plurality of data wiring layers and a plurality of scanning wiring layers, comprising:
first driving means for applying a first voltage to a scanning wiring layer to which an electron emitter which is to emit electrons is connected, and applying a second voltage to a remaining scanning wiring layer of the plurality of scanning wiring layers to which an electron emitter which is not to emit electrons is connected; and
second driving means for selectively applying one of a third voltage and a fourth voltage, wherein the third voltage is applied to a data wiring layer to which an electron emitter which is to emit electrons is connected and the fourth voltage is applied to a data wiring layer to which an electron emitter which is not to emit electrons is connected,
wherein the second voltage is substantially equal to the third voltage.

15. The circuit according to claim 14, wherein the first and second voltages applied to the scanning wiring layers are based on a scanning signal for selecting each row of the matrix.

16. The circuit according to claim 14, further comprising modulation means for generating a modulation signal based on a image signal.

17. The circuit according to claim 16, wherein the third and fourth voltages applied to the data wiring layers are based on the modulation signal.

18. The circuit according to claim 16, wherein the modulation signal is a pulse-width modulated signal.

19. The circuit according to claim 16, wherein the modulation signal is an amplitude modulated signal.

20. The circuit according to claim 14, wherein the second voltage is substantially equal to the third voltage within a range defined by upper and lower limits of variations in the third voltage at the respective data wiring layers.

21. A method of driving an electron generating device comprising a multi-electron source having a plurality of electron emitters wired in the form of a matrix through a plurality of data wiring layers and a plurality of scanning wiring layers, and a driving circuit for driving said multi-electron source, comprising the steps of:
applying a first voltage to a scanning wiring layer to which an electron emitter which is to emit electrons is connected;
applying a second voltage to a remaining scanning wiring layer of the plurality of scanning wiring layers to which an electron emitter which is not to emit electrons is connected;
selectively applying one of a third voltage and a fourth voltage, wherein the third voltage is applied to a data wiring layer to which an electron emitter which is to emit electrons is connected and the fourth voltage is applied to a data wiring layer to which an electron emitter which is not to emit electrons is connected, wherein the second voltage is substantially equal to the third voltage.

22. The method according to claim 21, wherein the first and second voltages applied to the scanning wiring layers are based on a scanning signal for selecting each row of the matrix.

23. The method according to claim 21, further comprising modulation means for generating a modulation signal by modulating a video signal.

24. The method according to claim 23, wherein the third and fourth voltages applied to the data wiring-layers are based on the modulation signal.

25. The method according to claim 23, wherein the modulation signal is a pulse-width modulated signal.

26. The method according to claim 23, wherein the modulation signal is an amplitude modulated signal.

27. The method according to claim 21, wherein the second voltage is substantially equal to the third voltage within a range defined by upper and lower limits of variations in the third voltage at the respective data wiring layers.

28. The device according to claim 1, wherein the second voltage is substantially the same as a minimum value of the third voltage.

29. The device according to claim 1, wherein the second voltage is substantially the same as the third voltage which is applied to the data wiring layer located nearest to a scanning circuit.

30. The device according to claim 1, wherein the third voltage is determined in advance.

31. The device according to claim 1, wherein the third voltage is determined by a simulation.

32. The device according to claim 1, wherein the second voltage is substantially the same as a mean value of the third voltage applied to the data wiring layers.

33. The circuit according to claim 14, wherein the second voltage is substantially the same as a minimum value of the third voltage.

34. The circuit according to claim 14, wherein the second voltage is substantially the same as the third voltage which is applied to the data wiring layer located nearest to a scanning circuit.

35. The circuit according to claim 14, wherein the third voltage is determined in advance.

36. The circuit according to claim 14, wherein the third voltage is determined by a simulation.

37. The circuit according to claim 14, wherein the second voltage is substantially the same as a mean value of the third voltage applied to the data wiring layers.

38. The method according to claim 21, wherein the second voltage is substantially the same as a minimum value of the third voltage.

39. The method according to claim 21, wherein the second voltage is substantially the same as the third voltage which is applied to the data wiring layer located nearest to a scanning circuit.

40. The method according to claim 21, wherein the third voltage is determined in advance.

41. The method according to claim 21, wherein the third voltage is determined by a simulation.

42. The method according to claim 21, wherein the second voltage is substantially the same as a mean value of the third voltage applied to the data wiring layers.

43. A driving circuit for driving an electron source having a plurality of electron emitters wired in the form of a matrix through a plurality of data wiring layers and a plurality of scanning wiring layers, comprising:
first driving means for applying a first voltage to a scanning wiring layer to which an electron emitter which is to emit electrons is connected, and applying a second voltage to a remaining scanning wiring layer of the plurality of scanning wiring layers to which an electron emitter which is not to emit electrons is connected; and second driving means for applying a third voltage to a data wiring layer to which an electron emitter which is to emit electrons is connected, wherein the polarity of the first voltage is opposite to the polarity of the second voltage and the polarity of the second voltage is the same as the polarity of the third voltage.

44. The circuit according to claim 43, wherein said second driving means has a controlled current source connected to the data wiring.

45. The circuit according to claim 44, wherein said third voltage equals a voltage applied while a current flows from the controlled current source.

46. The circuit according to claim 43, further comprising means for applying a fourth voltage to a data wiring to which an electron emitter which is not to emit electrons is connected.

47. A driving circuit for driving an electron source having a plurality of electron emitters wired in the form of a matrix through a plurality of data wiring layers and a plurality of scanning wiring layers, comprising:

first driving means for applying a first voltage to a scanning wiring layer to which an electron emitter which is to emit electrons is connected, and applying a second voltage to a remaining scanning wiring layer of the plurality of scanning wiring layers to which an electron emitter which is not to emit electrons is connected; and a current source for supplying a current to a data wiring layer to which an electron emitter which is to emit electrons is connected, wherein the second voltage is substantially equal to a voltage applied while said current source supplies the current to the electron emitter so as to emit an electron.

48. The circuit according to claim 47, further comprising means for applying a fourth voltage to a data wiring to which an electron emitter which is not to emit electrons is connected.

49. An electron generating apparatus, comprising:

an electron source having a plurality of electron emitters wired in the form of a matrix through a plurality of data wiring layers and a plurality of scanning wiring layers; and a driving circuit for driving the electron source, said driving circuit including:

first driving means for applying a first voltage to a scanning wiring layer to which an electron emitter which is to emit electrons is connected, and applying a second voltage to a remaining scanning wiring layer of the plurality of scanning wiring layers to which an electron emitter which is not to emit electrons is connected; and second driving means for applying a third voltage to a data wiring layer to which an electron emitter which is to emit electrons is connected, wherein the polarity of the first voltage is opposite to the polarity of the second voltage and the polarity of the second voltage is the same as the polarity of the third voltage.

50. The apparatus according to claim 49, wherein said second driving means has a controlled current source connected to the data wiring.

51. The apparatus according to claim 50, wherein the third voltage equals a voltage applied when a current flows from the controlled current source.

52. The apparatus according to claim 49, further comprising means for applying a fourth voltage to a data wiring to which an electron emitter which is not to emit electrons is connected.

53. An electron generating apparatus, comprising:

an electron source having a plurality of electron emitters wired in the form of a matrix through a plurality of data wiring layers and a plurality of scanning wiring layers; and a driving circuit for driving the electron source, said driving circuit including:

first driving means for applying a first voltage to a scanning wiring layer to which an electron emitter which is to emit electrons is connected, and applying a second voltage to a remaining scanning wiring layer of the plurality of scanning wiring layers to which an electron emitter which is not to emit electrons is connected; and a current source for supplying a current to a data wiring layer to which an electron emitter which is to emit electrons is connected, wherein the second voltage is substantially equal to a voltage applied while said current source supplies the current to the electron emitter so as to emit an electron.

54. The apparatus according to claim 53, further comprising means for applying a fourth voltage to a data wiring to which an electron emitter which is not to emit electrons is connected.

55. A driving method for driving an electron source having a plurality of scanning emitters wired in the form of a matrix through a plurality of data wiring layers and a plurality of scanning wiring layers, comprising the steps of:

applying a first voltage to a scanning wiring layer to which an electron emitter which is to emit electrons is connected;

applying a second voltage to a remaining scanning wiring layer of the plurality of scanning wiring layers to which an electron emitter which is not to emit electrons is connected, wherein the polarity of the first voltage is opposite to the polarity of the second voltage; and applying a third voltage to a data wiring layer to which an electron emitter which is to emit electrons is connected, wherein the polarity of the second voltage is the same as the polarity of the third voltage.

56. The method according to claim 55, wherein the third voltage equals a voltage applied while a current flows from the controlled current source.

57. The method according to claim 55, further comprising the step of applying a fourth voltage to a data wiring to which an electron emitter which is not to emit electrons is connected, while the third voltage is applied to the data wiring layer to which the electron emitter which is to emit electrons is connected.

58. A driving method for driving an electron source having a plurality of electron emitters wired in the form of a matrix through a plurality of data wiring layers and a plurality of scanning wiring layers, comprising the steps of:

applying a first voltage to a scanning wiring layer to which an electron emitter which is to emit electrons is connected, and applying a second voltage to a remaining scanning wiring layer of the plurality of scanning wiring layers to which an electron emitter which is not to emit electrons is connected; and supplying a current to a data wiring layer to which an electron emitter which is to emit electrons is connected, wherein the second voltage is substantially equal to a voltage applied while said current source supplies the current to the electron emitter so as to emit an electron.

59. The method according to claim 58, further comprising the step of applying a fourth voltage to a data wiring to which an electron emitter which is not to emit electrons is connected, while the third voltage is applied to the data wiring layer to which the electron emitter which is to emit electrons is connected.

* * * * *

UNITED STATES PATENT AND TRADEMARK OFFICE
CERTIFICATE OF CORRECTION

PATENT NO. : 6,339,414 B1
DATED : January 15, 2002
INVENTOR(S) : Yasuyuki Todokoro et al.

It is certified that error appears in the above-identified patent and that said Letters Patent is hereby corrected as shown below:

Title page,
Item [56], References Cited, FOREIGN PATENT DOCUMENTS, "JP 59-181880 10/1994" should read -- JP 59-181880 10/1984 --; and
"JP 63-150387 6/1988" should read -- JP 63-150837 6/1988 --.

Column 1,
Line 16, "(to-be" should read -- (to be --.

Column 5,
Line 29, "le" should read -- Ie --;
Line 31, "le/emitter" should read -- Ie/emitter --;
Lines 32, 35, 40, 43, 47 and 55, "lout" should read -- Iout --; and
Line 58, "added-to" should read -- added to --.

Column 6,
Line 22, "preset" should read -- present --; and
Line 51, "a" (2nd occurrence) should read -- an --.

Column 7,
Line 51, "a" (2nd occurrence) should read -- an --.

Column 16,
Line 58, "Bettering" should read -- gettering --.

Column 17,
Line 36, "a" should read -- an --.

Column 18,
Line 19, $In_{203}$," should read -- $In_2O_3$, --; and
Line 20, "$Sb_{203}$," should read -- $Sb_2O_3$, --.

Column 19,
Line 38, "FIG. 1C," should read -- FIG. 11C, --.

Column 20,
Line 16, "thickness-of" should read -- thickness of --; and
Line 64, "is-used" should read -- is used --.

UNITED STATES PATENT AND TRADEMARK OFFICE
CERTIFICATE OF CORRECTION

PATENT NO. : 6,339,414 B1
DATED : January 15, 2002
INVENTOR(S) : Yasuyuki Todokoro et al.

It is certified that error appears in the above-identified patent and that said Letters Patent is hereby corrected as shown below:

Column 21,
Line 50, "formed-on" should read -- formed on --.

Column 24,
Line 22, "$D_{y10000}$." should read -- $D_{y1000}$. --.

Column 27,
Line 32, "$D_{y1}$" should read -- $D_{x1}$ --.

Column 31,
Line 58, "examples," should read -- example, --.

Column 35,
Line 35, "a" (2nd occurrence) should read -- an --.

Column 36,
Lines 30 and 37, "a" should read -- an --; and
Line 57, "and" should be deleted.

Column 37,
Line 34, "a" should read -- an --; and
Line 59, "connected;" should read -- connected; and --.

Signed and Sealed this

Fourteenth Day of January, 2003

JAMES E. ROGAN
*Director of the United States Patent and Trademark Office*